US007734719B2

(12) United States Patent  (10) Patent No.: US 7,734,719 B2
Friedman et al.  (45) Date of Patent: Jun. 8, 2010

(54) METHOD AND APPARATUS FOR CREATION, PERSONALIZATION, AND FULFILLMENT OF GREETING CARDS WITH GIFT CARDS

(75) Inventors: Doron Friedman, Goleta, CA (US); Ajay Singhvi, New York, NY (US); Brian J. Huse, Santa Barbara, CA (US)

(73) Assignee: 4Yoursoul.com, Santa Barbara, CA (US)

( * ) Notice: Subject to any disclaimer, the term of this patent is extended or adjusted under 35 U.S.C. 154(b) by 0 days.

(21) Appl. No.: 12/044,111

(22) Filed: Mar. 7, 2008

(65) Prior Publication Data

US 2008/0294977 A1  Nov. 27, 2008

Related U.S. Application Data

(63) Continuation of application No. 10/647,705, filed on Aug. 25, 2003, now Pat. No. 7,370,076, which is a continuation-in-part of application No. 09/420,434, filed on Oct. 18, 1999, now Pat. No. 6,965,912.

(60) Provisional application No. 60/405,510, filed on Aug. 23, 2002.

(51) Int. Cl.
   *G06F 15/16* (2006.01)
(52) U.S. Cl. ............... 709/217; 709/203; 709/246
(58) Field of Classification Search ........... 709/203, 709/217, 246; 700/233; 715/513
   See application file for complete search history.

(56) References Cited

U.S. PATENT DOCUMENTS 5,072,253 A   12/1991   Patton

| | | |
|---|---|---|
| 5,426,594 A | 6/1995 | Wright et al. |
| 5,437,478 A | 8/1995 | Gaines |
| 5,466,919 A | 11/1995 | Hovakimian |
| 5,513,117 A * | 4/1996 | Small ................... 700/233 |
| 5,552,994 A | 9/1996 | Cannon et al. |
| 5,555,496 A * | 9/1996 | Tackbary et al. ............. 705/27 |
| 5,600,563 A | 2/1997 | Cannon et al. |
| 5,748,484 A | 5/1998 | Cannon et al. |
| 5,751,590 A | 5/1998 | Cannon et al. |
| 5,870,718 A | 2/1999 | Spector |
| 5,960,412 A | 9/1999 | Tackbary et al. |
| 6,038,573 A | 3/2000 | Parks |
| 6,052,514 A | 4/2000 | Gill et al. |
| 6,092,054 A | 7/2000 | Tackbary et al. |
| 6,295,058 B1 | 9/2001 | Hsu et al. |

(Continued)

FOREIGN PATENT DOCUMENTS

EP  0784394  7/1997

(Continued)

*Primary Examiner*—Frantz B Jean
(74) *Attorney, Agent, or Firm*—Burns & Levinson LLP; Bruce D. Jobse

(57) ABSTRACT

An automated fulfillment system enables gift cards to be embedded or sent along with personalized greeting cards. The present invention, a method, system and apparatus enables a person to 1) purchase a gift card from either a Internet Website, Catalog, and/or retail kiosk, 2) choose a retail quality greeting card, 3) personalize the greeting card, and 4) send the personalized greeting cards as a gift with a gift card embedded inside the greeting card. The reverse is also possible, i.e. a user can purchase a greeting card, personalize the greeting card, and then assign that greeting card to have a gift card inserted inside therein.

28 Claims, 47 Drawing Sheets

U.S. PATENT DOCUMENTS

| | | |
|---|---|---|
| 6,453,300 B2 * | 9/2002 | Simpson .................... 705/26 |
| 7,024,807 B2 | 4/2006 | Street |
| 2001/0005834 A1 | 6/2001 | Simpson |
| 2003/0120553 A1 | 6/2003 | Williams |
| 2003/0208556 A1 | 11/2003 | Friedman et al. |
| 2004/0006487 A1 | 1/2004 | Tari |
| 2004/0099730 A1 | 5/2004 | Tuchler et al. |
| 2004/0139318 A1 | 7/2004 | Fiala et al. |

FOREIGN PATENT DOCUMENTS

| | | |
|---|---|---|
| WO | 9933010 | 7/1999 |
| WO | 0063820 | 10/2000 |
| WO | 0241166 | 5/2002 |

* cited by examiner

| | |
|---|---|
| INVOICE NUMBER | 902 |
| USER EMAIL | 904 |
| CREDIT CARD NAME | 906 |
| CREDIT CARD NUMBER | 908 |
| CREDIT CARD EXP. YEAR | 910 |
| CREDIT CARD EXP. MONTH | 912 |
| CREDIT CARD TYPE | 914 |
| CREDIT CARD STREET1 | 916 |
| CREDIT CARD STREET2 | 918 |
| CREDIT CARD CITY | 920 |
| CREDIT CARD STATE | 922 |
| CREDIT CARD ZIP | 924 |
| CLIENT IDENTIFICATION # | 926 |
| GIFT LIST | 930 |
| INV. LINE ITEM NUMBER | 930A |
| SKU | 930B |
| GIFT DESCRIPTION | 930C |
| DISTRIBUTION LOCATION # | 930D |
| DATE OF SHIPMENT | 930E |
| SHIP TO PERSON | 930F |
| SHIP TO CITY | 930G |
| SHIP TO STATE | 930H |
| ⋮ | |
| GIFT LIST | 932 |
| INV. LINE ITEM NUMBER | 932A |
| SKU | 932B |
| GIFT DESCRIPTION | 932C |
| DISTRIBUTION LOCATION # | 932D |
| DATE OF SHIPMENT | 932E |
| SHIP TO PERSON | 932F |
| SHIP TO CITY | 932G |
| SHIP TO STATE | 932H |

*Figure 9*

METHOD AND APPARATUS FOR CREATION, PERSONALIZATION, AND FULFILLMENT OF GREETING CARDS WITH GIFT CARDS

RELATED APPLICATIONS

This application is a continuation of and claims priority to U.S. Ser. No. 10/647,705, filed Aug. 25, 2003, now U.S. Pat. No. 7,370,076, which is a continuation-in-part of and claims priority to U.S. Ser. No. 09/420,434, filed Oct. 18, 1999, now U.S. Pat. No. 6,965,912, the disclosures of which are incorporated herein in their entirety.

In addition, this application claims priority to U.S. Provisional patent application Ser. No. 60/405,510, filed Aug. 23, 2002 by Doron Friedman, Ajay Singhvi and Brian Huse, and entitled "METHOD AND APPARATUS FOR CREATION, PERSONALIZATION, AND FULFILLMENT OF GREETING CARDS WITH GIFT CARDS", the subject matter of which is incorporated herein by reference for all purposes.

FIELD OF THE INVENTION

This invention relates to an electronic commerce, in general, and, more specifically, a system for selecting, customizing and coordinating delivery of greeting cards with gifts and gift cards.

BACKGROUND OF THE INVENTION

The World Wide Web and Internet, in general, have created a completely new venue in which to obtain information, purchase goods and services, and interact with other network users. Accordingly, many sources of products and services have established web sites containing information about products, services and available information. A number of commercially available software applications, e.g. web browsers, executable on a conventional computer architecture enable users to connect to the Internet and provide a graphic user interface and appropriate functionality for locating and exploring "websites". Examples of such commercially available browsers include Netscape Navigator, commercially available from America On Line, Inc., or Internet Explorer, commercially available from Microsoft Corporation, Redmond, Wash. Websites typically comprise a server operatively coupled to the Internet, the server having one or more "pages" which may be explored by a user using the web browser application.

Using a web browser, computer shoppers have the ability to access and purchase products and services from far reaching locations, including international locations. In order to purchase a product, the shopper accesses the web site server of a vendor, selects a product, provides payment, typically in the form of credit card information, and provides delivery instructions to the vendor.

The purchase of goods and services over the Internet, referred to hereafter as, "eCommerce", has become very popular recently. In many instances, eCommerce vendors try to emulate normal retail commerce with varying degrees of success. For example, gift-buying via eCommerce has failed to emulate normal retail commerce as a result of its inherent lack of personalization. In the real world, when giving a gift, a person typically purchases a product as a gift. In addition, the person may purchase a card to help express his or her thoughts about the gift or the occasion. Such cards usually contain personal, handwritten messages and are packaged along with the gift for simultaneous presentation to the recipient.

It is possible to purchase products or services as gifts from the websites of eCommerce vendors and have them sent to a recipient's address. It is also possible to purchase electronic cards over the Internet to be delivered either to the recipient's email address or printed in hard copy form and delivered to the recipient's postal address. However, no known service or facility exists which enables an eCommerce shopper to purchase a gift over the Internet and concurrently select and personalize a greeting card to be packaged or shipped along with the gift. Some companies do provide a limited selection hard copy cards that maybe shipped with a gift, similar to the note cards which accompany floral deliveries.

In addition, current on-line electronic greeting card services, such as those offered by Hallmark, Inc., City, State, or American Greetings Corporation, Cleveland, Ohio, enable users to select a card and customize the card by entering text into a dialog box via the webserver graphic user interface. Such services do not enable the user to add handwritten notes, graphics, photographs, or other customizations to the card. These services do not allow the user to decide where the text should go, what font, color, size, etc. should be used for the text.

Systems which enable the on-line creation of greeting cards and distribution of the greeting cards with gifts are disclosed in published PCT Patent application Serial No. PCT/US00/41272, entitled METHOD AND APPARATUS FOR DISTRIBUTION OF GREETING CARDS WITH ELECTRONIC COMMERCE TRANSACTION.

There is also a current lack of personalization associated with gift cards, e.g. credit card-sized cards made of plastic with a magnetic strip on the back of the card, but not limited to such design. Such gift cards or stored value cards, as sometimes called, may be physically purchased at many retail establishments. People shopping through the Internet, through catalogs, and through retail kiosks can also purchase a gift card, however, they do not have the ability to match the gift card with a personalized greeting card.

Current systems either cause a computer to print a gift card, read the magnetic strip, which then cause the printing of a laser printed message on a folded thin sheet of paper. The gift card and printed documented are then attached together. In order to match the speed of the gift card generation, the cards require a fast single color laser printer to print the piece of paper. The second method of combining a laser printed message on thin paper with a gift card is for the computer that causes the gift card to print will simultaneously cause the laser printer to print a message that will print on a thin sheet of paper and match up with the gift card. These methods are not possible with the printing of greeting cards as there are no printers that can print four color retail quality cards on-demand fast enough to match the necessary efficiency of the printing of gift cards.

A need exists, therefore, for technology so that a person can purchase a gift card from either a Internet website, catalog, and/or retail kiosk, then choose a retail quality greeting card, personalize the greeting card, and send it as a gift with a gift card embedded inside the greeting card.

A further need exists for technology so that a person can purchase any greeting card, personalize the greeting card, and then assign that greeting card to have a gift card inserted inside it.

SUMMARY OF THE INVENTION

The present invention discloses a method, system and apparatus for enabling selection, customization and transmission of greeting cards with a gift. In one embodiment of the invention, an eCommerce shopper/network user connects to the inventive system. The network user may select from any of a number of card templates stored in a database. The cards are presented to the network user in a WYSIWYG format. The user is able to customize the card by adding text, handwritten notes, graphics, photographs and scanned data to the card and view the customized card in a WYSIWYG format. The card may also perform other function as a gift certificate, stock certificate, coupon, etc. After purchase, the customized card is printed by the inventive system and mailed to the address of a recipient, as specified by the network user.

In a second implementation of the invention, following purchase of the card, the card is transmitted to the distribution center of an eCommerce vendor from whom a gift has been purchased. There the card is printed, matched and shipped along with the gift to the recipient, as specified by the network user. In this implementation, a network user connects with the website of an eCommerce vendor. After selecting a gift from the eCommerce vendor, the network user is able to optionally connect to the inventive system for selection of a greeting card. The network user is able to select and customize a card, as described previously in the first implementation. After purchasing the card, the data and data structures representing the customized card, as well as data defining the purchaser, recipient(s), and identifying the gift or transaction to the eCommerce vendor product are transmitted over a computer network to the distribution center of the eCommerce vendor. The customized card is printed at the eCommerce vendor's distribution center, preferably on a high resolution graphics printer, matched with the gift and shipped with the gift to the recipient. In this manner, the recipient simultaneously receives a gift and card, both of which have been purchased over the Internet, as if the sender had purchased the gift and card at traditional retail establishments.

According to a third implementation of the present invention, a method, system and apparatus enables a person to 1) purchase a gift card from either a Internet Website, Catalog, and/or retail kiosk, 2) choose a retail quality greeting card, 3) personalize the greeting card (when personalizing it through the Internet or retail kiosk, using the WYSIWIG personalization technology described herein, and 4) send it as a gift with a gift card embedded inside the greeting card. The reverse is also possible, i.e. a user can purchase any greeting card, personalize the greeting card, and then assign that greeting card to have a gift card inserted inside it. The invention contemplates the use of an automated fulfillment system that enables gift cards to be embedded or sent along with personalized greeting cards.

According to one aspect of the present invention, in a computer system connectable to a computer network, a method and computer program product containing program code comprise: (a) maintaining in memory a compilation of greeting card templates; (b) maintaining in memory data identifying one of the greeting card templates and any user defined modifications thereto; (c) maintaining in memory data associating said one greeting card template and any user defined modifications thereto with a gift card; (d) printing on demand a personalized greeting card comprising the identified greeting card template in conjunction with any user defined modifications thereto and greeting card data reference thereon; and (e) generating a gift card having a gift card data reference thereon; (f) comparing the greeting card data reference and the gift card data reference to determine a relationship therebetween. In one embodiment, (f) comprises reading the greeting card reference data; reading the gift card reference data; and confirming that the personalized greeting card represented by the read greeting card reference data and gift card represented by the read gift card reference data are associated.

According to a second aspect of the present invention, in a computer system connectable to a computer network, a method comprises: (a) maintaining data associating a greeting card with the gift card; (b) generating on demand a personalized greeting card with a greeting card data reference thereon; (c) using the greeting card data reference to initiate generation of a personalized gift card having a gift card data reference thereon; (d) reading the greeting card reference data; (e) reading the gift card reference data; and (f) determining if the personalized greeting card represented by the read greeting card reference data and gift card represented by the gift card reference are associated.

According to a third aspect of the present invention, in a computer system connectable to a computer network, a method comprises: (a) maintaining data associating a personalized gift card with a personalized greeting card; (b) generating a gift card on demand with a gift card data reference thereon; (c) using the gift card data reference to initiate generation of a personalized greeting card having a greeting card data reference thereon; and (d) comparing the gift card data reference and the greeting card data reference to determine if a relationship exists therebetween.

According to a fourth aspect of the present invention, in a computer system connectable to a computer network, a method comprising: (a) maintaining in memory data identifying a greeting card template and any user defined modifications thereto and data associating the gift card template with a gift card; (c) upon the occurrence of a first predetermined event, printing a personalized greeting card comprising the identified greeting card template in conjunction with any user defined modifications thereto and greeting card data reference thereon; (d) upon the occurrence of a second predetermined event, generating a gift card with a gift card data reference thereon; and (e) comparing the gift card data reference and the greeting card data reference to determine a relationship therebetween. In one embodiment, either of the first and second predetermined events are selected from the group consisting of: receipt of a computer instruction, the occurrence of a temporal event, and the notification of a completed task.

According to a fifth aspect of the present invention, in a computer system connectable to a computer network, a method comprises: (a) maintaining in memory a compilation of greeting card templates; (b) maintaining in memory data identifying a plurality of the greeting card templates, any user defined modifications thereto, and data associating each of the plurality of greeting card templates with one of a plurality of the gift cards; (c) printing, on demand and in a sequence, a plurality personalized greeting cards, each of the personalized greeting cards comprising one of the identified greeting card templates in conjunction with any user defined modifications thereto and a greeting card data reference thereon; (d) generating, on demand and in a sequence, a plurality of a gift card, each gift card having a gift card data reference thereon; and (e) comparing the greeting card data reference of a greeting card having a position in the sequence of personalized greeting cards with the gift card data reference of a personalized gift card having a similar position in sequence of personalized gift cards to determine a relationship therebetween.

According to a sixth aspect of the present invention, a computer system connectable to a computer network comprising: (a) a processor; (b) a memory coupled to the processor for storing; (i) data identifying one of the greeting card templates and any user defined modifications thereto; and (ii)

data associating said one greeting card template with a gift card; (c) a printer coupled to the processor; (d) program logic for printing on demand a personalized greeting card comprising the identified greeting card template in conjunction with any user defined modifications thereto and greeting card data reference thereon; (e) program logic generating a gift card having a gift card data reference thereon; and (f) program logic for comparing the greeting card data reference and the gift card data reference to determine a relationship therebetween.

BRIEF DESCRIPTION OF THE DRAWINGS

The above and further advantages of the invention may be better understood by referring to the following description in conjunction with the accompanying drawings in which:

FIG. 9 is a conceptual illustration of the data structures used to represent a card in accordance with the present invention;

DETAILED DESCRIPTION

Figure 1:
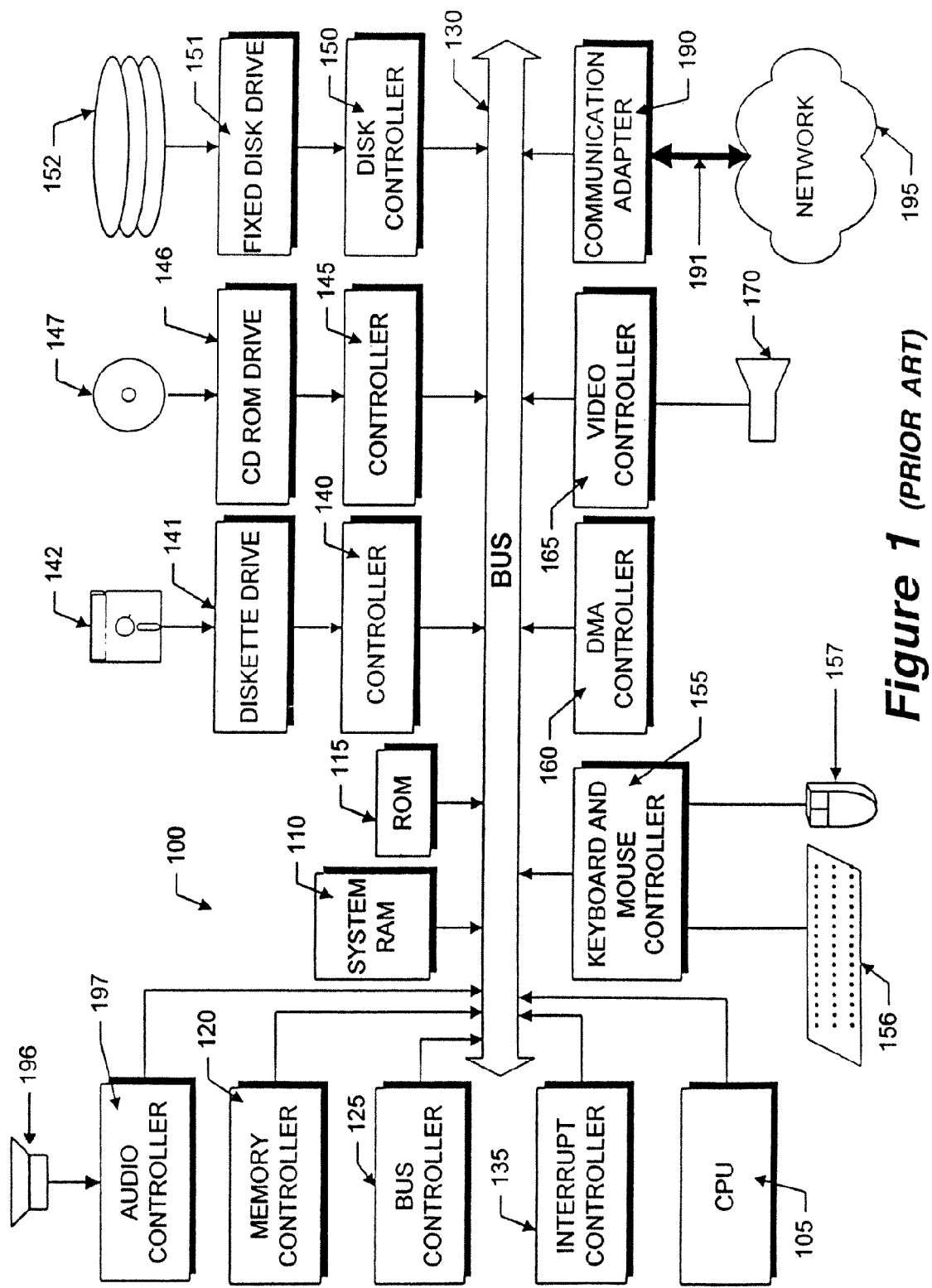
FIG. 1 is a block diagram of a computer system suitable for use with present invention.

FIG. 1 illustrates the system architecture for a computer system 100 such as a Sun SparcStation 5 workstation, commercially available from Sun Microsystems of Palo Alto, Calif., or an IBM RS/6000 workstation, or IBM Aptiva PC, both commercially available from International Business Machines Corp. of Armonk, N.Y., on which the invention may be implemented. The exemplary computer system of FIG. 1 is for descriptive purposes only. Although the description may refer to terms commonly used in describing particular computer systems, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adapter 190 which allows the system to be interconnected to a local area network (LAN) or a wide area network (WAN), schematically illustrated by bus 191 and network 195.

Operation of computer system 100 is generally controlled and coordinated by operating system software, such as Windows 95 or Windows NT®, commercially available from Microsoft Corp., Redmond, Wash. The operating system controls allocation of system resources and performs tasks such as processing scheduling, memory management, networking, and I/O services, among things. In particular, an operating system resident in system memory and running on CPU 105 coordinates the operation of the other elements of computer system 100. The present invention may be implemented with any number of commercially available operating systems including OS/2®, UNIX®, Linux and Solaris®, among others.

One or more applications such as a web browser, for example, Netscape Navigator, version 2.0 and thereafter commercially available from Netscape Communications Corporation. and Internet Explorer, version 1.0 and thereafter, commercially available from Microsoft Corporation, Redmond, Wash., may execute under the control of the operating system.

Communication Environment

Figure 2:
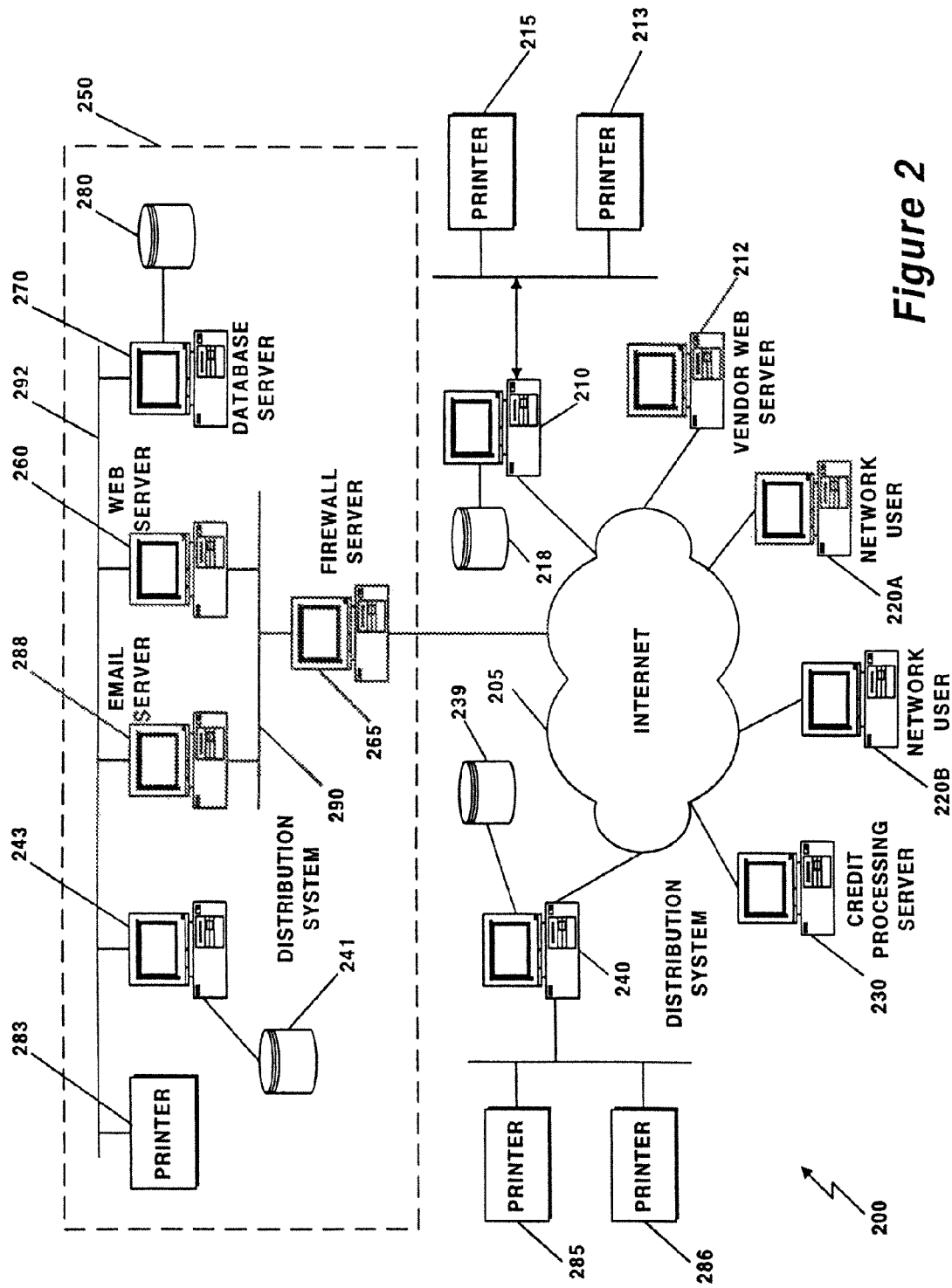
FIG. 2 is a conceptual block diagram of the elements of the inventive system in a network environment.

FIG. 2 illustrates a telecommunications environment in which the invention may be practiced, such environment being for exemplary purposes only and not to be considered limiting. Network 200 of FIG. 2 illustrates a hybrid telecommunication environment including packet-switched data networks, such as the Internet and private Intranets, as well as apparatus bridging between the two. Not every element illustrated in FIG. 2 or described herein is necessary for the implementation or the operation of the invention.

As illustrated in FIG. 2, a global packet-switched network topology, illustrated as the Internet 205, interconnects various other computers in the network environment to the inventive system 250 of the present invention over a network. As will be understood by those skilled in the art, the Internet is essentially a network of networks which collectively form a global wide area network enabling processes at different network addresses, and typically in geographically disparate locations, to establish communication connections and to transmit data in a variety of formats. In the illustrative embodiment, any number of different transport protocols may be utilized between and among the various processes connectable across the Internet and private Intranets, e.g. Local Area Networks.

As illustrated in FIG. 2, in addition to system 250, a plurality of other computer systems 210, 212, 220 A-B, 230, 240, 250, 260, 265, and 270 are coupled, directly or indirectly, to the Internet 205. Each of these computer systems may be implemented with a computer architecture similar or equivalent to that described with reference to FIG. 1 and capable of executing a computer operating system, such as Windows NT 4.0, available from Microsoft Corporation, Redmond, Wash. Such an operating system is a multi-tasking operating system capable of executing multiple simultaneous threads of execution. Other commercially available operating systems such as Unix, Linux, OS/2, and Solaris may also be utilized. Computer systems 210-270 may utilize any of a number of technologies known in the arts to connect to Internet 205. For example, computer system 220A, which represents a network user, may be connected to the Internet through a dial-up connection to an Internet Service Provider, not shown, such as America On-line or Compuserve. Computer system 220B, representing another network user, may alternatively be coupled to the Internet through a cable modem and broadband cable network infrastructure, also not shown. Vendor distribution computer system 210 and vendor web server system 212, may be connected to the Internet utilizing frame relay technology and a high bandwidth connection, such as T1, T2 or T3 line. Computer system 230, representing a credit processing server, and computer system 240, representing a card vendor distribution center computer(s), may be similarly connected to Internet 205 using any of the previously-described techniques or any other techniques known in the arts.

Card Vendor System

Referring to FIG. 2, a conceptual block diagram of the card vendor system 250 in accordance with the present invention is illustrated. The system 250 comprises a web server 260, a database server 270 and database 280, and email server 288 operatively coupled, in the illustrative embodiment, via a private network 292, e.g., a packet-switched network, such as a Local Area Network executing the TCP/IP protocol. Network 292 is a private network which may further be used to connect to printer 283 to the distribution computer system 243 and database 241. In the illustrative embodiment network 292 may comprise a 100 megabit Ethernet network. A private network 290 couples both web server 260 and email server 288 to firewall server 265. Firewall server 265 is, in turn, connected to Internet 205, via a T1 line, or other connection such as a frame relay connection.

In the illustrative embodiment of the present invention, email server 288 may be implemented as a server executing an application program in accordance with the Post Office Protocol version 3.0 (POP3), such server capable of receiving and sending electronic mail in a manner understood by those skilled in the arts.

In a similar manner, firewall application 265 may be implemented as a server or network appliance executing any of a number of commercially available network security applications which prevent unauthorized access to private networks in a manner understood by those skilled in the arts.

In the illustrative embodiment, web server 260 performs the functions of a traditional web server enabling access to one or more web pages by other processes connected to Internet 205. In addition, webserver 260 contains display control module 266 which utilizes data representing a card, as retrieved from database 280, and data representing modifications to the selected card, as received from a network user, to render the selected card and its modifications in a WYSIWYG format for viewing by the network user.

Server 260 may be implemented using a hardware platform similar to that illustrated with reference to FIG. 1. Executing under the control of an operating system are one or more applications necessary for web server 260 to perform its appropriate functions. Specifically, web server 260 presents web pages to the network user and controls the flow of information to/from database server 270. In the illustrative embodiment, the functions performed by web server 260 may be implemented either with object-oriented programming techniques using the appropriate class definitions and objects for values within the database, or, alternatively, using a non-object oriented language such as the C++ programming language.

Web server 260 retains in memory one or more "pages" which collectively may comprise a web site used to visually present the information on the pages. One or more of the pages accessible on web server 260 may contain address information in the form of a Hypertext Markup Language (HTML) tag which may be downloaded over the Internet 205 to a browser process executing on any of the other computer systems connected to the network. Such HTML tag may include the IP address or E-mail address associated with the web site.

Web server 260 functions to render pages to a network user connected to the web server 260 and to pass data received from a network user to database through the appropriate Application Program Interfaces (APIs). In the illustrative embodiment, the web server 260 may utilize a plurality of Visual Basic, Java script files and/or Java applets to create active web pages. Web server 260 may include a database interface (not shown) which functions as the interface between web server 260 and database server 270. Such database interface may be implemented via ODBC, Remote Procedure Call libraries or other similar technologies which enables the interface to make remotely access the database server 270 and to service calls received from database server 270.

The distribution computer system 240 and its accompanying database 239 may be connected to system 250 via direct network connection or other connections such dialup modem, DSL or frame relay. Computer system 240 may be coupled to one or more network printers 285 and 286 via a private network such as a LAN.

Data Base Architecture

In the illustrative embodiment, database server 270 and database 280 may comprise a hardware platform and an operating system capable of executing one of a number of commercially available database products. In the illustrative embodiment, hardware platform may be implemented with a computer system similar to that described with reference to FIG. 1. The operating system may be implemented with the Windows NT 4.0 product from Microsoft. The database product may be implemented with Microsoft SQL Server Version 7.0, also commercially available from Microsoft Corporation. The structure of information, including the data fields, records, tables which comprise database 280 are described hereinafter and may also be designed using Microsoft SQL Server Version 7.0.

Query engine (not shown) receives information from web server 260 in the form of a query and supplies the query to database 280. The structure and organization of records within database 280 is set forth in greater detail with reference to FIG. 4-5. Database server 270 and database 280 communicate using SQL standard database query language. The SQL standard is published by the American National Standards Institute (ANSI). The database query engine which is integrated into database server filters the queries received from web server 260, such filters useful in focusing or customizing the scope of a database query. The information retrieved from database 280 may be forwarded by database server 270 to web server 260 using any number of know techniques such as remote procedural call libraries, as that previously described.

Figure 4A:
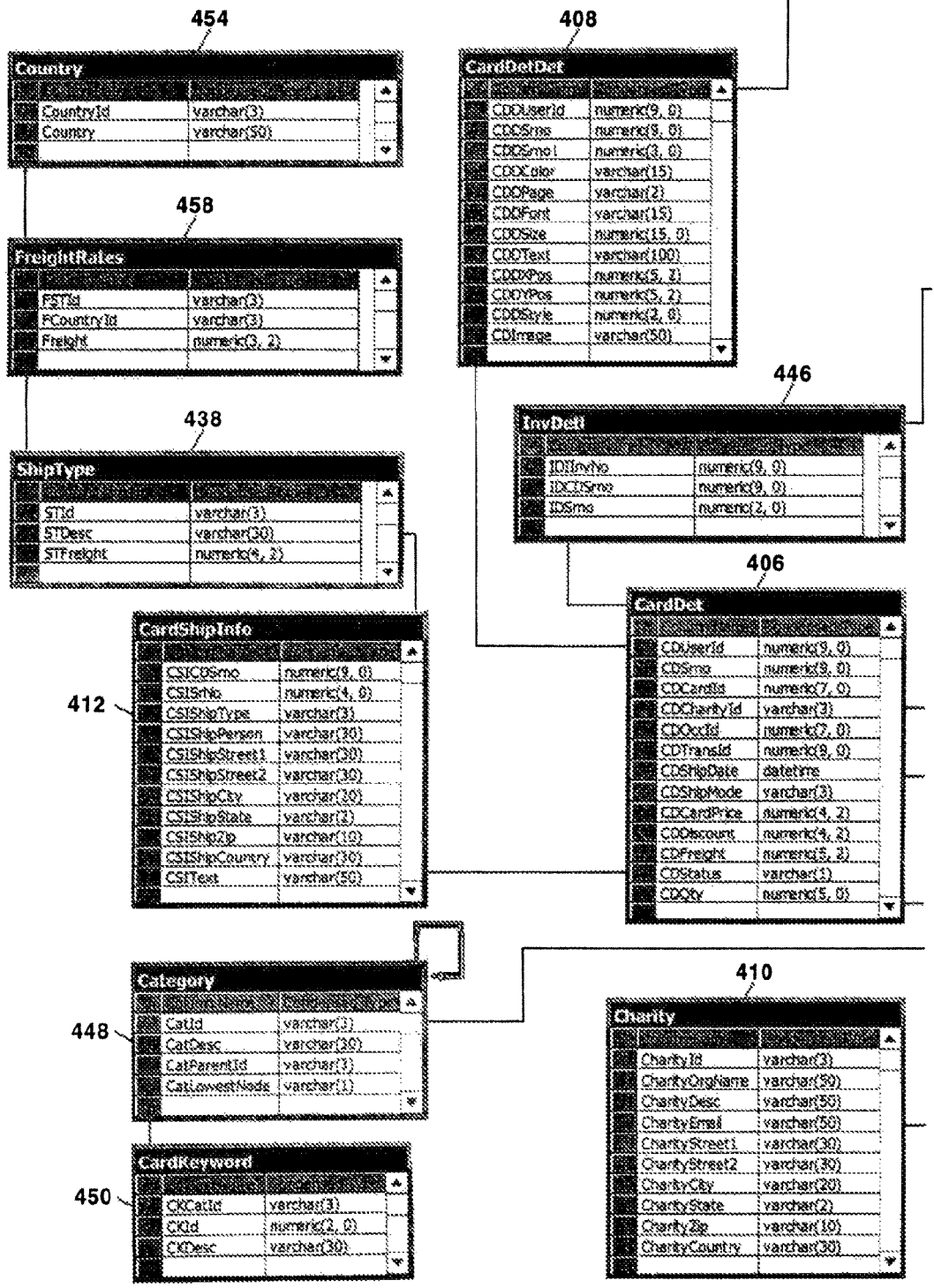
FIGS. 4-5 illustrate conceptually the construction of the inventive database and the information contained therein.
Figure 4B:
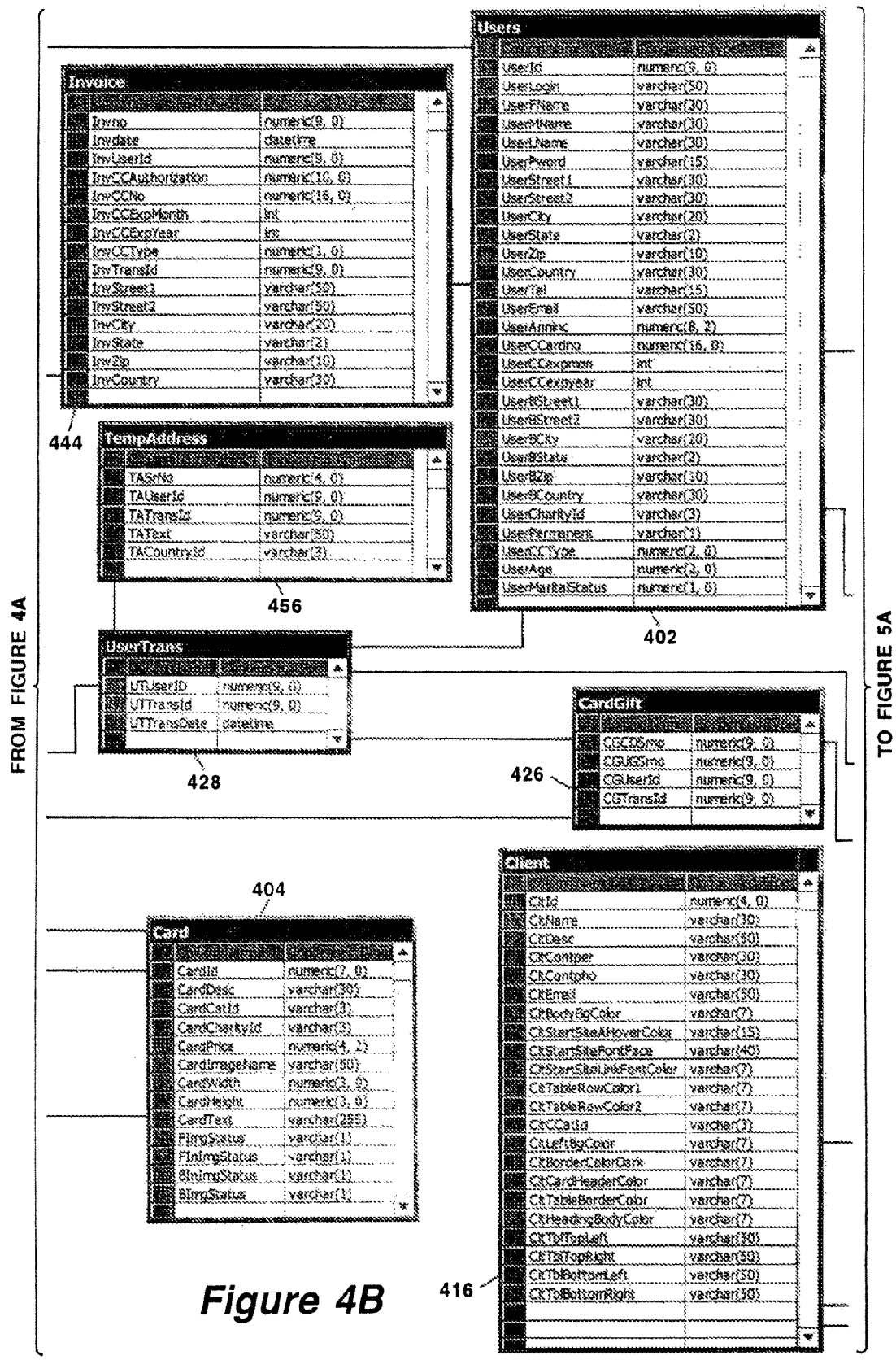
Figure 5A:
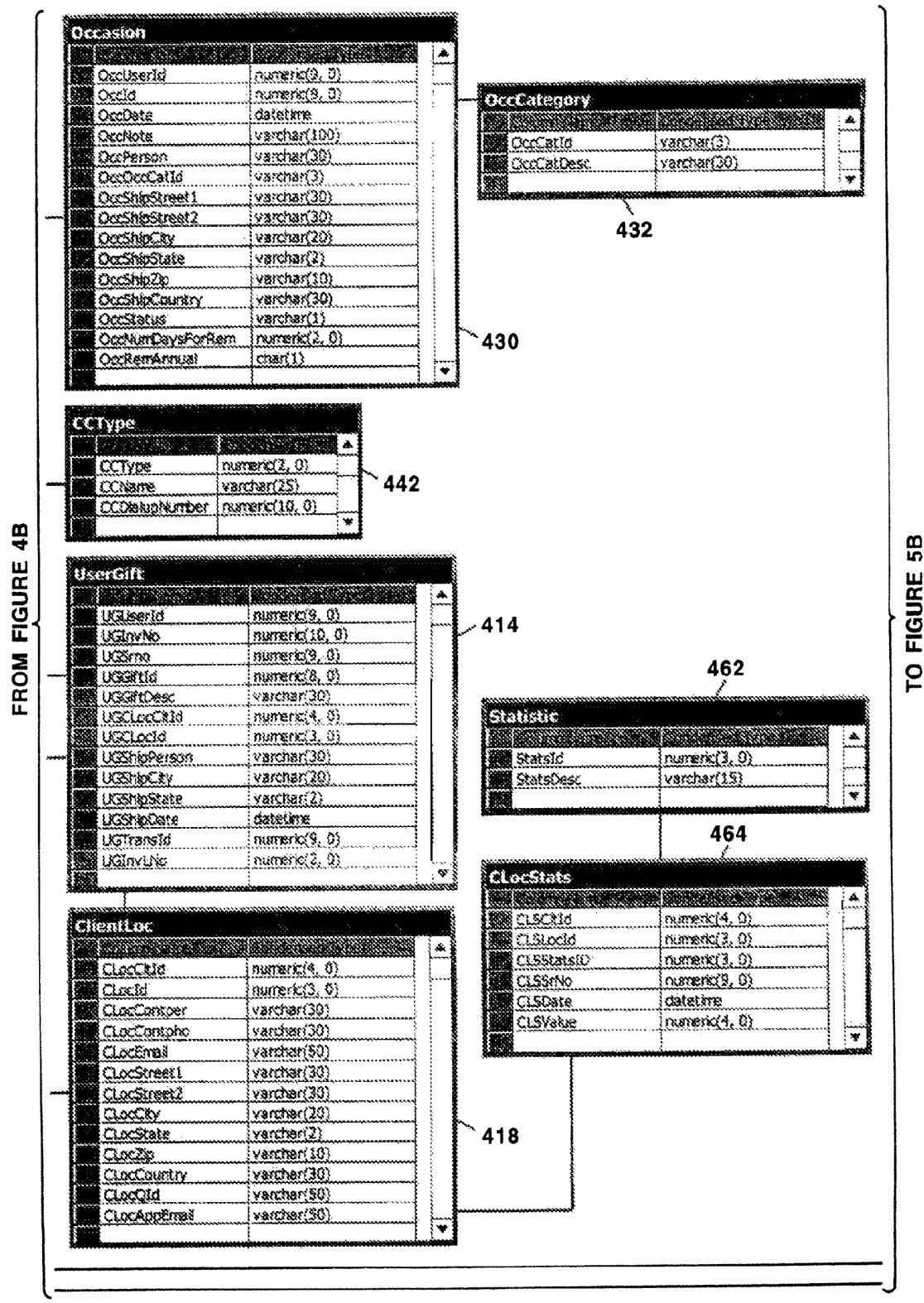
Figure 5B:
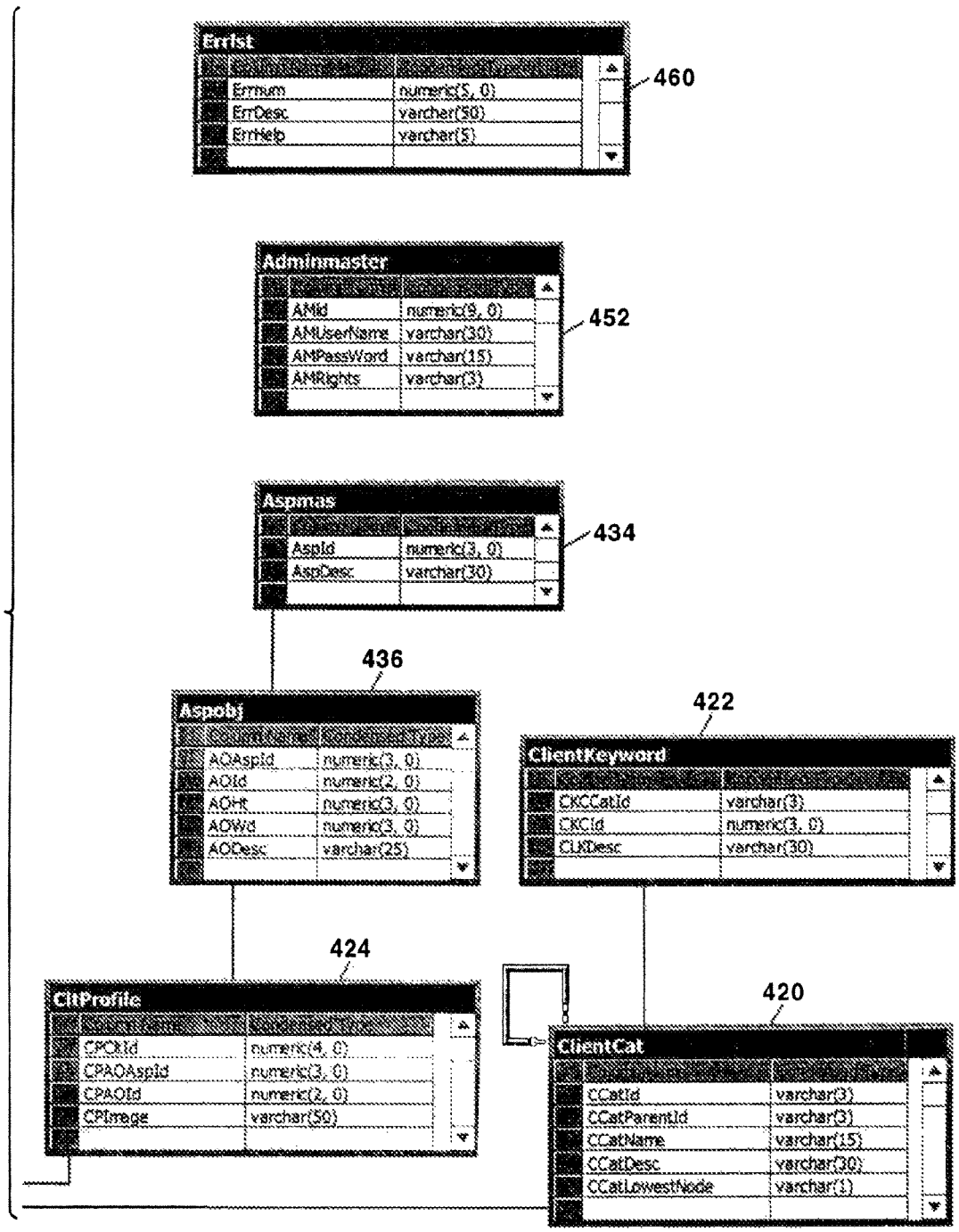

FIGS. 4-5 illustrate conceptually the tables which comprise database 280. Each record, as shown, includes one or more fields and an associated field descriptor, as illustrated. Multiple records of the same type, in turn, collectively form a table within database 280. A field within a record may serve as an index into another record. To further a better understanding of the architecture of database 280, the major tables, as illustrated conceptually by single record and its corresponding fields, are described below in greater detail.

User Table 402 is used to maintain information about a network user who has visited system 250 via a connection to webserver 260. Each record of User Table 402 includes fields for a user identifier, postal address, network address, age, marital status, telephone number, etc. The corresponding field descriptions, e.g. integer, variable character, number, etc., are illustrated in FIG. 4.

Card Table 404 is used to maintain information about a specific card of the master card list. Each record of Card Table 404 includes fields for a card identifier, price, card catalog identifier, text description, width and height of the card, a charity identifier, etc. The corresponding field descriptions are illustrated in FIG. 4A. In the illustrative embodiment, the actual cards may be stored in any graphical format, for example, jpg, gif, tif or bmp. The cards may be stored as part of or separate from database 280, as well as in the database 242 of distribution system 240 and database 218 of distribution system 210, both connectable to system 250. In the illustrative embodiment, the term "card" or "greeting card" is not limited to traditional hard copy cards but also includes images of one or more sides or panels of a card as may be stored in various graphical data formats and resolutions, in addition to those described herein. Further, the term "card" or "greeting card" is not limited to traditional hard copy cards but also includes other related forms of correspondence including announcements, invitations, business cards, notices, and other business and personal forms of communication.

Card Detail Table 406 (CardDet) is used to maintain information about a specific card which has been ordered by a network user. Each record of Card Detail Table 406 includes fields for the ship date, ship month, status, etc. The corresponding field descriptions are illustrated in FIG. 4.

The Card Detail Detail Table 408 (CardDetDet) is used to maintain information about changes or customizations made to the card by the network user. Each record of the Card Detail Detail Table 408 includes fields defining fields the font, size, color, text, X-position, Y-position, style, file name for an attached file containing graphics, digital photos, scanned data, etc. The corresponding field descriptions are illustrated in FIG. 4.

Charity Table 410 is used to maintain information relating to a specific charity from which proceeds of the card sale may be donated, as explained in greater detail hereinafter. Each record of Charity Table 410 includes fields for a charity identifier, charity description, organizational name, mailing address, etc. The corresponding field descriptions are illustrated in FIG. 5.

The remaining tables of FIGS. 4-5 include records having the information fields and field descriptors, as illustrated and which are self-explanatory. For example, the Card Ship info record 412 includes information relevant to the address to which the card is to be shipped. The user gift record 414 includes information about a gift with which the card is associated. The client table 416, client location record 418, client category 420, client key word record 422, and client profile record 422 all maintain information about a client (vendor) from which a gift was purchased and to which the card may be shipped for coordination with the shipment of the gift to the specified recipient. The card gift record 426 and user transmit record 428 include information useful in coordinating the shipment and printing of a card with a specified gift purchased at or shipped from a client's facilities. The occasion record 420 and occasion category record 432 include information fields describing a particular person, date and address for which a card was or may be ordered, and the nature of the occasion, e.g., birthday, anniversary, graduation, etc., respectively. Such information is useful for administrative and tracking purposes as well as for implementation of a reminder service. The ASPOBJ table 436 and ASPMAS table 434 include information fields used to enable the inventive system to customize the web page appearances in order to make it appear like an eCommerce vendor's web site. The ship type record 438 includes information describing the manner in which a card and/or the accompanying gift are to be transported to the recipient. Record 442-454 include the information fields and field descriptors, as illustrated in FIG. 4B, useful in administering the inventive system. The records 402-460 of database 280 are related. In particular, a specific entry of one table may be used as an index into a record of another table, as illustrated in the listing below in which each entry has the form:

WebServer Interface

Upon connection to webserver 260, either directly or through a hyperlink from the website of a vendor client, a network user is presented with a graphic user interface. The graphic user interface includes a number of web pages which are resident on web server 260 and through which the network user may navigate. The web pages include a number of menus and dialog boxes which allow the network user to interact with the web server 260, particularly with the selection of a card and entering of the necessary information for customization of the card and specifying a recipient address. Sample web pages are illustrated in FIG. 6A-K and include various highlight options and dialog boxes through which a network user may interact with webserver 260.

Figure 6A:
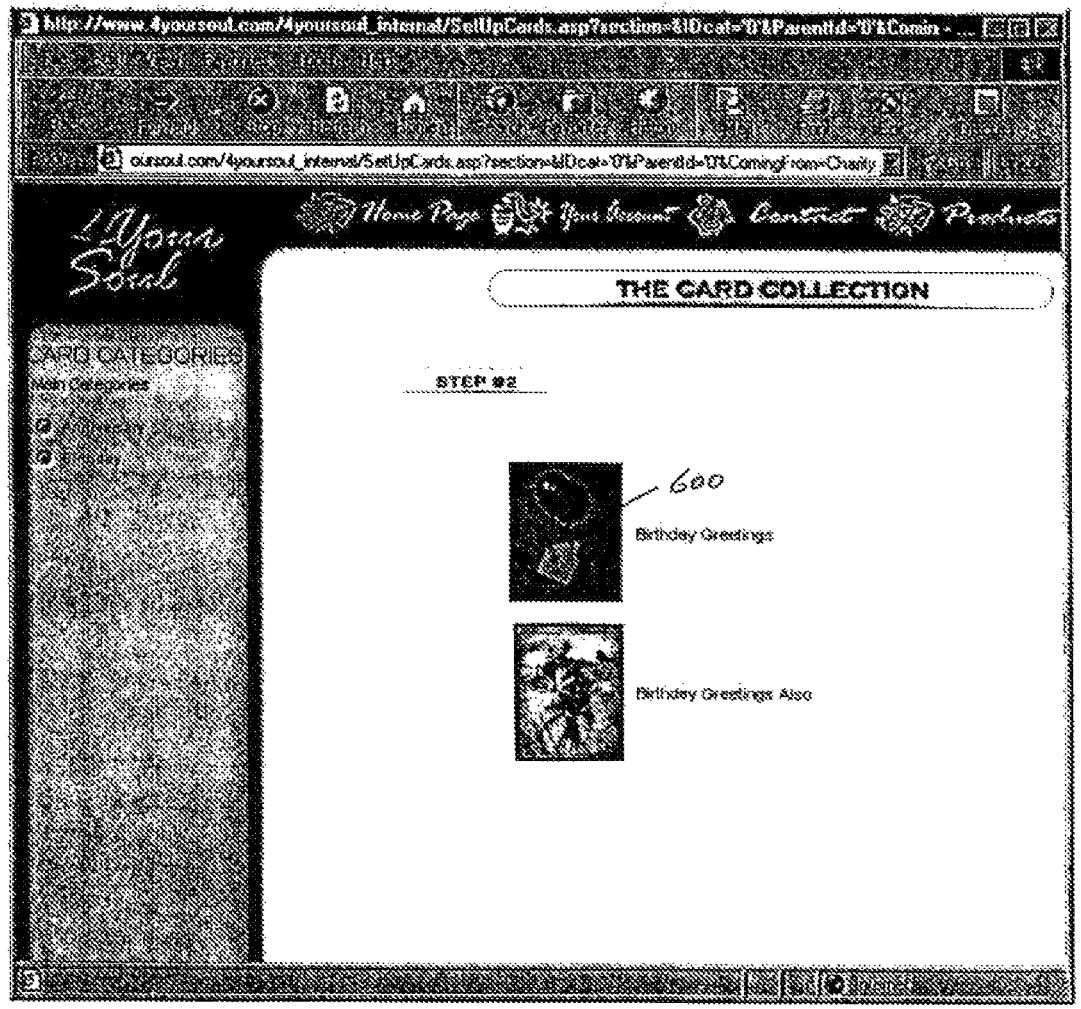
FIG. 6A is a screen capture of the graphic user interface of the inventive server illustrating a selection of cards in accordance with the present invention.

FIG. 6A is a screen capture of the graphic user interface of the inventive web server illustrating a selection of cards rendered in thumbnail size, in accordance with the present invention. In the illustrative embodiment, web pages rendered by webserver 260 appear to be an extension of the web site from which the network user was most recently connected, which as illustrated is 4YourSoul.com. In order to emulate the look and feel of a vendor's web page, the inventive system stores within a database 280, particularly tables 436 and 434, a client identifier and data identifying the appropriate backgrounds, color schemes, font sizes, font styles, font colors, logos, and other graphic or sonic elements etc. which emulate the look and feel of the client web site and give the network user the

| [Tablename.Fieldname] | REFERENCES [Tablename.Fieldname] |
|---|---|
| [Category.CatParentId] | REFERENCES [Category.CatId] |
| [ClientCat.CCatParentId] | REFERENCES [ClientCat.CCatId] |
| [Aspobj.AOAspId] | REFERENCES [Aspmas.AspId] |
| [CardKeyword.CKCatId] | REFERENCES [Category.CatId] |
| [Charity.CharityCountryId] | REFERENCES [Country.CountryId] |
| [Client.CltCCatId] | REFERENCES [ClientCat.CCatId] |
| [ClientKeyword.CKCCatId] | REFERENCES [ClientCat.CCatId] |
| [ClientMailInfo.CMIShipCountryId] | REFERENCES [Country.CountryId] |
| [FreightRates.FCountryId] | REFERENCES [Country.CountryId] |
| [FreightRates.FSTId] | REFERENCES [ShipType.STId] |
| [Users.UserCountry] | REFERENCES [Country.CountryId] |
| [Users.UserCCType] | REFERENCES [CCType.CCType] |
| [Card.CardCatId] | REFERENCES [Category.CatId] |
| [Card.CardCharityId] | REFERENCES [Charity.CharityId] |
| [ClientLoc.CLocCltId] | REFERENCES [Client.CltId] |
| [ClientLoc.CLocCountryId] | REFERENCES [Country.CountryId] |
| [CltProfile.CPAOAspId & CPAOId] | REFERENCES [Aspobj.AOAspId.AOId] |
| [CltProfile.CPCltId] | REFERENCES [Client.CltId] |
| [Invoice.InvUserId] | REFERENCES [Users.UserId] |
| [Invoice.InvCountryId] | REFERENCES [Country.CountryId] |
| [Occasion.OccShipCountryId] | REFERENCES [Country.CountryId] |
| [Occasion.OccOccCatId] | REFERENCES [OccCategory.OccCatId] |
| [Occasion.OccUserId] | REFERENCES [Users.UserId] |
| [UserTrans.UTUserID] | REFERENCES [Users.UserId] |
| [CardDet.CDUserId & CDTransId] | REFERENCES [UserTrans.UTUserID & UTTransId] |
| [CardDet.CDCardId] | REFERENCES [Card.CardId] |
| [CLocStats.CLSCltId & CLSLocId] | REFERENCES [ClientLoc.CLocCltId & CLocId] |
| [ClocStats.CLSStatsID] | REFERENCES [Statistic.StatsId] |
| [UserGift.UGCLocCltId & UGCLocId] | REFERENCES [ClientLoc.CLocCltId & CLocId] |
| [UserGift.UGUserId & UGTransId] | REFERENCES [UserTrans.UTUserID & UTTransId] |
| [CardDetDet.CDDSrno] | REFERENCES [CardDet.CDSrno] |
| [CardDetDet.CDDUserId] | REFERENCES [Users.UserId] |
| [CardGift.CGCDSrno] | REFERENCES [CardDet.CDSrno] |
| [CardGift.CGUGSrno] | REFERENCES [UserGift.UGSrno] |
| [CardShipInfo.CSICDSrno] | REFERENCES [CardDet.CDSrno] |
| [CardShipInfo.CSIShipCountryId] | REFERENCES [Country.CountryId] |
| [CardShipInfo.CSISTId] | REFERENCES [ShipType.STId] |
| [InvDetl.IDCDSrno] | REFERENCES [CardDet.CDSrno] |
| [InvDetl.IDIInvNo] | REFERENCES [Invoice.Invno] | impression that he/she is still connected to the vendor's web site. To accomplish the above illusion, a client identifier may be passed along with the hyperlink to web server 260. Web server 260 then uses the identifier to retrieve the appropriate parameters from tables 436 and 434 and other, as necessary, for rendering the web pages and graphic user interface in a manner which is similar to those of the vendor from whom the network user recently purchased goods or services. If a network user connect directly to the inventive system, the graphic user interface of the inventive system may be used.

Figure 6B:
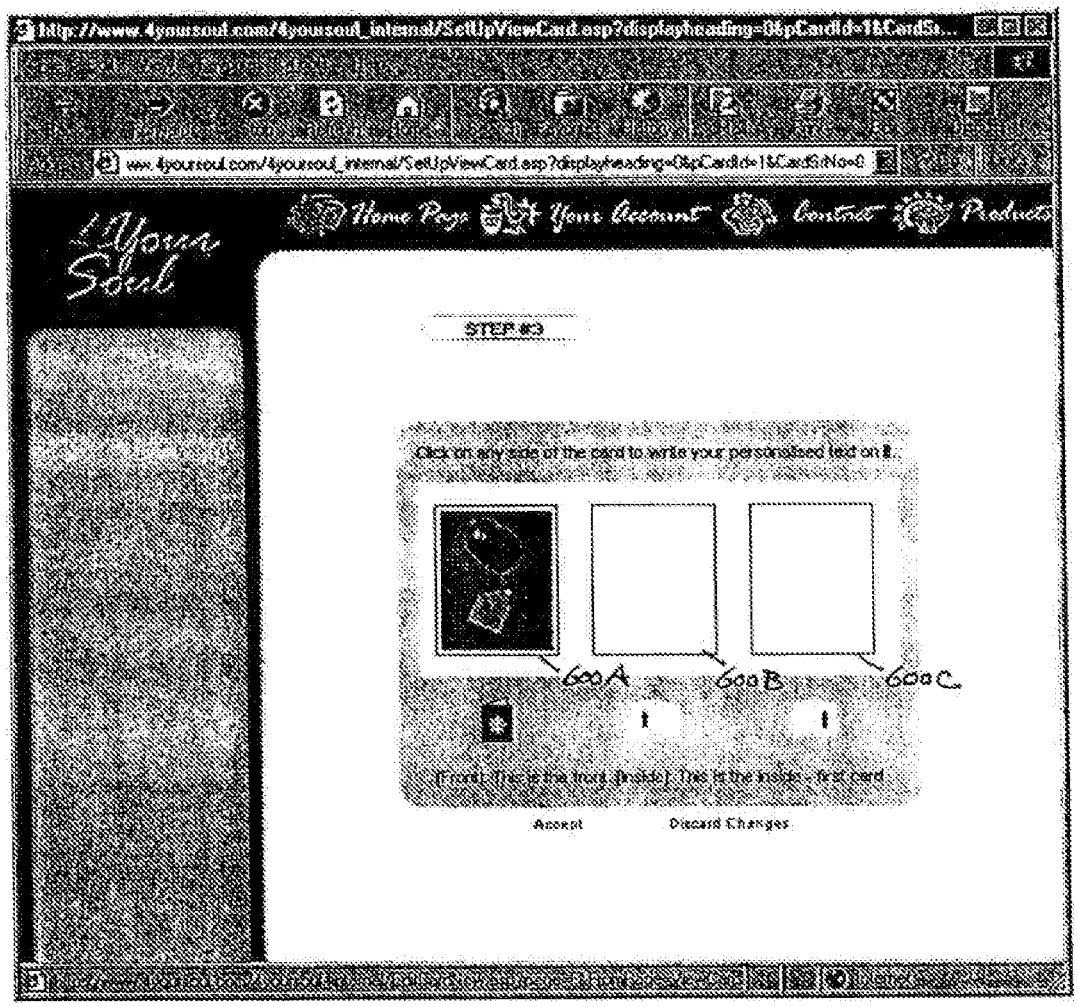
FIG. 6B is a screen capture of the graphic user interface of the inventive server illustrating a panels of a selected card in accordance with the present invention.
Figure 6C:
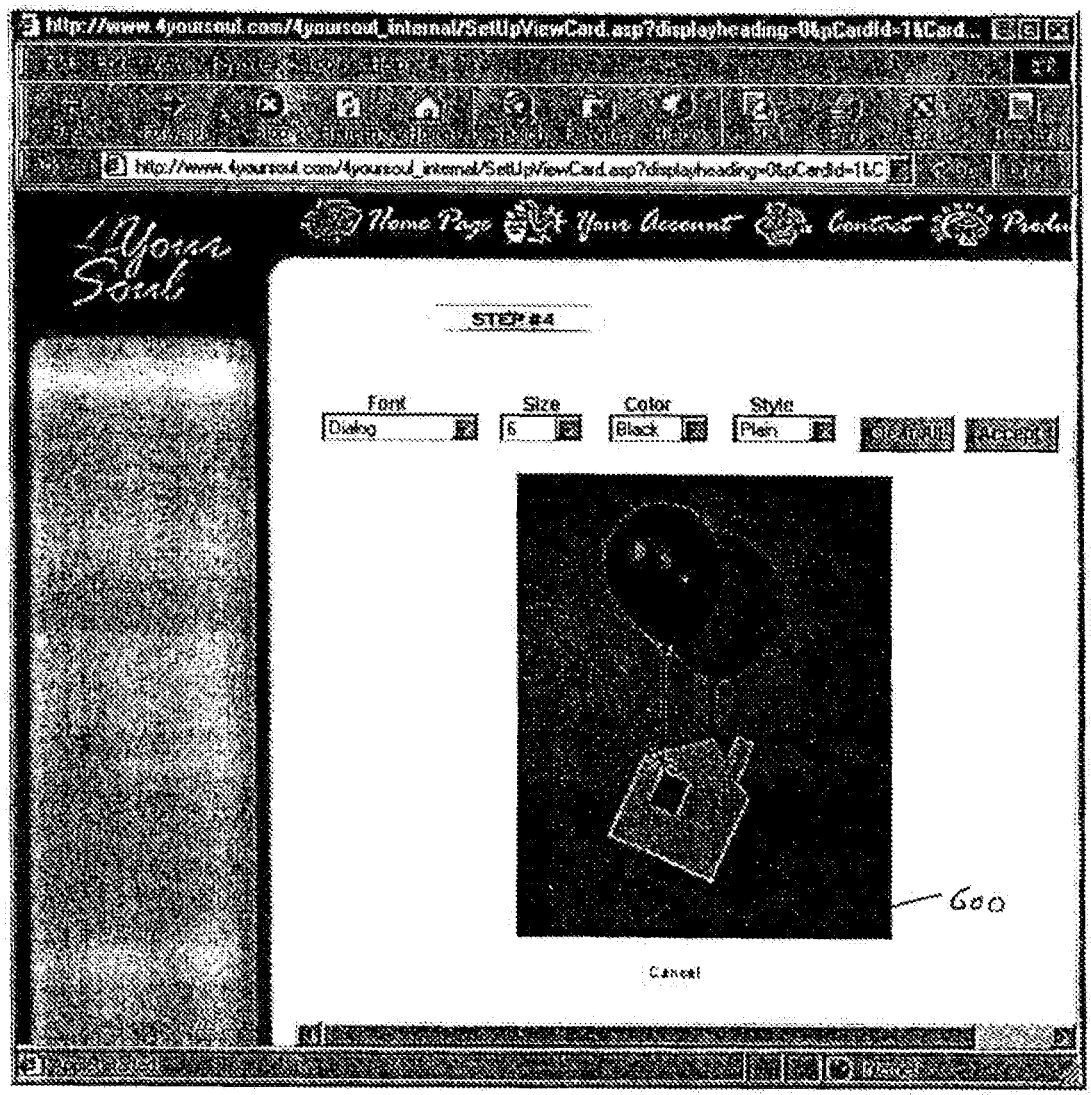
FIG. 6C is a screen capture of the graphic user interface of the inventive server illustrating an uncustomized card in accordance with the present invention.

In the illustrative embodiment, card 600 along with the other selectable cards are stored in a number of different formats and sizes. For example, to facilitate selection and customization, cards may be stored in database 280 as files in a thumbnail, intermediate and editable size. FIG. 6A is illustrates a selection of cards rendered in thumbnail size. FIG. 6B illustrates a card 600 in the intermediate size, as would be viewed by a network user following selection of the card. FIG. 6C illustrates a card 600 in editable size, as would be viewed by a network user during customization of the card. In database 280, the card files comprise graphical data, for example in bit map, .tif, .jpeg or other format, and may be arranged categorically according to particularly themes or occasion, e.g. birthdays, anniversaries, weddings, etc.

Figure 3:
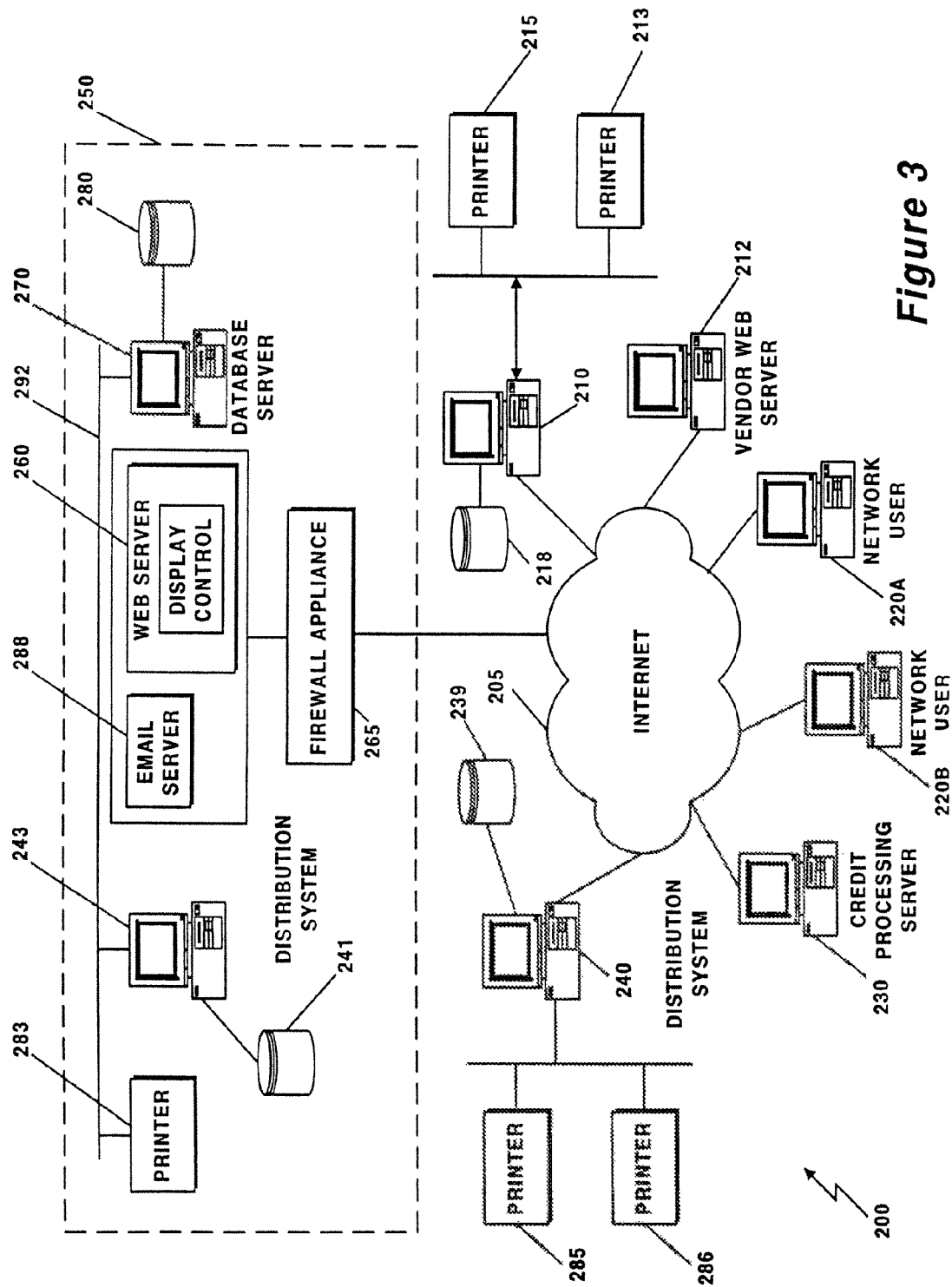
FIG. 3 is a conceptual block diagram of the elements of an alternative implementation of the inventive system in a network environment.

A fourth version of each card, from which the card is actually printed, is stored in any of databases 241, 239 and 218 of FIGS. 2-3. In these databases, the cards may be stored as an encrypted blob, e.g. a binary data file, for security purposes. This format may be obtained by encrypting the graphic data file of the card, for example, a .jpeg file, into a blob using any number of known commercially available encryption tools.

FIG. 6B illustrates card 600 as would be viewed by a network user on a web page 600 following selection of the card. As shown, card 600 is displayed with three panels 600A-C similar to the manner in which a card is viewed in hard copy or tangible form. A fourth side, 600D, not shown, may contain copyright information, vendor tracking information and various logos and trademarks of companies, as well as, possibly, the recipient's information.

Figure 6D:
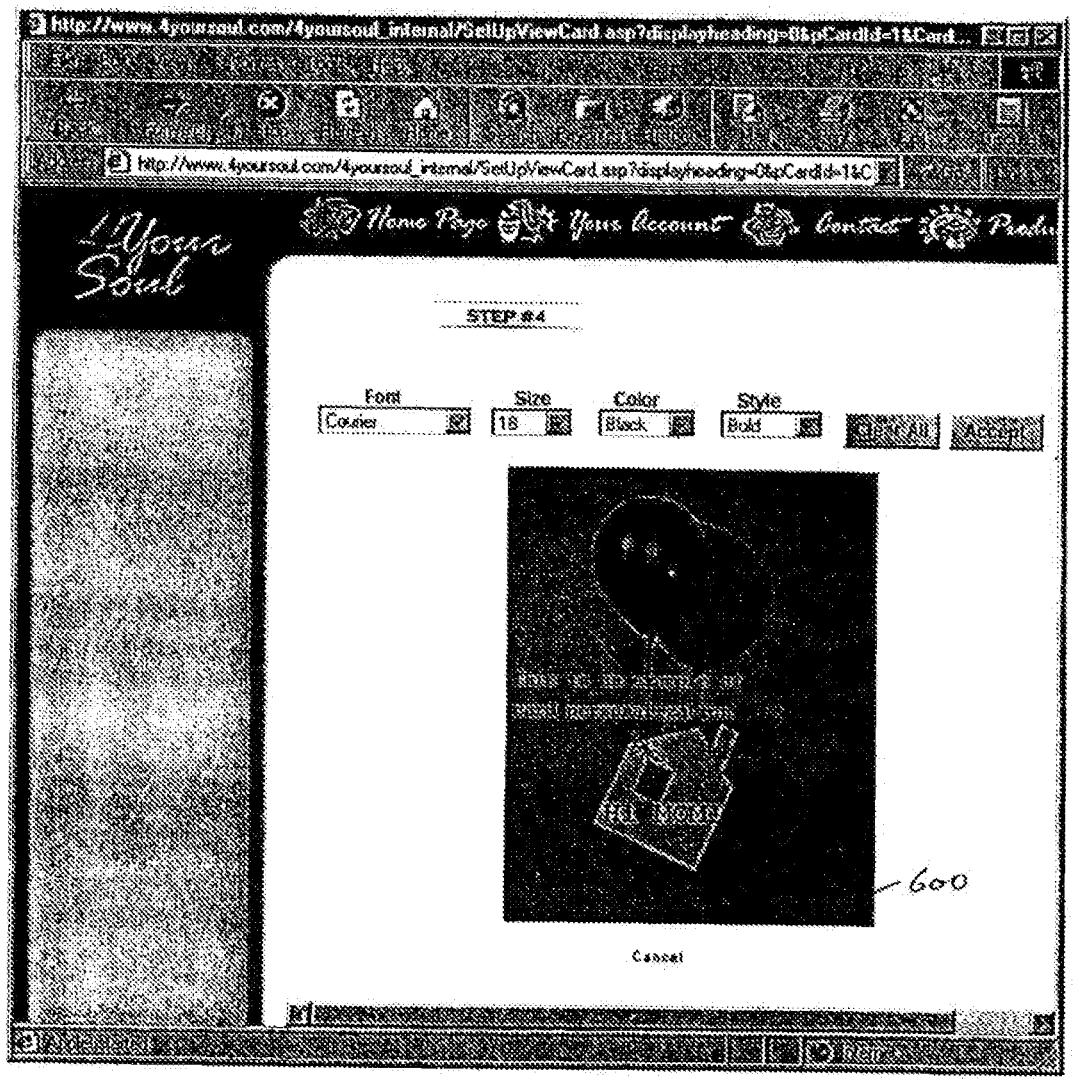
FIG. 6D is a screen capture of the graphic user interface of the inventive server illustrating a customized card in accordance with the present invention.

FIG. 6C illustrates card 600 as would be viewed by a network user in uncustomized form, in accordance with the present invention. Having selected a card, a network user utilizing a pointing device, such as a mouse or pen, designates the coordinates on the card at which text or graphics are to be placed, and, thereafter, enters the customizations to the card, for example by typing in the text to be added to the card at the designated location. In addition, the user selects the font type, font style, font color and font size of the text. In an alternative embodiment of the invention, the user is able to transmit scanned data representing hand written text or graphics to web server 260 and view the scanned data. Alternatively, the user may transmit a file containing photographic or other graphic data to be integrated into the card. FIG. 6D illustrates card 600 as would be viewed by a network user in customized form, in accordance with the present invention.

Control module 266 of web server 260 receives the coordinate information and other information describing the user's customizations, as recorded in customization table 408 and renders the card and the customizations in a What You See is What You Get (WYSIWYG) manner for viewing by the network user, as illustrated in FIG. 6D. In this manner, rather than just entering text into a dialog box for placement in a predetermined location, the user is free to place a customized message in any of text, cursive hand writing, graphics or photographs any where on panels 600A-C and view the card and customizations together in a manner which approximates signing a hard copy card. The WYSIWYG module which enables recording of a card with customizations from a network user is described in further detail herein. Control module 266 includes algorithms which detect the nature of the data transmitted by the network user and formats the data appropriately for presentation to the use. In the case of scanned data, control module 266 utilizes optical character recognition algorithms to separate and eliminate any background information from meaningful characters in the scanned data. In the case of photographic or graphic data files, control module 266 attempts to recognize the data format and render the data within the parameters of the designated panel including any required sizing or clipping of images to for the panel. FIGS. 6C-D illustrate a card 600 as displayed on web page, as seen by a network user in both stock, i.e., unmodified, and customized, i.e., modified form, respectively.

FIG. 6E-K illustrate other web pages, in accordance with the inventive system, as would be displayed to a system user who is utilizing the reminder service of the inventive system. The reminder service enables a network user to enter various information about upcoming events, including dates, descriptions and recipients. The reminder service notifies the network user via e-mail of an up coming event and enables the network user to select cards for the designated recipients using the system described here.

The construction of web pages containing the appropriate dialog boxes and pull down menus is within the scope of those reasonably skilled in the arts and will not be described in further detail hereinafter for the sake of brevity.

Method of Operation

Figure 7A:
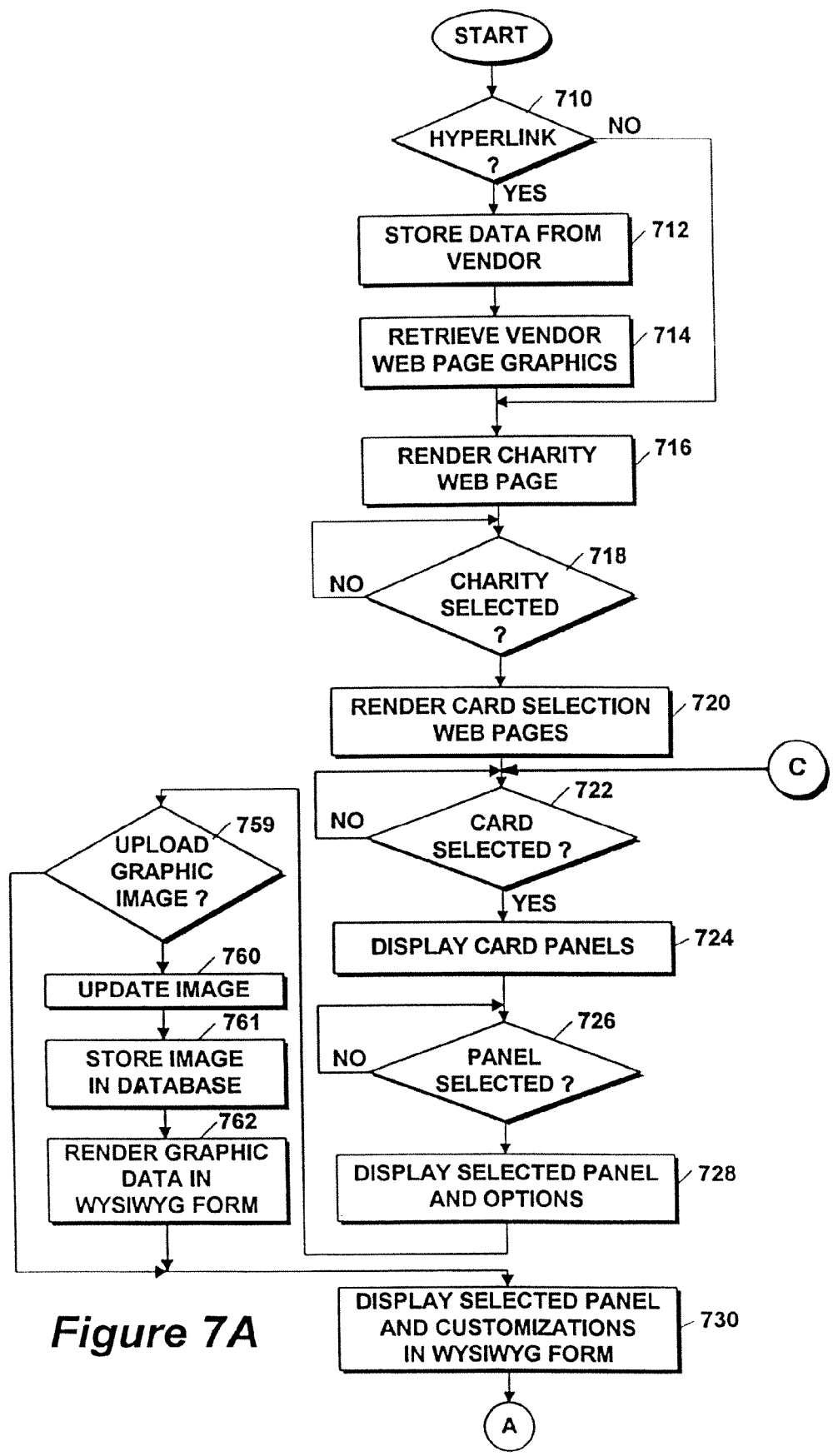
FIGS. 7A-C collectively form a flow chart illustrating the processes of customizing/creating a card in accordance with the present invention.
Figure 7B:
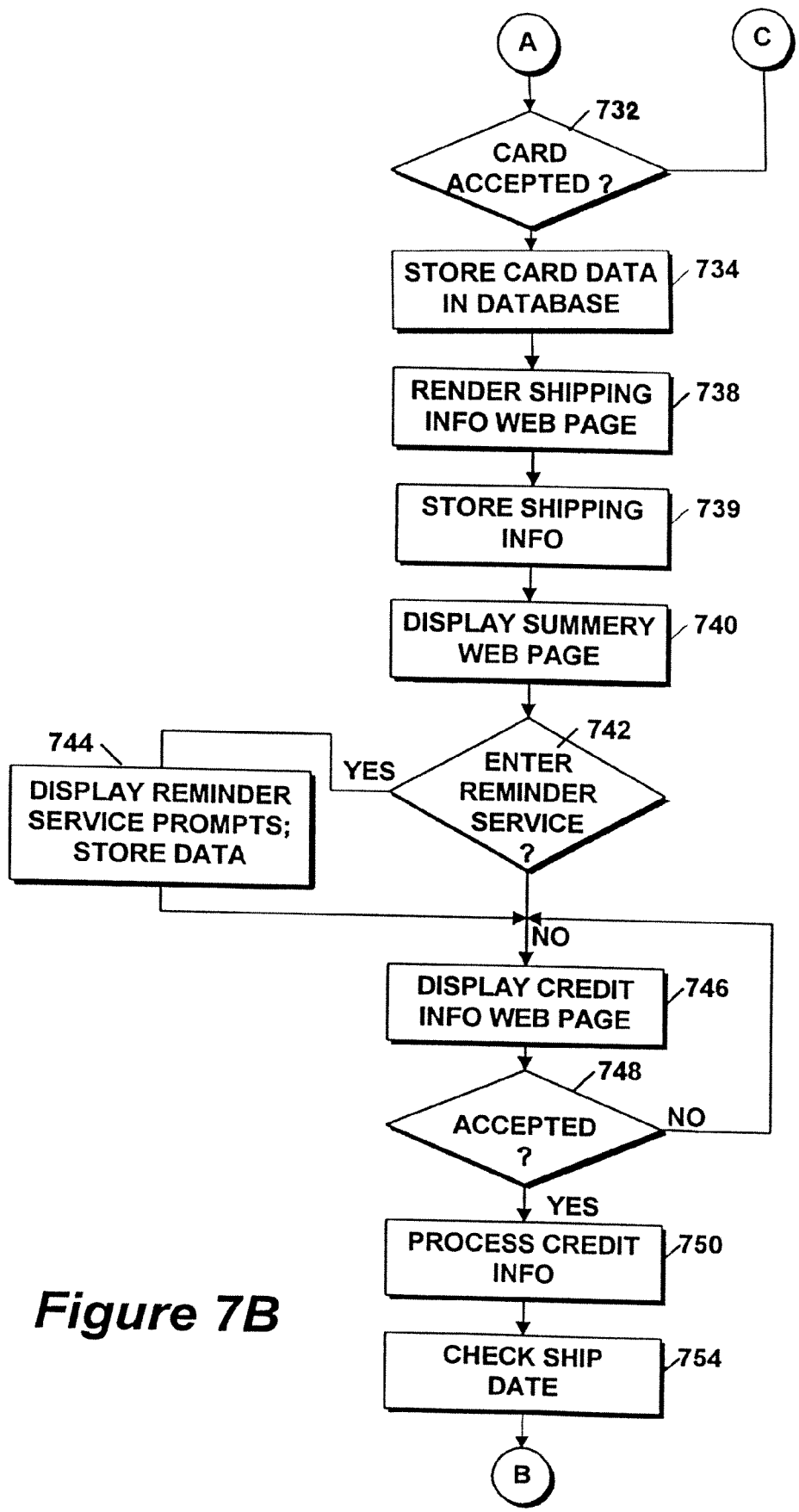
Figure 7C:
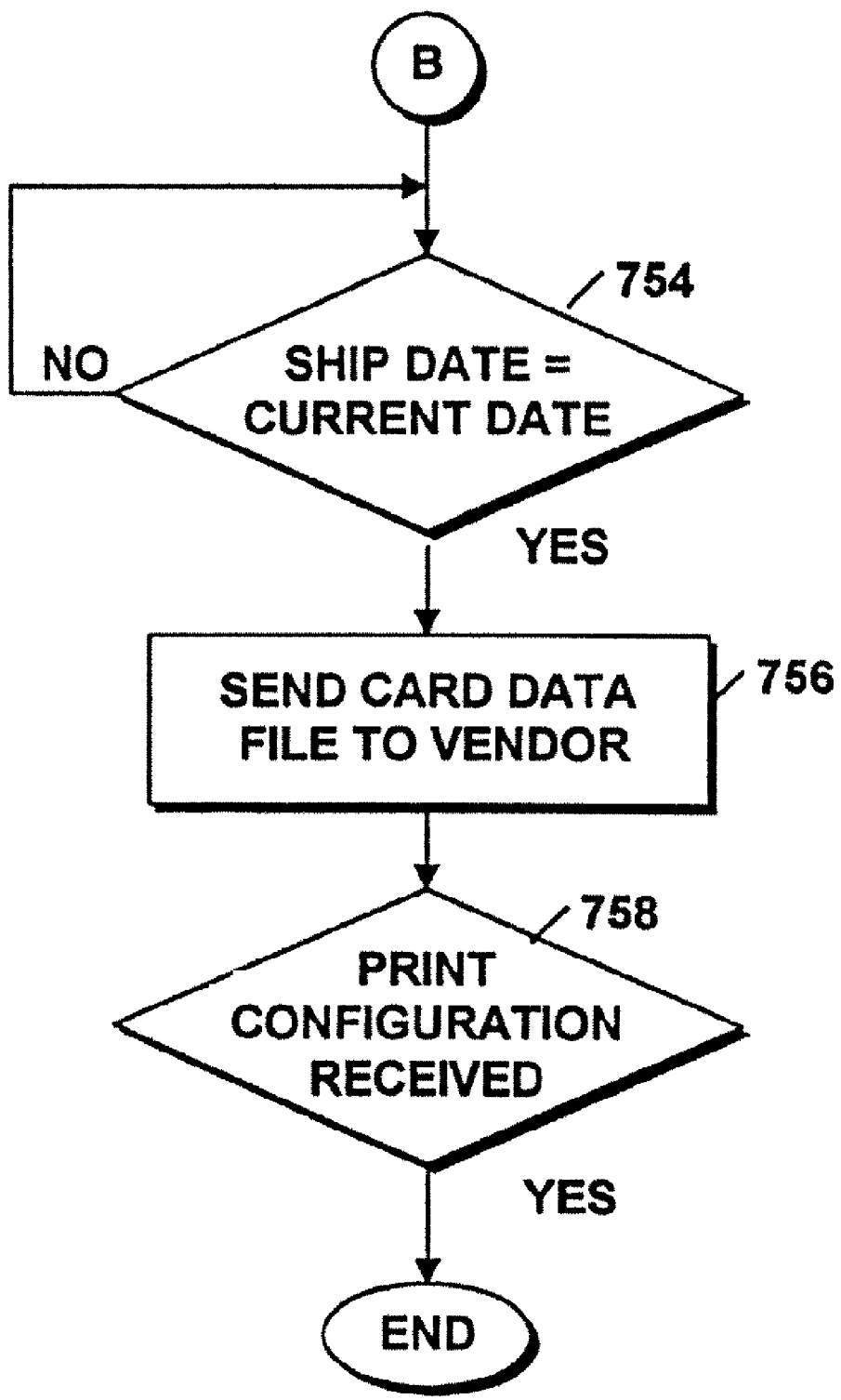

FIG. 7 is a flow diagram illustrating the process steps of the inventive method to enable a network user to select, customize/create and purchase a card from an eCommerce vendor for shipment with a gift or service purchased from the eCommerce network by the network user. Generally, a network user will be connected to system 250 either from a hyperlink from a vendor site or by directly connecting to server 260. When the network user is shopping on-line at an eCommerce vendor's site, and after the user has paid for his/her purchases, the network user is offered the option to order and create a custom card using the system previously described herein. If selected, the customer or network user is redirected, via a hyperlink from the client's website to the website of the inventive system, as illustrated by step 710. When the network user is redirected to web server 260, the vendor will provide web server 260 with a data structure 900, as illustrated in FIG. 9A. In the illustrative embodiment data structure 900 comprises a plurality of data fields including Invoice Number field 902, User Email field 904, Credit Card fields 906-914, Credit Card address fields 916-924, Client Identification Number field 926, and Gift List field 930, as explained in greater detail hereinafter. Invoice Number field 902 represents the vendor's invoice number for a transaction. User Email field 904 represents the email address of the user who has bought items at the vendor's web site. Credit Card Name 906 represents the name on the user's credit card. Credit Card Number field 908 represents the user's credit card number. Credit Card Exp. Year filed 910 represents the user's credit card's expiration year. Credit Card Exp. Month field 912 represents the credit card's expiration month.

Credit Card Type field 914 represents the user's credit card type, e.g. American Express, Visa, Master Card, etc. Credit Card Street1 field 916 and Credit Card Street2 field 918 represents the user's street address on the credit card. Credit Card City filed 920, Credit Card State field 922, and Credit Card Zip field 924 represents the user's city, state and postal zip code, respectively, on the credit card. Client Identification Number field 926 is used to identify the vendor from which the network user is being linked.

Gift List 930 represents a list of items purchased by the network user at the vendor's web site. Each item in Gift List 930, in turn, comprises an Invoice Line Item Number field 930A, SKU field 930B, Gift Description field 930C, Distribution Location Number field 930D, Date of Shipment field 930E, Ship To Person field 930F, Ship To City field 930G, and Ship To State field 930H, as explained in greater detail hereinafter. Invoice Line Item Number field 930A represents the line item number of the subject item on the vendor invoice. SKU field 930B represents the vendor product identification number. Gift Description field 930C represents a short description of the gift purchased. Distribution Location Number field 930D represents the vendor warehouse identifier from where the vendor will ship the subject specific gift, and, consequently, from which vendor system the card will be printed. Date of Shipment field 930E represents the date the vendor will ship the subject gift. Ship To Person field 930F represents the person to whom the subject gift will be shipped. Ship To City field 930G represents the city to which the subject gift will be shipped. Ship To State field 930H represents the state to which the gift will be shipped. Any number of additional items 932 may have a similar format to Gift Item 930.

In the illustrative embodiment of the invention, the data contained within data structure 900, particularly the credit card number and related information, may be encrypted using any number of commercially available software encryption products, such as those available from RSA Data Security Systems, Inc. The data structure would be encrypted at the vendor site and decrypted, as necessary by the inventive system 250.

Next, the various fields of data structure 900 are stored in database 280, and, where applicable, decrypted, as illustrated by step 712. The information about a user, the email address field, credit card information, etc. is stored in a User record 402 of the User table. The information about the gift purchased at the vendor web site is stored in User Gift Table 414.

Web server 260 then presents to the network user one or more web pages that make up a inventive graphic user interface that appears similar to that of the vendor from which the user was hyperlinked, as illustrated by step 714. The value of Client Identification Number field 924 identifies the vendor from which the network user is linking and is used as an index into tables ASPOBJ table 436 and ASPMAS table 434 to select the default colors, logos and graphics for that vendor, thereby creating the illusion that the network user is still shopping at the vendor's website. The information defining the graphics images required for each page for a specific vendor/client is stored in the Client Profile (CltProfile) table of database 280 and is rendered by web server 260.

Figure 6E:
FIG. 6E-K are screen captures of the graphic user interface of the inventive server illustrating various dialog screen through which a network user interacts with the system of the present invention.

In the illustrative embodiment of the invention, a portion of the proceeds of the sale of the card may be donated to charity. As illustrated in FIG. 6E, a web page is displayed allowing the network user to select a charity to which a portion of the sales will be donated, as illustrated by procedural step 716 and decisional step 718. If the network user is a registered user of the system, then the charity of their choice is shown by default. In either case, the user is allowed to change the charity to which the proceeds should be donated.

Next, web server 260 renders one or more web pages containing thumbnail images of cards. These web pages enable the network user to navigate through and select a card from database 280, as illustrated by procedural step 720. The network user can then choose a card by selecting the appropriate category and card, as illustrated by decisional step 722. Once the network user chooses a card, a web page illustrating three different panels (sides) of the card—the outside, the inner left, and the inner right—is rendered, as illustrated in FIG. 6B, and as illustrated by procedural step 724. The user can click on any panel of the card and the selected panel will be displayed in an editable format along with a number of dialog boxes which allow the network user to selectively customize the card using WYSIWYG technology.

As illustrated in FIG. 6C, the inventive system allows the user to choose a font, color, size, text and style of a customized message, as well as the location on the card panel at which the message will be received, as illustrated by decisional step 726 and procedural step 728. The user can then type text on the card and then move the text anywhere on the screen with a pointing device. Once written the user can edit the text, as well as change the color, font, size and/or the style of the text. The card and customizations are presented in a WYSYWIG format, by module 266, as illustrated by procedural step 730, and as illustrated in FIG. 6D. Module 266 receives the input parameters from the network user and renders the text in font, color, size, and style chosen and at the coordinated specified by the network user.

Module 266 may be implemented as a WYSIWYG application executing under the control of operating system on web server 260. Specifically, module 266 may be implemented as a JAVA application using object-oriented technology. Upon start-up, module 266 is provided with a list of parameters by web server 260. These parameters include the name of an image (card), the location of the image within the memory of web server 260, the dimensions of the image, and a list of instructions defining the position, color, size, font, style and text for each customization to be displayed on the card image. For a new card, which has not been customized by a network user, the list of instructions supplied to module 266 is empty, since there have been no customizations at that point. For a card that has been previously created or which is in the process of being edited, the parameter string supplied to module 266 may contain any of the information identified above. Module 266 creates a list of customization objects, each object storing information about a piece of text, such information including the actual text character string, the font, size, color, style, etc. and position data.

To avoid clutter in displaying the background image of the card as well as the customizations in WYSIWYG manner, module 266 displays one or more labels over the background of the card image. While editing the card, when a network user selects e.g., clicks with a mouse, a specific location on the card, module 266 reviews an internal list of customization objects maintained for that card to determine if the selected coordinates match the coordinates of any previously defined text object. If so, the text is displayed in an edit box with the font, style, size, etc., rendered according to the specification stored in the customization object. If the coordinates to do not match, a new empty box is displayed over the background of the card image using the customization characteristics selected by the network user from one or more menus. Once the network user saves a particular portion of text, the customization characteristics are stored in a customization object and the edit area is replaced with a corresponding label. The network user has the ability to select any text with a pointing device and drag the text around the background image of the card, thereby enabling the network user to position the text wherever desired. The background image of the card, along with the text, including the selected characteristics and position, are then rendered in a WYSIWYG manner enabling the network user to view the card as the card will look when printed.

If the network user desires to further modify any text customization to the card, they may simply do so by selecting the text object and then changing any of its characteristics, such as the color, size, style, etc, by simply clicking on the appropriate menus and choosing the desired option.

Once the network user has accepted all the customizations to the card, module 266 creates a string of customizations and forwards the attached string to a redirection URL that redirects the network user to a new page where the customization string data may be parsed and saved into the appropriate tables of database 280.

It will be obvious to others skilled in the art that the functionality of module 266, as described herein, may be implemented using different programming techniques other than object oriented technology and the JAVA programming environment.

In an alternative embodiment, as illustrated by the procedural steps 759-762, and to provide flexibility in personalization of cards, the network user may upload images that can be used to create custom cards. The network user can also upload scanned images of hand written messages and apply them to the card to create personalized graphics, photos or cursive fonts for the card. As shown in FIG. 7A, web server 260 determines whether a graphic image has been uploaded from the network client's system, as indicated by decisional step 759. If so, the image data file, which may represent graphical data in any number of standard formats or scanned data, is received by web server 260 and stored in the appropriate tables of database 280 as illustrated by procedural steps 760 and 761, respectively. Next, the file containing the graphic image data is rendered in WYSIWYG format in addition to or over the background image of the card, as illustrated by procedural step 762. In the illustrative embodiment, any number of commercially available software modules which render graphic data in a variety of different formats may be utilized to perform the functions illustrated by procedural step 762.

The network user is then given the option to accept all of the change to the card, as illustrated by decisional step 732. The data representing the customizations to a card are stored in database 280, as illustrated by procedural step 734. For example, Card Detail Detail (CardDetDet) Table 408 stores the specific pieces of text, the position, the color, font, etc., as well as information for any image data, photographic or scanned, as in step 760, that has been uploaded to web server 260.

Figure 6F:
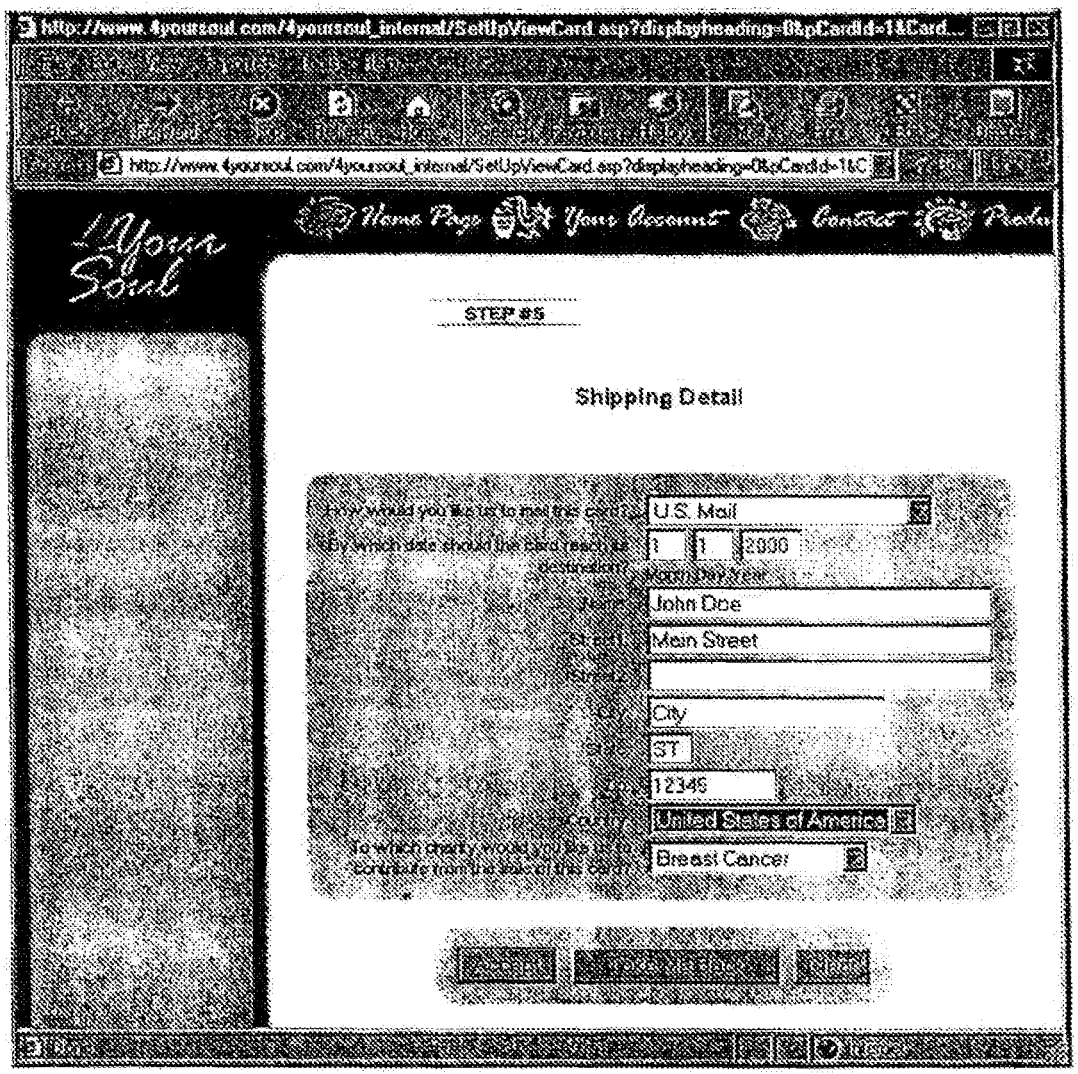

Next a web page, as illustrated in FIG. 6F will be rendered which allows the network user to specify information related to the recipient, as illustrated by decisional step 736 and procedural step 738. Card Detail (CardDet) Table 406 stores the macro information for a customized card, like ship date, price, shipping mode, the charity to which part of the proceeds from this card will go, etc. Card Shipping Information (CardShipInfo) Table 412 stores postal address information. If the card is to accompany a gift, then there is no information entered in table 412. Card Detail (CardDet) Table 406 stores the macro information for a customized card. The storing of such information in database 280 is illustrated as procedural step 739.

Figure 6G:
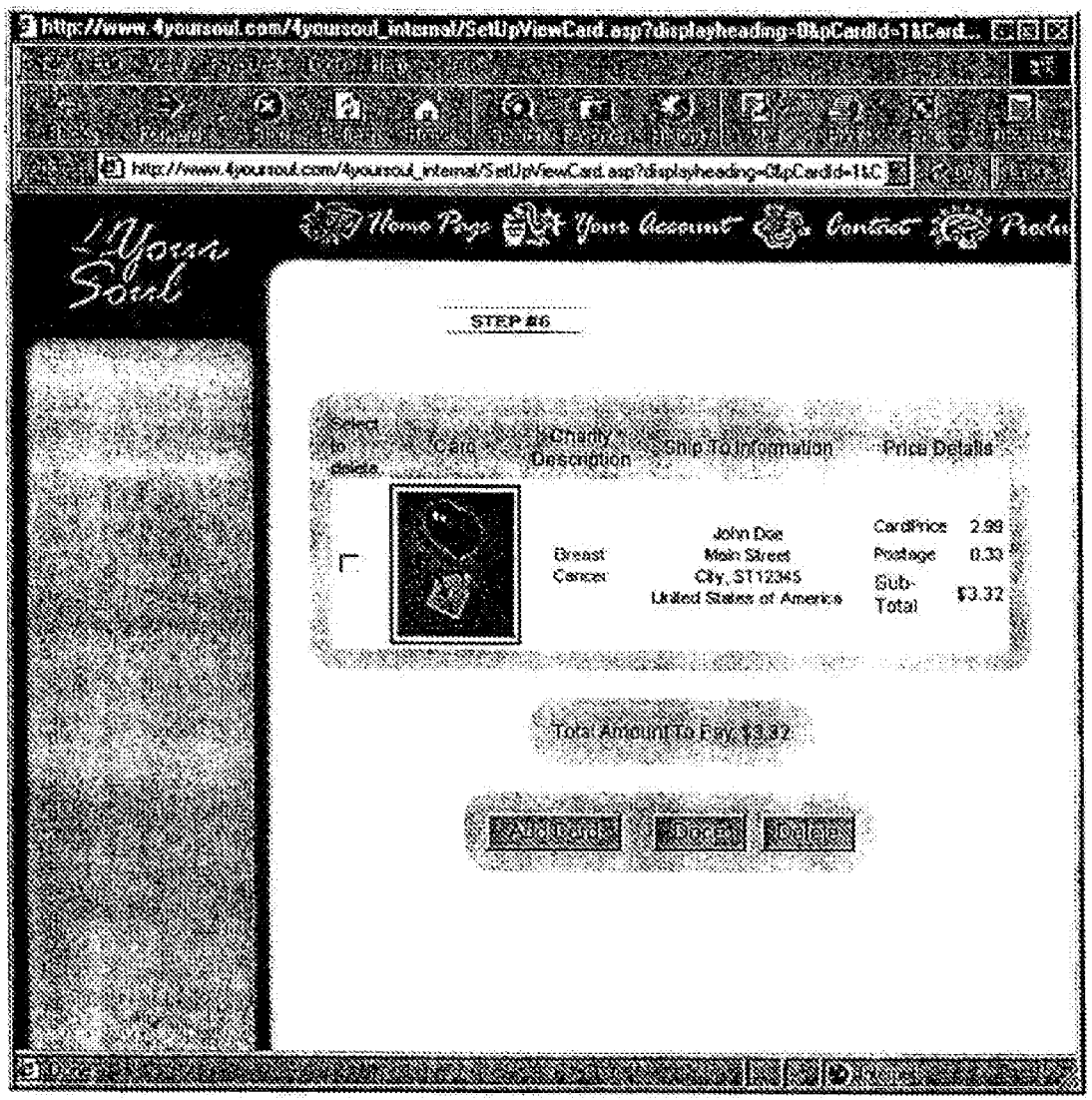

Next, the network user will be provided with a summary web page, as illustrated in FIG. 6G, which list the cards, charity, recipient information and price details, as well as with the option to add or delete cards, as illustrated by procedural step 740. At this point, the network user can edit any of the information or add or delete cards.

Figure 6H:
Figure 6I:
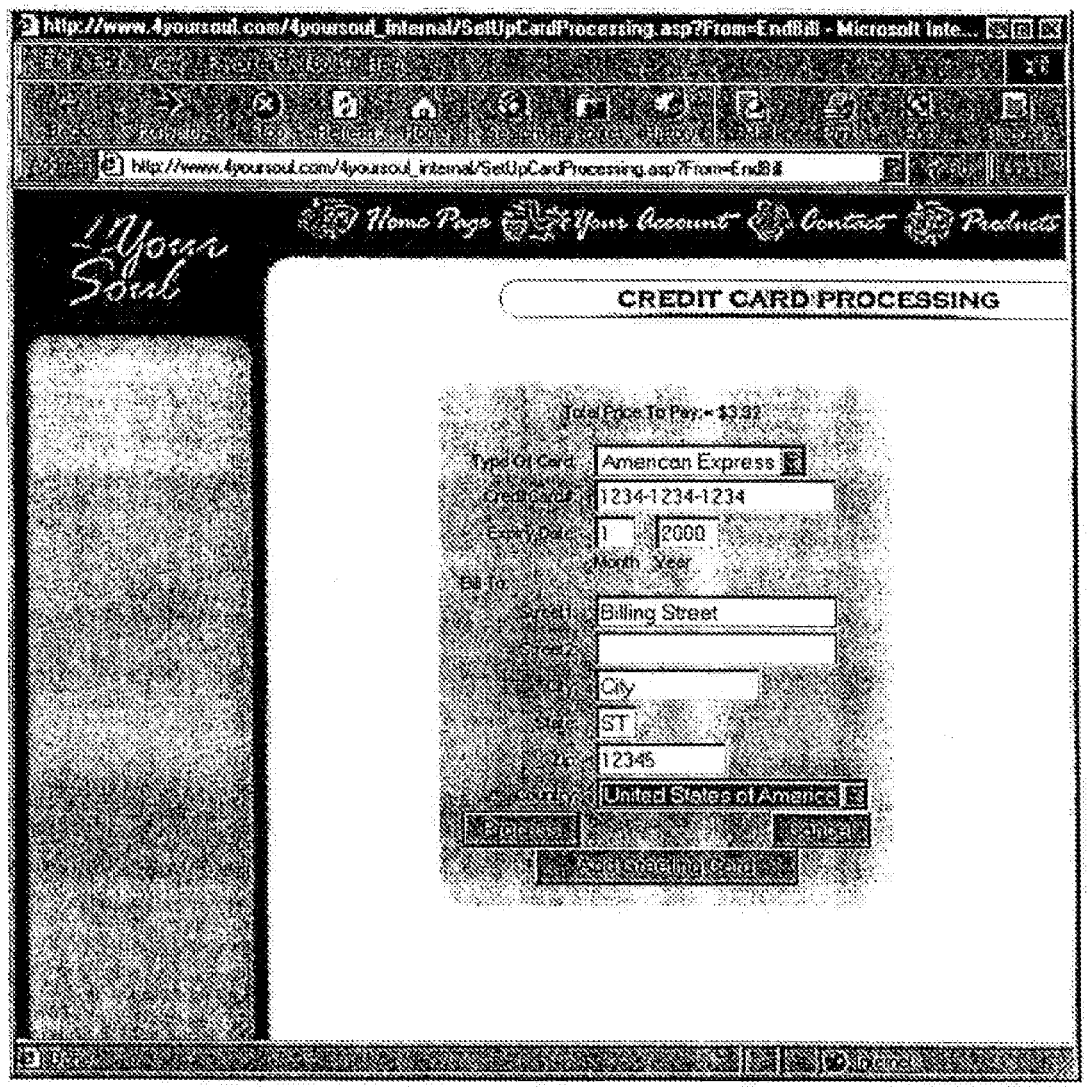
Figure 6J:
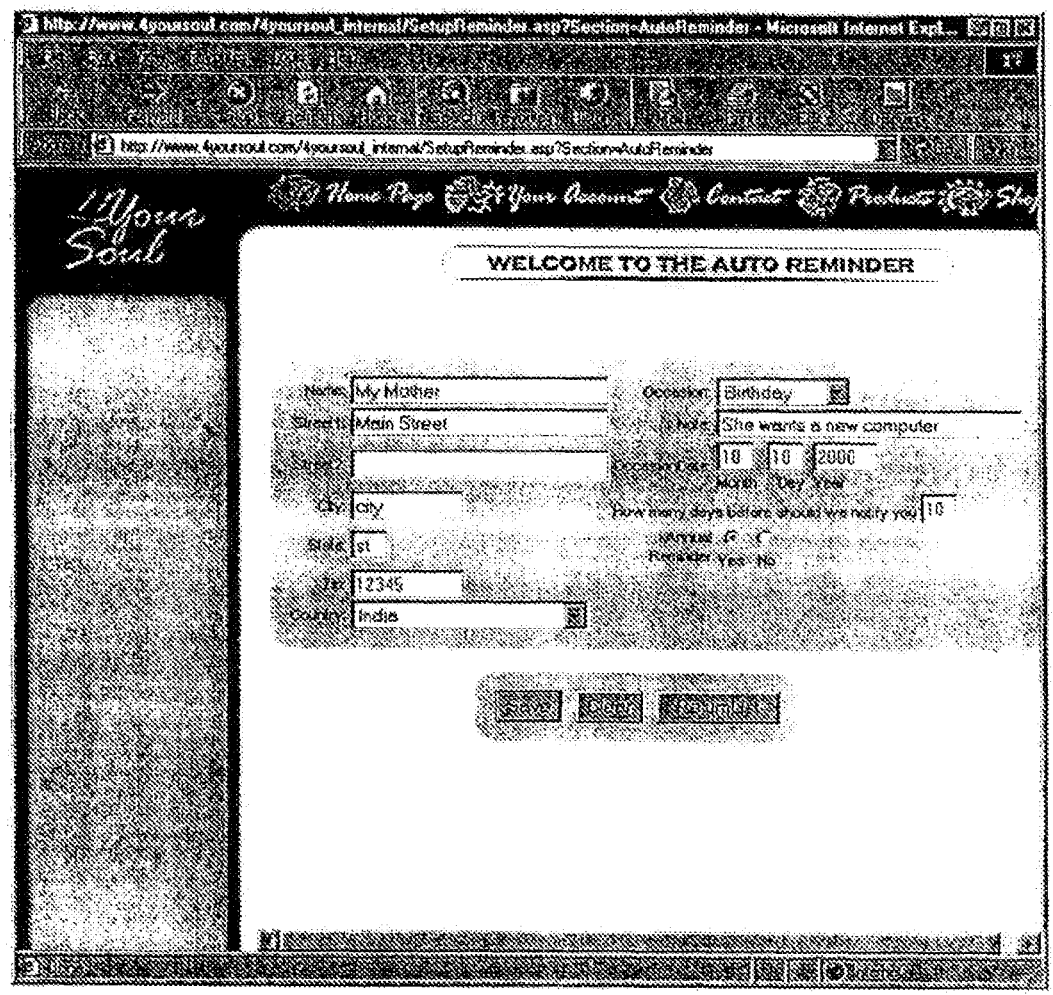
Figure 6K:
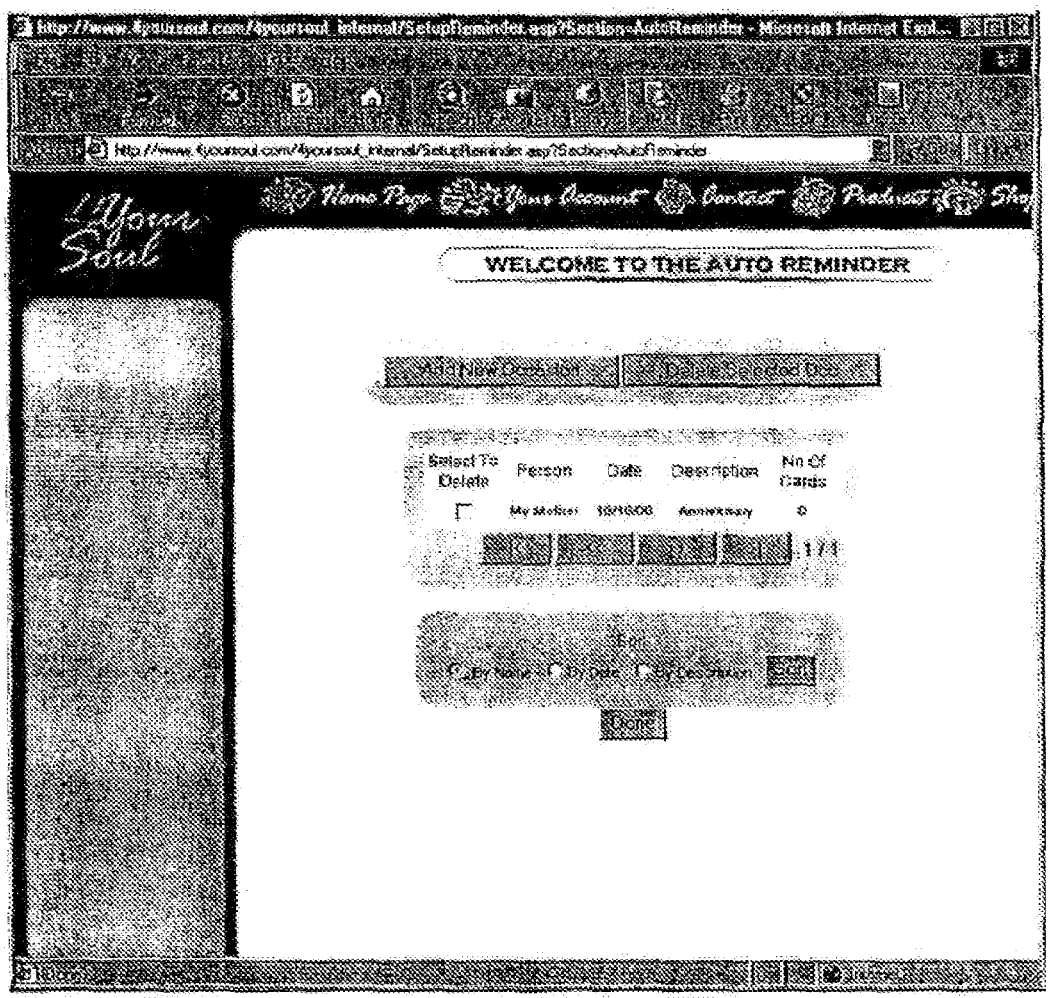

If finished, the network user will be prompted to visit the reminder service implemented in the inventive system, as illustrated in FIG. 6H, and as illustrated by decisional step 742. If the user chooses to enter the reminder service, web server 260 will render the web pages, as illustrated in FIGS. 6J and 6K, which prompt the user to enter the appropriate information, and as illustrated by procedural step 744. As illustrated, the reminder service allows a network user to enter various dates and description of occasions for which a reminder email will be sent prior thereto. In addition, the present invention allows the network user to select, customize/create and purchase cards, for mailing at an appropriate time in the future. For example, using the inventive system, a network user may select, customize and purchase birthday cards for selected friends and family members during a single session and have the card send to the designated recipient on the date designated by the network user. The data entered through the reminder service web page interfaces is stored in database 280. The email server 288 will send a reminder, for example, in the form of an email, to the network user prior to the occasion, as specified by the user. The Occasion Table 430 stores information regarding the specific events that the user wants to be reminded about. The Card Detail (CardDet) Table 406 stores any cards created in advance of an event. The CardDetDet and CardShipInfo Tables, 408 and 412, respectively, also store relevant information, as applicable.

After exiting the reminder service or, if in decision step 742, the network user opted not to enter the reminder service, the network user proceeds to checkout and payment, as illustrated by steps 746, 748 and 750. The network user is be provided with all the information that was received from the vendor regarding the user's credit card information, as illustrated in FIG. 6I and procedural step 746. If the information is acceptable, the network user selects the process option and the designated credit card will be charged the amount of the purchase. The information about the transaction is stored in database 280 and maintained to keep a historic record of the activity. The Invoice table 444 stores the credit card information which was used to pay for the transaction, the authorization code, etc. The Invoice Detail (InvDetl) Table 446 stores information at the line item level of the invoice in terms of which cards were charged on which invoice. The credit card information is transmitted from system 250 to a credit processing service, such as system 230 of FIG. 2 and as illustrated by procedural step 750. Once the transaction is processed a "Thank You" screen may appear, and the network user is returned to the vendor's web site. If at any time during the above described process a disconnect of the communication link between the network user and web server 260 occurs, an e-mail message is sent to the network user with a link back to web server 260.

Once the credit card transaction has been approved, web server 260 checks the Ship Date field of UserGift Table 414 to determine if the card is to be printed today, i.e. ship date equals current date, as illustrated by procedural step 752 and decisional step 754. If so, an email message will be sent to the vendor's distribution location to print the card, along with a file containing all of the information about the card, as explained hereinafter and as illustrated by procedural step 756. In case the card is to be sent at a later date, an email will be sent later. When the appropriate time comes to print the card, email server 288, will send a message to the appropriate the vendor location through, for example, email, Remote Procedure Call commands or MSMQ (Microsoft Message Queue). Once a day, at about midnight, or at another interval, a process on email server 288 sends emails to all the vendor locations regarding the cards to be printed during the day. There may be multiple emails sent to each vendor location. Each email will contain information for all the cards created by a single user during a single visit. The print process executing at the vendor system will send a message back to email server 288 indicating the card has been printed, as illustrated by decisional step 758, after which the process as for that card is concluded.

To print a card, web server 260 provides the vendor's distribution center, whether through an email or a batch process, the information from a user session, i.e., from the time the network user first connected to web server 260 until the user disconnects from web server 260. Since a network user may perform multiple transactions in a single session, the session information may include information for multiple transactions. In the illustrative embodiment, the session information may be transferred in a file 1000 having a format in accordance with the XML protocol. It will be obvious to those skilled in the art that other file formats or equivalent data structures may be used in place of file 1000. File 1000 is parsed and used to update database in the vendor system, as explained hereinafter.

File 1000 includes information from the UserGift table 414, i.e. records added to table 414 from a session, including data fields for the Invoice Number, Invoice Line Item Number, Gift Serial Number, Gift ID (SKU) Ship To Person Name, Ship To City, Ship To State, and Ship Date. The Invoice Number field represents the invoice number created by the vendor for the goods purchased by the network user at the vendor web site. The Invoice Line Item Number field represents the invoice line item number created by the Vendor. The Gift Serial Number field represents a unique identification number given by the inventive system to the gift item. The Gift ID field is the vendor identifier for the product, e.g., the SKU. The Ship To Person Name field represents the name of the person to whom the gift will be shipped. The Ship To City field represents the city to which the gift will be shipped. The Ship To State field represents the state to which the gift will be shipped. The Ship Date field represents the date required by the Vendor to print the card for the gift, e.g. the day it will leave the vendor's distribution location.

File 1000 includes information from the CardDet Table, i.e. information which regarding cards created and base card information, including data fields for the Card Serial Number, Card Id, and Card Status. The Card Serial Number field represents a unique identifier, e.g. a number, assigned to any card created at web server 260. The Card Id field represents card number, e.g. SKU, assigned to the card by the inventive system. The Card Status field represents the current status of the card, e.g. printed, to be printed, etc.

File 1000 further includes information from the CardGift table 426, i.e. information which associates a card with a gift and a network user, including data fields for the Card Serial Number, Gift Serial Number, User Id and Transaction Id. The Card Serial Number and Gift Serial Number fields have been previously defined. The User Id field represents a unique identifier assigned to a particular network user by the inventive system. The Transaction Id field represents a unique identifier assigned to by the inventive system to uniquely identify every session of a network user on the inventive system.

File 1000 further includes information from the CardDetDet table, e.g. information regarding the text to be superimposed on the card or graphical information which will be superimposed. Such graphical information may include picture, photo or a scanned hand written message. The information from the CardDetDet table includes data fields for the Card Serial Number, Line Item Number, Card Page, X Position, and Y Position. The Card Serial Number field has been previously defined. The Line Item Number field represents a unique counter for every piece of customization in a given card. The Card Page filed identifies on which face or panel of the card the text will be printed. The X Position and Y Position fields identify the location of the text on the face of the card.

If part of the customizations to the card include text, then data fields for the Text Color, Text Font, Text Size, Text, and Text Style will be incorporated into file 1000. The Text Color field identifies the color in which the text will be rendered. The Text Font field identifies the font in which the text will be rendered. The Text Size field identifies the size of the font in which the text will be rendered. The Text field identifies the subject matter which will be rendered. The Text Style field identifies the style of the font in which the text needs to be rendered.

Otherwise, if part of the customizations to the card include an image, an Image Name field, identifying the name of the attached file which will be superimposed onto the card, will be included with file 1000. A sample file 1000 in XML format is set forth below.

```
<?XML VERSION="1.0"?>
<Print>
<VERSION>Print Info 1.0</VERSION>
    <Transactions>
        <Transaction>
            <UserGifts>
                <UserGift>
                    <UGInvNo>123123</UGInvNo>
                    <UGInvLINo>1</UGInvLINo>
                    <UGSrno>332</UGSrno>
                    <UGGiftId>1</UGGiftId>
                    <UGShipPerson>Sandy</UGShipPerson>
                    <UGShipCity>Mumbai</UGShipCity>
                    <UGShipState>MH</UGShipState>
                    <UGShipDate>1/12/1999</UGShipDate>
                </UserGift>
                <UserGift>
                    <UGInvNo>123123</UGInvNo>
                    <UGInvLINo>2</UGInvLINo>
                    <UGSrno>333</UGSrno>
                    <UGGiftId>2</UGGiftId>
                    <UGShipPerson>Smith</UGShipPerson>
                    <UGShipCity>Banglore</UGShipCity>
                    <UGShipState>KR</UGShipState>
                    <UGShipDate>4/11/1999</UGShipDate>
                </UserGift>
            </UserGifts>
            <CardDets>
                <CardDet>
                    <CDSrno>1251</CDSrno>
                    <CDCardId>4</CDCardId>
                    <CDStatus>S</CDStatus>
                </CardDet>
            </CardDets>
            <CardGifts>
                <CardGift>
                    <CGCDSrno>1251</CGCDSrno>
                    <CGUGSrno>333</CGUGSrno>
                    <CGUserId>930</CGUserId>
                    <CGTransId>1</CGTransId>
                </CardGift>
                <CardGift>
                    <CGCDSrno>1251</CGCDSrno>
                    <CGUGSrno>332</CGUGSrno>
                    <CGUserId>930</CGUSerId>
                    <CGTransId>1</CGTransId>
                </CardGift>
            </CardGifts>
            <CardDetDets>
                <CardDetDet>
```

-continued

```
        <CDDSrno>1251</CDDSrno>
        <CDDSrno1>1</CDDSrno1>
        <CDDColor>-16777216</CDDColor>
        <CDDPage>FI</CDDPage>
        <CDDFont>Dialog</CDDFont>
        <CDDSize>6</CDDSize>
        <CDDText>HI PAL!</CDDText>
        <CDDXPos>210</CDDXPos>
        <CDDYPos>212</CDDYPos>
        <CDDStyle>0</CDDStyle>
      </CardDetDet>
      <CardDetDet>
        <CDDSrno>1251</CDDSrno>
        <CDDSrno1>2</CDDSrno1>
        <CDDColor>-16777216</CDDColor>
        <CDDPage>F</CDDPage>
        <CDDFont>Dialog</CDDFont>
        <CDDSize>6</CDDSize>
        <CDDText>HAPPY BIRTHDAY</CDDText>
        <CDDXPos>235</CDDXPos>
        <CDDYPos>200</CDDYPos>
        <CDDStyle>0</CDDStyle>
      </CardDetDet>
    </CardDetDets>
  </Transaction>
 </Transactions>
</Print>
```

Client System

Figure 8:
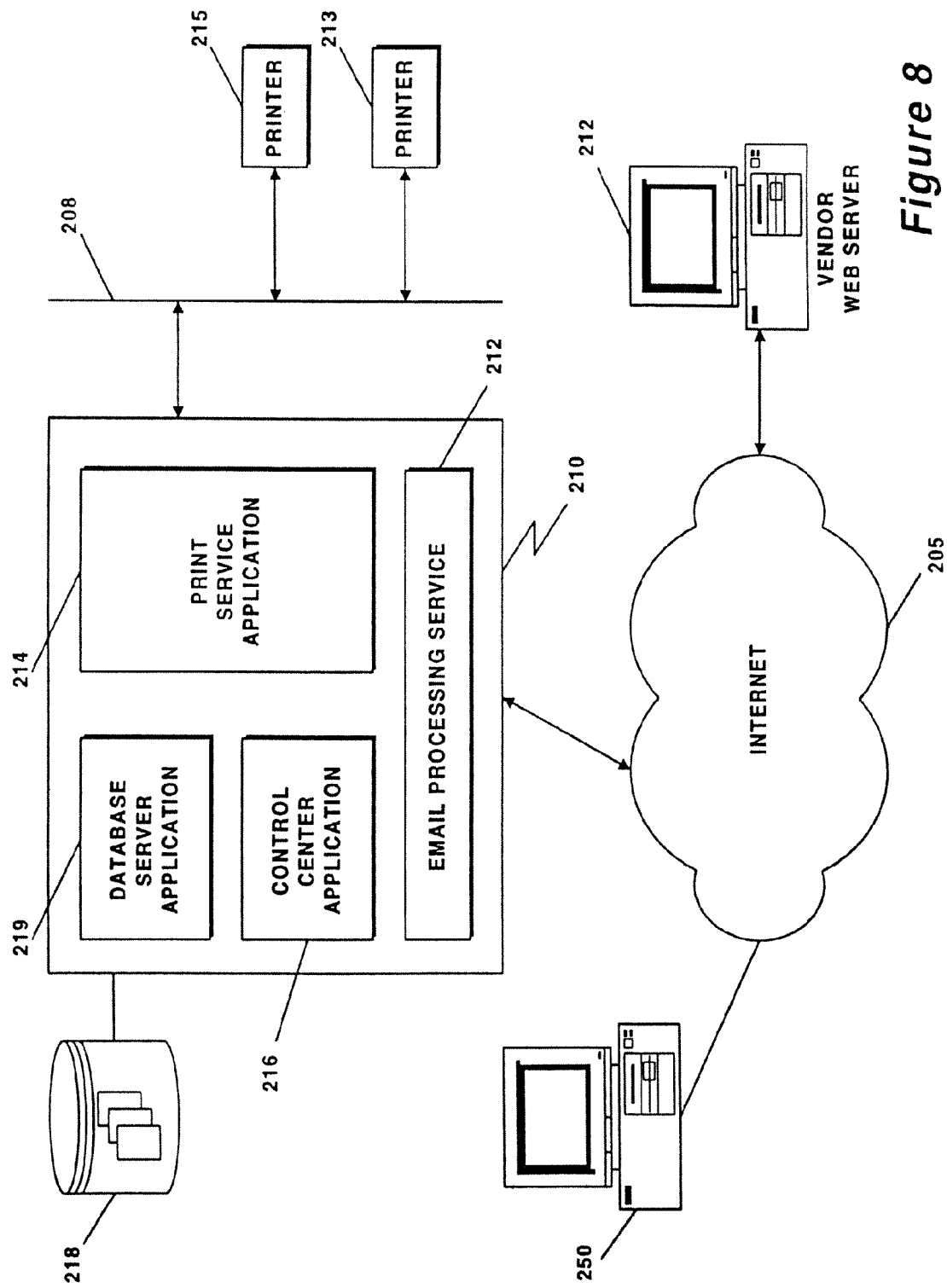
FIG. 8 is a conceptual block diagram illustrating the elements of the inventive vendor system in accordance with the present invention.

Referring to FIG. 8, a conceptual block diagram of a vendor (client) system 210 is illustrated. System 210 will typically be located at an eCommerce vendor's distribution center and may be connected through a public computer network to system 250. In addition, system 210 is coupled through a private network 208, such as a LAN, to printer 215 and printer 213. Vendor system 210 may be implemented with a computer hardware platform similar to that described with reference to FIG. 1 executing an operating system, such as Windows NT 4.0. As illustrated in FIG. 8, an email processing service application 212, print service application 214, database server application 219 and control center application 216 execute on computer system 210 under the control of the operating system. A database 218 coupled to system 210 contains tables 804-866, as described with reference to FIG. 10, as well as the collection of base cards as previously described. Alternatively, the cards, as stored in one of the previously-described formats. Alternatively, the cards may be encrypted and stored as binary blobs which are decrypted upon printing thereof.

Email processing service 212 is responsible for periodically polling email server 288 of system 250 to see if any messages have been posted. If there are messages, email processing service 212 will down load and process the messages. Processing of the messages includes parsing the XML file 1000 contained within the email message and using the data values defined therein to update database 218 of vendor system 210. The XML file 1000, in the illustrative embodiment, may contain SQL database queries which are used to update database 218 of client system 210.

Figure 10:
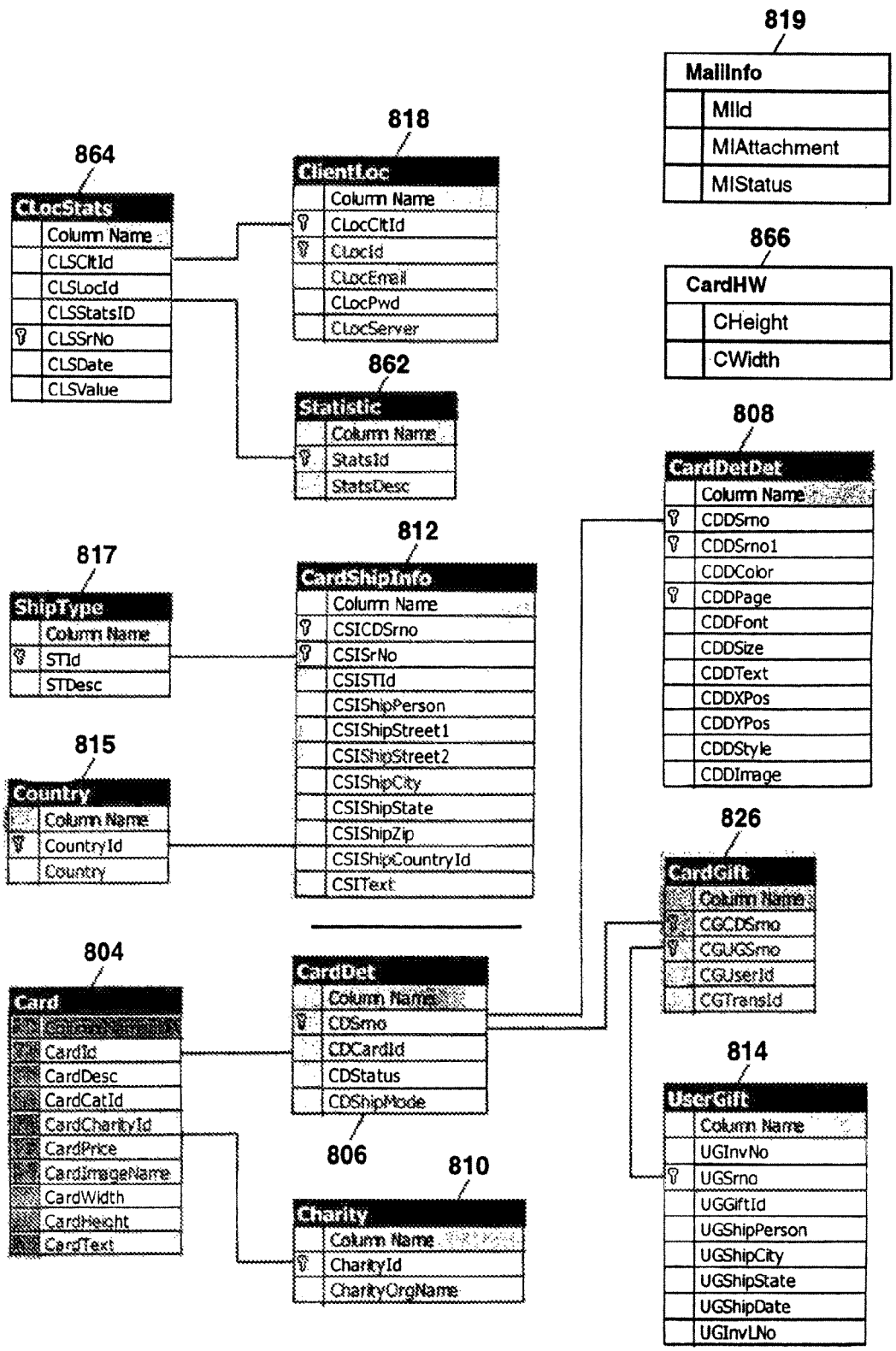
FIG. 10 illustrates conceptually the construction of the vendor database and the information contained therein.

FIG. 10 illustrates conceptually the tables which comprise database 218. Each record, as shown, includes one or more fields and an associated field descriptor, as illustrated. Multiple records of the same type, in turn, collectively form a table within database 218. A field within a record may serve as an index into another record. To further a better understanding of the architecture of database 218, the major tables, as illustrated conceptually by single record and its corresponding fields, are described below in greater detail.

Card Table 804 is used to maintain information about a specific card of the master card list. Each record of Card Table 804 includes fields for a card identifier, price, card catalog identifier, text description, width and height of the card, a charity identifier, etc. The corresponding field descriptions, e.g. integer, variable character, number, etc., are illustrated in FIG. 10. In the illustrative embodiment, the actual cards may be stored in any graphical format, for example, jpg, gif, tif or bmp. The cards may be stored as part of or separate from database 218, as well as locally in the memories of vendor systems 210 and distribution system 240 connectable to system 250.

Card Detail Table 806 (CardDet) is used to maintain information about a specific card which has been ordered by a network user. Each record of Card Detail Table 406 includes fields for the ship date, ship month, status, etc. The corresponding field descriptions are illustrated in FIG. 10.

The Card Detail Detail Table 808 (CardDetDet) is used to maintain information about changes or customizations made to the card by the network user. Each record of the Card Detail Detail Table 808 includes fields defining fields the font, size, color, text, X-position, Y-position, style, file name for an attached file containing graphics, digital photos, scanned data, etc. The corresponding field descriptions are illustrated in FIG. 10.

Charity Table 810 is used to maintain information relating to a specific charity from which proceeds of the card sale may be donated, as explained in greater detail hereinafter. Each record of Charity Table 810 includes fields for a charity identifier, and organizational name. The corresponding field descriptions are illustrated in FIG. 10.

The remaining tables of FIG. 10 include records having the information fields and field descriptors, as illustrated. For example, the Card Ship Info Table 412 includes information relevant to the address to which the card is to be shipped. The UserGift Table 814 includes information about a gift with which the card is associated. The CardGift Table 826 includes information useful in coordinating the printing of a card with shipment of a specified gift from a vendor's facilities. Tables 814-866 include the information fields and field descriptors, as illustrated in FIG. 10, some of which are subsets of similar tables from database 280. The records 804-866 of database 218 are related, as illustrated in FIG. 10 and which are self-explanatory. In particular, a specific entry of one table may be used as an index into a record of another table, as illustrated in the listing below in which each entry has the form:

| [Tablename.Fieldname] | REFERENCES [Tablename.Fieldname] |
| --- | --- |
| [Card.CardCharityId] | REFERENCES [Charity.CharityId] |
| [CLocStats.CLSCltId & CLSLocId] | REFERENCES [ClientLoc.CLocCltId & CLocId] |
| [CLocStats.CLSStatsID] | REFERENCES [Statistic.StatsId] |
| [CardDet.CDCardId] | REFERENCES [Card.CardId] |
| [CardDetDet.CDDSrno] | REFERENCES [CardDet.CDSrno] |
| [CardGift.CGCDSrno] | REFERENCES [CardDet.CDSrno] |
| [CardGift.CGUGSrno] | REFERENCES [UserGift.UGSrno] |

When a print message arrives, service 212 will update database 218 and set an event to notify the print service 214 that a print request has been received. Email processing service 212 is also responsible for sending any messages that are generated the other applications executing on vendor system 210. When not busy, email service 212 waits on a send event. Such event is set either by the vendor control center 216 or print service 214. If either application 214 or 216 has created an email for system 250, the application will set an event which service 212. Email processing service 212 will establish a connection with system 250 and transmit the email to system 250.

Print service 214 remains idle until an event notification of a pending print instruction. When email processing service 212 receives the print command it sets the notification event for print service 214. Print service 214 then queries database 218, and, using the data values previously stored in database 218 by email processing service 212, prints the card on printer 215 or another available printer. Print service 214 may also monitor printer problems such as paper jams, low toner, no paper, etc. Print service 214 will notify system 250 of any problem encountered during the printing process by creating an email, placing it in a queue and generating a notification event for email processing service 212 that an email needs to be sent to system 250.

A high resolution color printer 215 capable of printing photographic quality images may be coupled to vendor system 210 to facilitate printing of the cards. Such a printer suitable for use with the present invention is the HP 8500DN, commercially available from Hewlett Packard Corporation, Palo Alto, Calif. In the illustrative embodiment, cards are printed in a full bleed format, i.e. up to the edge of the paper and on high quality stock paper, giving the card the appearance of a traditional greeting card. Alternatively, the cards may have a border around the edge of the stock on which the card is printed. Thereafter, at the client/vendor's facilities, typically a distribution center, the card may be inventoried and matched with the designated gift for shipment.

At the vendor's facilities, the card is printed with an invoice number, invoice line item number and a card number thereon. In the illustrative embodiment, the invoice number, the invoice line item number, and card number may be printed on the back panel of the tangible card using, for example, an optical bar code or other format to identify both the card and the invoice number, client transaction code or other information useful by the vendor to match the card with a particular gift of transaction.

Vendor control center service 216 allows a user at the vendor's distribution location to request a reprint of a card, in case it has been damaged or for any reason. Service 216 also provides the users with the ability to quickly send an email to and interact with system 250 directly. Accordingly, service 216 allows the vendor location to request the re-transmission of data and files relating to certain cards in the event of data loss or corruption.

Although the above-described illustrative embodiment has been implemented using email addresses as a communication mechanism between system 250 and vendor system 210, it will be obvious to those reasonably skilled in the arts that other messaging techniques may be used, such as any number of commercially-available Remote Procedure Call library utilities, as well as the Microsoft Message Queue, (MSMQ) commercially available from Microsoft Corporation, Redmond, Wash.

Figure 11A:
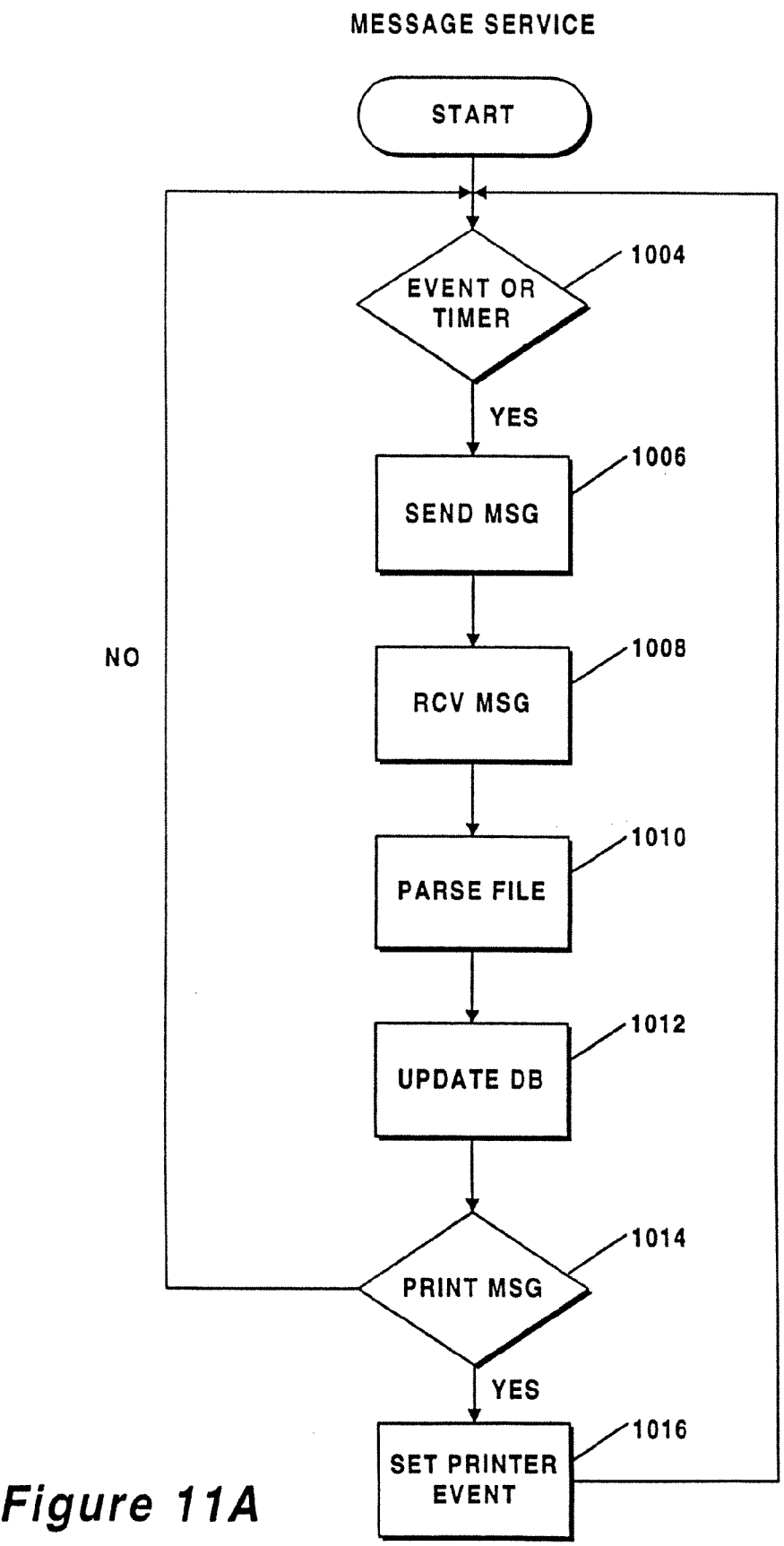
FIGS. 11A-C are flow charts illustrating the processes performed by a client system to print a card in accordance with the present invention.
Figure 11B:
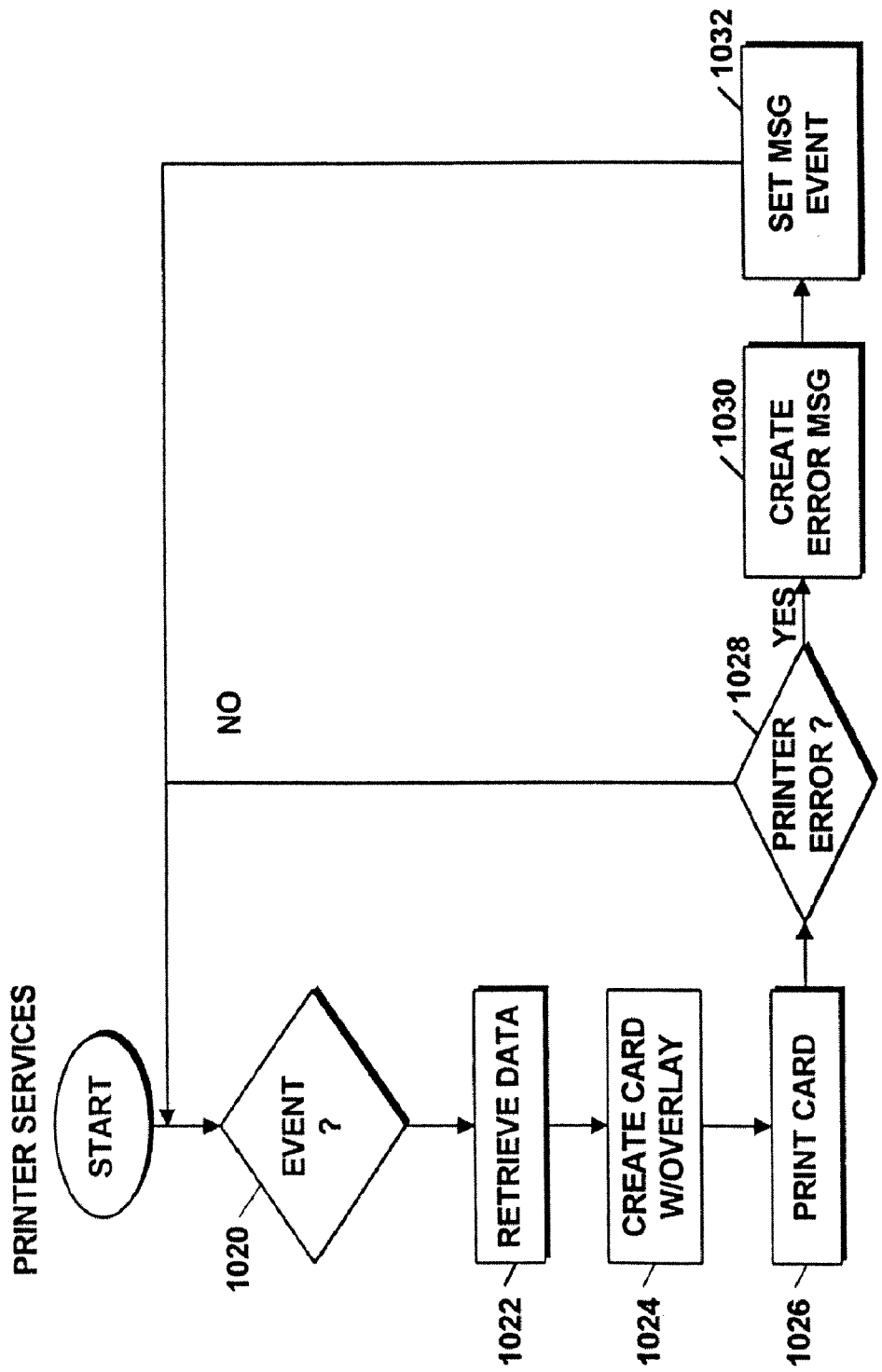
Figure 11C:
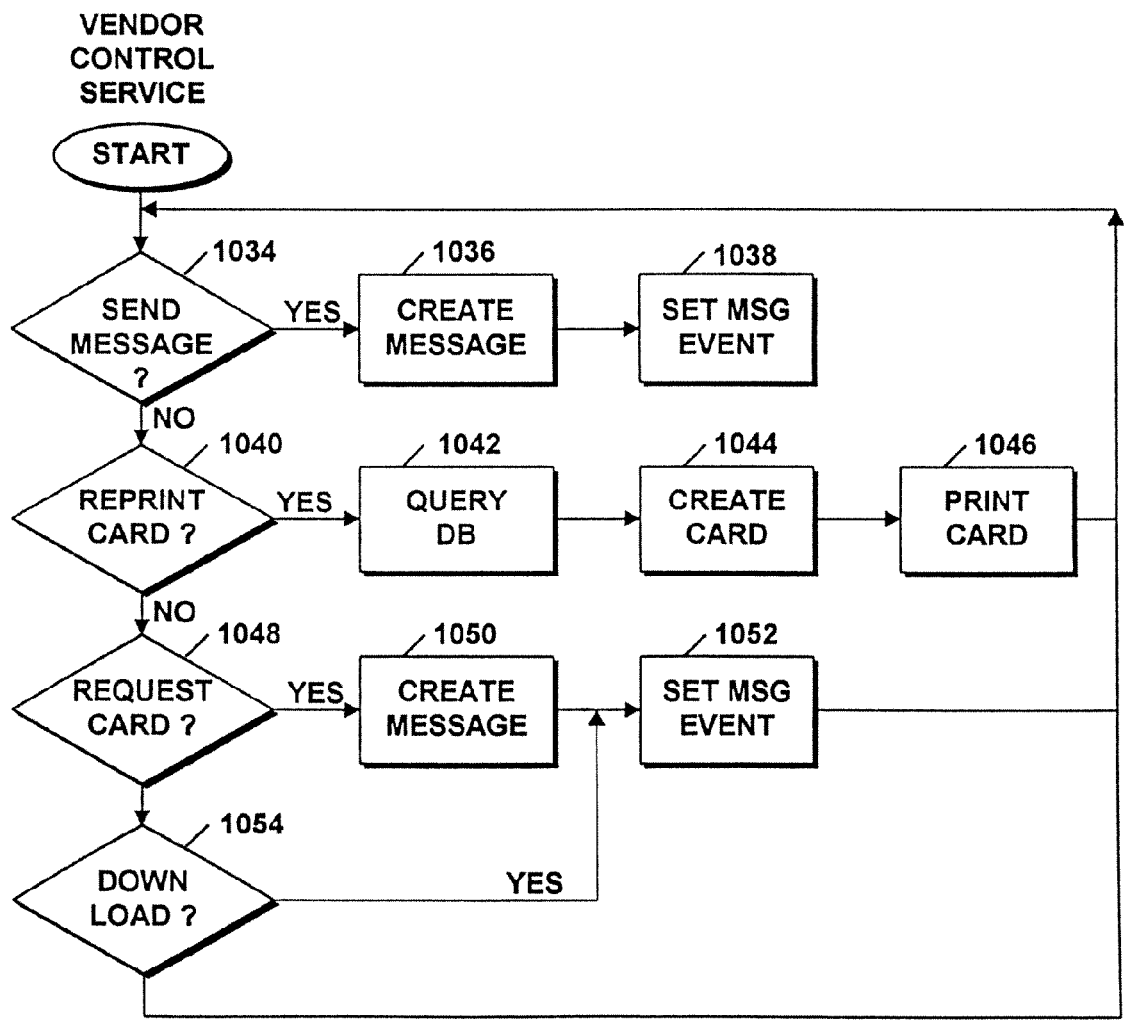

FIGS. 11A-C are flowcharts illustrating the processes performed by vendor system processes 212, 214 and 216 in accordance with the present invention. Specifically, referring to FIG. 11A, if a notification event for email processing service 212 has been received or generated by a timer, as illustrated by decisional step 1004, service 212 will send the email message to system 250, as illustrated by procedural step 1006. If a message has been received, the message will be downloaded to system 210, as illustrated by procedural step 1008. Email processing service 212 will parse the XML file attached with the email and extract the values for the data fields contained therein, as illustrated by procedural step 1010. Service 212 will store the values of the extracted data in database 218 of system 210, as illustrated by procedural step 1012. Thereafter, if an email message instructing the system 210 to print a card is received, service 212 will generate a notification event for print service 214, as illustrated by decisional step 1014 and procedural step 1016.

Referring to FIG. 11B, print service 214, upon receiving the notification event, will retrieve data from the appropriate records within database 218, as illustrated by decisional step 1020 and procedural step 1022, including retrieval of the base card image from database 218. Utilizing the data representing the customizations to the card, print service 214 will create the card image with the customizations, as illustrated by procedural step 1024, and print the card on a printer, as illustrated by procedural step 1026. If an error occurs during the printing process, as illustrated by decisional step 1028, print service 214 will generate an error message, as illustrated by procedural step 1030, and send an event notification to email processing service 212, as illustrated by procedural step 1032. Otherwise, the card will be printed, along with, optionally, a shipping receipt/invoice, to assist in matching the card with a corresponding gift or transaction.

Referring to FIG. 11C, the process of retransmitting data associated with one or more cards or communicating directly with system 250 is illustrated. If, through interaction of a user, typically a system administrator entering the appropriate user command, a request to send a message is received, vendor control center service 216 will create a message and send an event notification to email processing service 212, as illustrated by steps 1034-1038. Such messages are defined by the system administrator and may be requests for supplies of notifications of specific system need or conditions. If, through interaction of a user, a request to reprint a card is received, vendor control center service 216 will query database 218, create the card, and reprint the card, as illustrated by steps 1040-1046 and in a manner as previously described with reference to FIG. 11B. If, through interaction of a user, a request to send a particular card is received, versus waiting until the system automatically received the card data from system 250, vendor control center service 216 will create a message and send an event notification to email processing service 212, as illustrated by steps 1048-1052. If, through interaction of a user, a request to down load data immediately is received, vendor control center service 216 will send an event notification to email processing service 212, as illustrated by steps 1054 and 1052.

The above example describes a scenario in which a network user has hyperlinked to system 250 from the web site of an eCommerce vendor. Alternatively, if a network user connects directly to web server 260, to select and customize a card, the process occurs substantially as described above except that any necessary information contained in data 900 will be entered directly by the network user through the user interface web pages supplied by web server 260. In such a scenario, the billing, printing, inventorying and shipping of the card may be done directly by the inventive system 250 or using a system 240 which may be constructed and function similar to any other vendor system 210. Additionally, multiple systems similar to 240 may be located in disparate geographical regions and operatively coupled to system 250 over either public or private computer networks to enable accelerated delivery of the card without the cost of international postage.

Alternative Network Configurations

In a first alternative embodiment to that illustrated in FIG. 2, email server 288 and web server 260 may be implemented with applications which execute on the same computer system, as illustrated in FIG. 3.

In a second alternative embodiment to that illustrated in FIG. 2, certain elements of system 250 are interconnected through public networks. Specifically, referring to FIG. 12, a communication environment similar to that described with reference to FIGS. 2-3 is illustrated, except that E-mail server 288, web server 260 and firewall appliance/server 265 are connectable to database server 270 and database 280, as well as distribution system 243 and printer 283, through Internet 205.

Figure 12:
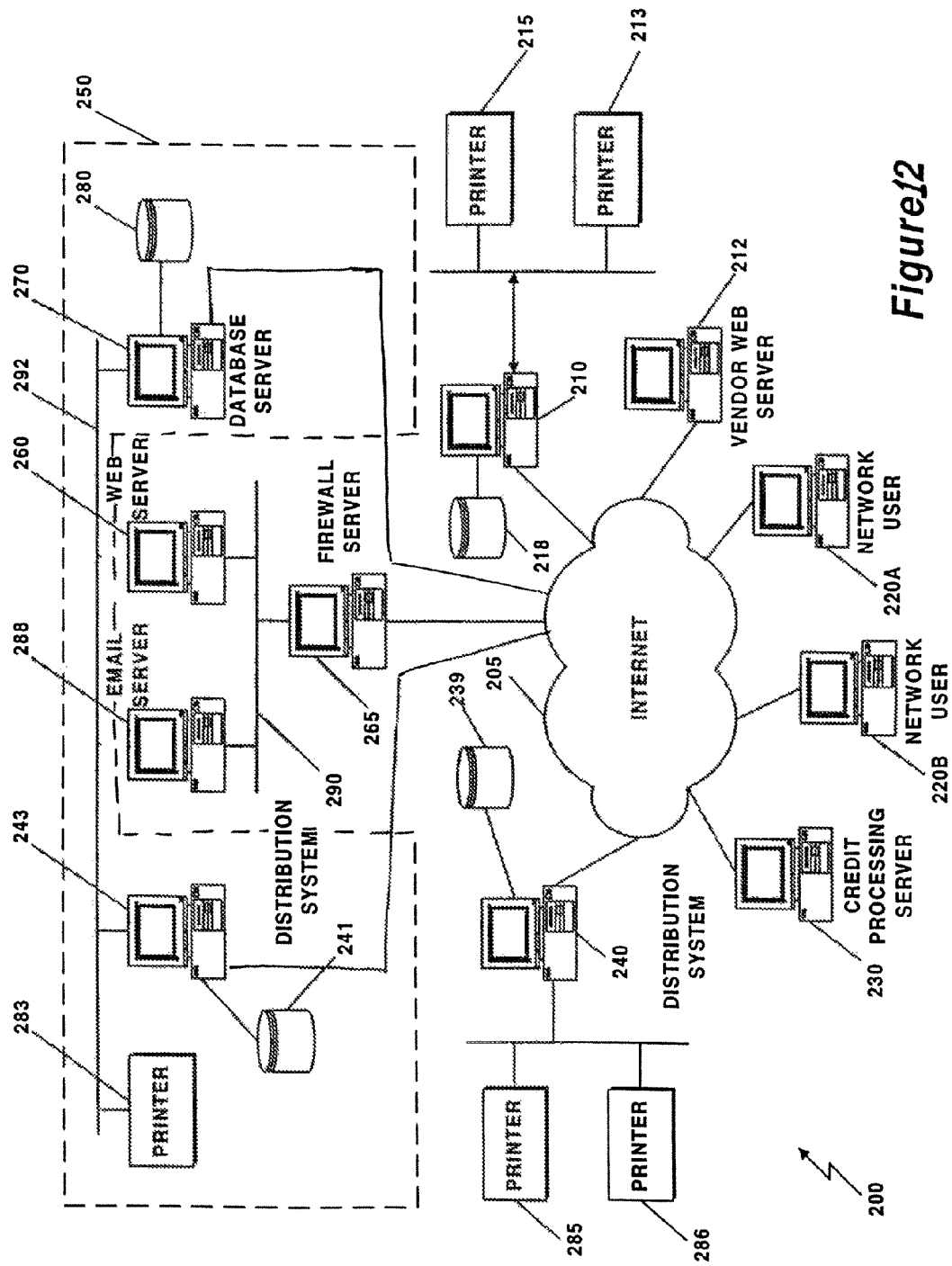
FIG. 12 is a conceptual block diagram of the elements of an alternative implementation of the inventive system in a network environment.
Figure 13:
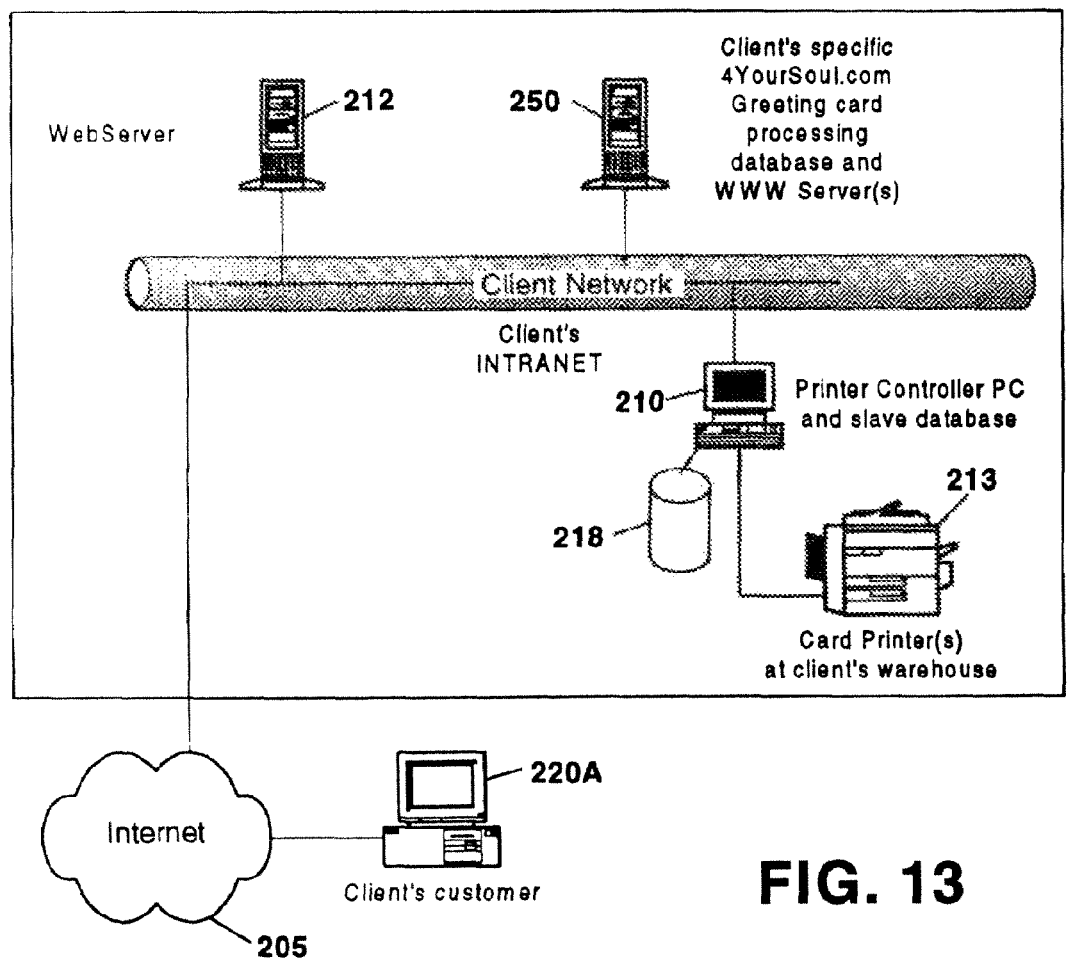
FIG. 13 is a conceptual block diagram of the elements of another alternative implementation of the inventive system in a network environment.
Figure 14A:
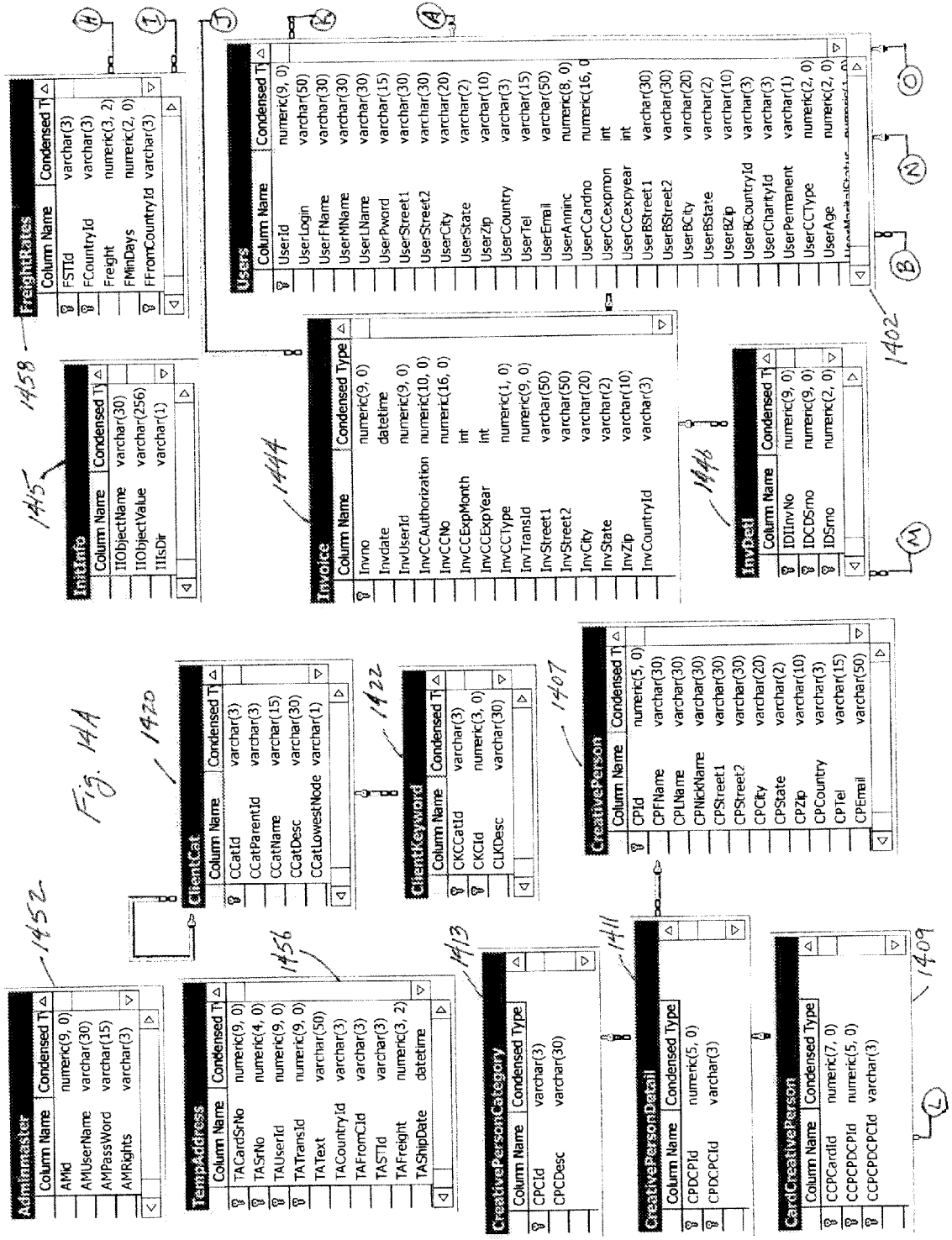
FIG. 14A-D collectively illustrate conceptually an alternative implementation of the inventive database of FIGS. 4-5.
Figure 14B:
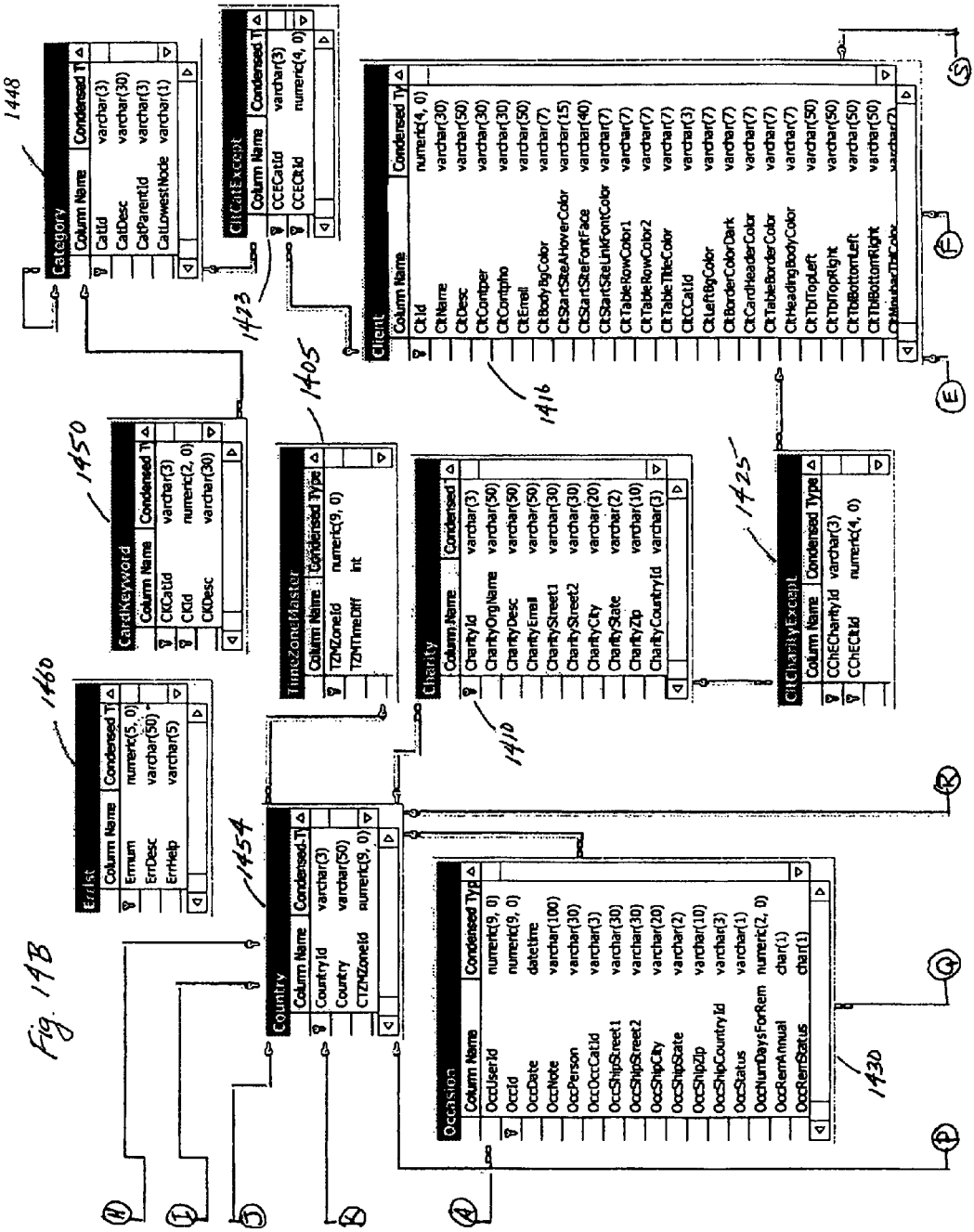
Figure 14C:
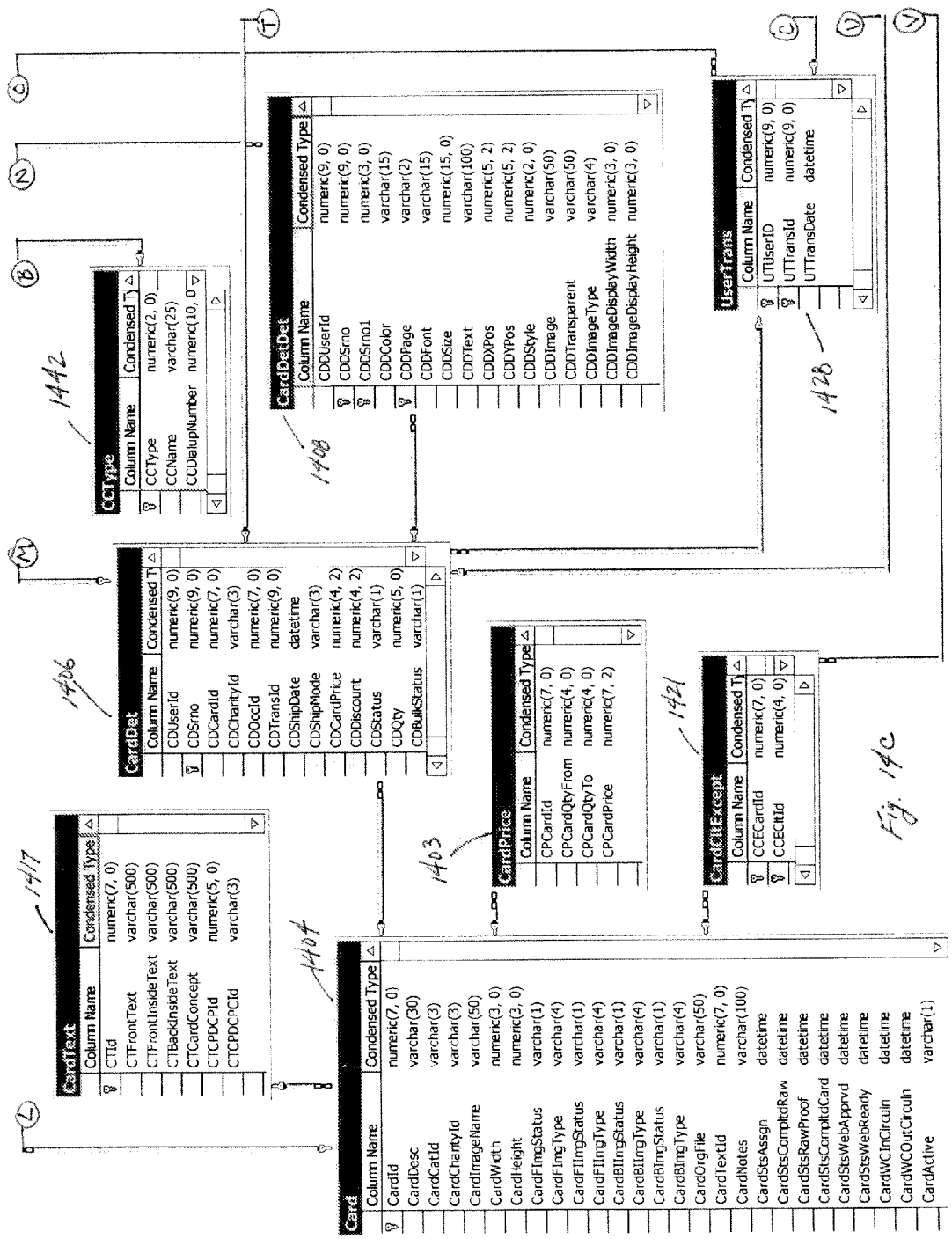
Figure 14D:
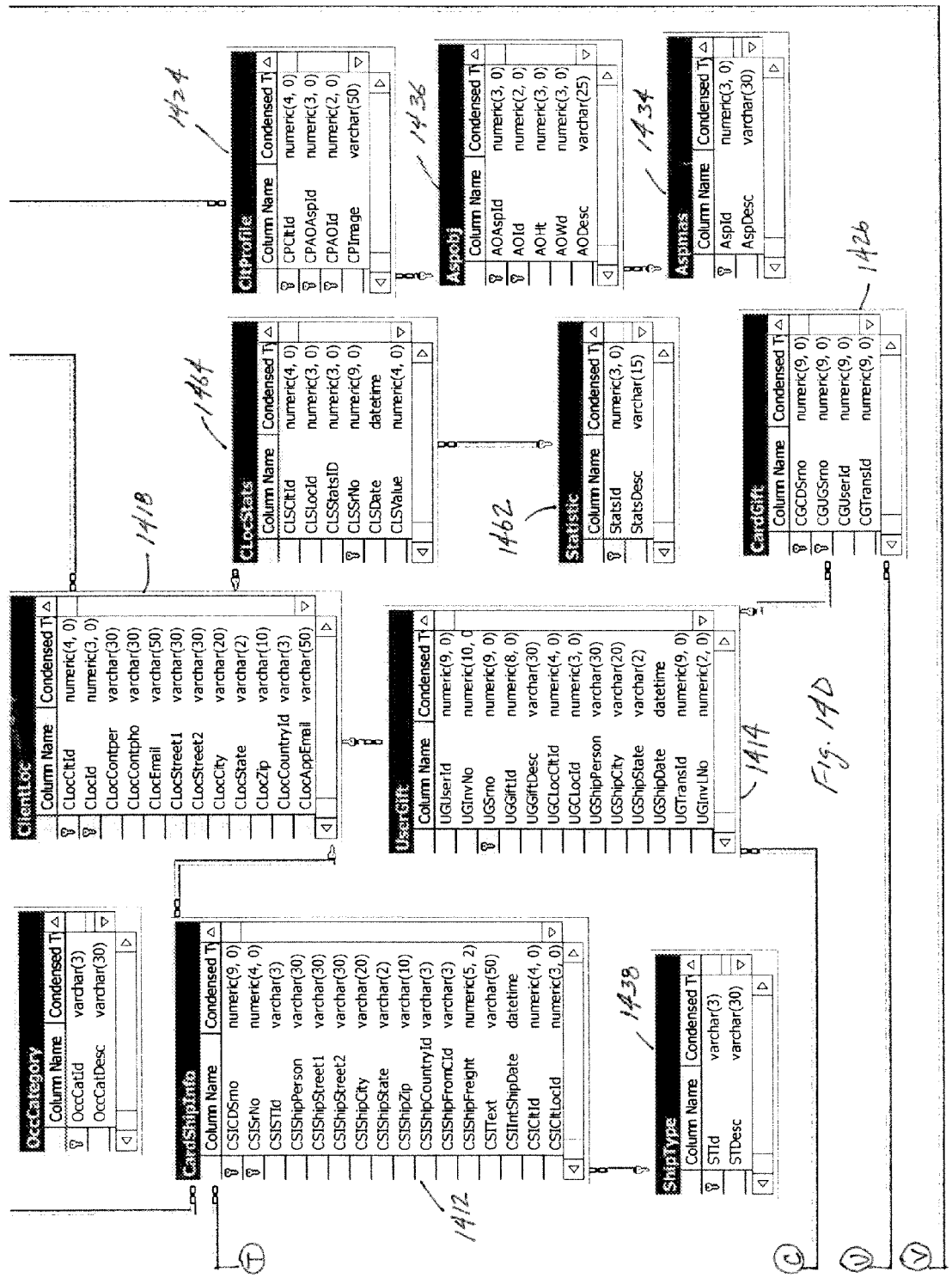

In another alternative embodiment, the system 250 is further connected to a traditional circuit-switched telephone network 296 via an Interactive Voice Response (IVR) System 285 which may be part of the system 250 or part of the eCommerce vendors network facilities. As shown in FIGS. 12 and 13, a Public Switched Telephone Network (PSTN) central office 294 is operatively coupled to terminating apparatus 292A-B and IVR system 285. Although only one central office 294 is illustrated, it will be obvious to those skilled in the arts that multiple central offices may be operatively interconnected by, for example, a toll network implemented as a traditional PSTN network including routers, trunk lines, fiber optic cables, etc. Connected to central office 294 is a traditional telephone terminating apparatus 292A, which may be located at a shopper's premises, and terminating apparatus 292B, which may be located at a vendor's premises. Terminating apparatus 292A-B may be implemented with either a digital or analog telephone or any other apparatus capable of receiving a circuit switched call, such as modems, facsimile machines, etc., such apparatus being referred to collectively hereinafter as a terminating apparatus, whether the network actually terminates. Further, the PSTN network may be implemented as either an integrated services digital network (ISDN) or a plain old telephone service (POTS) network. In addition to or in place of IVR system 285 a traditional automatic call center (ACD) system may be coupled to the PSTN network. An automatic call center (ACD) system suitable for use with the present invention is any of the Galaxy family of call center products commercially available from Rockwell International, Irvine, Calif.

In an alternative embodiment to IVR system 285, network user may establish a real-time point-to-point communication link with an actual sales assistant at an automatic call center linked to either system 250 or the eCommerce web server 212 over a packet-switched data network using Internet telephony software and/or hardware. In such an embodiment live online communication between network users and sales associates representing the eCommerce vendor may be established over the Internet 205. Using this service, network user would be able to interact more directly with the eCommerce vendor, having their orders for products and cards and customizations to selected cards performed at the same time products and services are ordered. Such comprehensive support would ensure that questions about specific products or cards are answered properly and allows network user to call in changes or additions to their card order, whether placed originally over the telephone, on-line through a web server, or other by other means.

An Internet telephony software application suitable for use with system 250 is the WebPhone 2.0, 3.0, 4.0 or higher revision or the Mini WebPhone client software applications, all commercially available from NetSpeak Corporation, Boca Raton, Fla., referred to hereafter as the WebPhone client or WebPhone process. The WebPhone and Mini WebPhone applications can be launched from an icon on a network user's browser desktop and are capable of transmitting both packetized audio and video data over packet-switched networks, such as the Internet. The WebPhone client process, upon instruction from the user or automatically upon receipt of the address information from browser process, attempts to establish a direct, point-to-point communication with a destination specified by the address information. If the address information is an Internet protocol address, having the form XXX.XXX.XXX, the WebPhone client process will attempt to establish a call directly to WebPhone client process at the eCommerce vendor's establishment or a call center. Once established, the parties to the call can use any of the features of the WebPhone application, such as call conferencing, video displays, white boarding, etc. Alternatively, rather that calling the eCommerce vendor's establishment directly, the network user's call may be directed to a packetized network automatic call center (ACD), such as that described in U.S. Pat. No. 5,999,965, entitled Automatic Call Distribution Server For Computer Telephony Communications. Such and ACD may be used in place of or in addition to IVR system 285. The WebPhone application allows parties to exchange URL's with the packetized voice and video data, thereby allowing a sales representative and network user to view Web pages of Web server 212 or 260 or another web site in synchronization.

In a third alternative embodiment to that illustrated in FIG. 2, the elements of system 250 are resident on the eCommerce vendor's LAN 251 or Intranet or may be accessible through an extranet. Referring to FIG. 13, eCommerce vendor's web server 212, system 250, print server 210, database 218, and printer 213 are connectable over eCommerce vendor's LAN 251. With this embodiment, system 250 may include web server 260, E-mail server 288, firewall appliance/server 265, database server 270 and database 280. With this configuration, inventive system 250 may be directly under the control of the eCommerce vendor, except for an external database from which new cards may be downloaded. In this embodiment, email or MSMQ messaging may be employed as the control method. The data handoff from the eCommerce vendor web server 212 to web server 260 would be simplified, as all the customer data could easily be stored on a local database server as opposed to being transfer from server to server.

As an alternative to this embodiment, the functions of E-mail server 288, web server 260 and firewall appliance/server 265, may be integrated into the eCommerce vendor's web server 212 of FIG. 13. With this embodiment, a network user connects directly to the eCommerce vendor's web server 212 and selects a gift. The eCommerce vendor's web site directs the network user to a different page within the web server 212 itself, not another web server, however, the information passed from one page to the other is the same as passed between servers, previously described. In this manner, the network user is not required to make a hypertext link to a third party server or a remote server, in order to select and create a customized card, in a manner as previously described. After processing of the credit card transaction is completed, the network user may be returned to an initial entry point or other page within the eCommerce vendor's web server 212.

The above-described communication environments are for illustrative purposes only and are not meant to be limiting. The elements described herein may be operatively coupled through any combination of packet-switched and circuit-switched network configurations including, but not limited to, wide area networks, local area networks, intranets, extranets, the Internet, broadband cable networks, public switched telephone networks or any combination thereof. Further, server applications can execute on the same hardware platform or on separate operatively coupled hardware platforms interconnected through a network topology.

Alternative Data Base Architectures

FIGS. 14A-D illustrate an alternative embodiment of database 280. To facilitate such an implementation, a number of tables have been modified in database 280 to provide additional functionality over that described with reference to FIGS. 4-5. As with FIGS. 4-5, FIGS. 14A-D illustrate conceptually the tables which comprise database 280A. Each record, as shown, includes one or more fields and an associated field descriptor, as illustrated. Multiple records of the same type, in turn, collectively form a table within database 280A. A field within a record may serve as an index into another record are the same as previously described, except as indicated otherwise.

For the sake of brevity only the major distinctions between the modified tables of database 280A (designed with a "14" in place of the "4" in the respective reference numbers in FIGS. 4-5) and the original tables of database 280 are described below, as well as any additional tables. Specifically, the Card table 404, CardDet table 406, CardDetDet table 408 and Freight Rates table 458 of database 280 have been modified. The Card table 1404 has been modified in comparison to table 404 to add the CardFImgStatus, CardFImgType, CardFIlmgStatus, CardFIlmgType, CardFIlmgStatus, CardFIlmgType, CardBlmgStatus, CardBlmgType, CardOrgFile, CardTextId, CardNotes, CardStsAssgn, CardStsCompltdRaw, CardStsRawProof, CardStsCompltdCard, CardStsWebApprvd, CardStsWebReady, CardWClnCirculn, CardWCOutCirculn, CardActive fields to define the parameters of the image(s) which have been have been uploaded to the card. The CardDetDet 1408 has been modified in comparison to table 408 to add the CDDTransparent, CDDImageType, CDDImageDisplayWidth, CDDImageDisplayHeight fields to indicate the size of the image, the transparent color, and the format in which the image is stored. The Tempaddress table 1456 has been modified in comparison to table 456 to add the TACardSrno, TAFromCld, TASTId, TAFreight, and TAShipDate fields to indicate the card serial number, miscellaneous identifiers, freight type and ship date. The Freight Rates table 1458 has been modified in comparison to table 458 to add the FminDays, FFromCountryId fields to indicate the time taken for delivery between two locations based on the mode of transportation, i.e., FedEx Overnight, US Mail, etc. The CardShipInfo table 1412 has been modified in comparison to table 412 to add the CSISTId, CSIShipFromCId, CSIShipFreight, CSIIntShipDate, CSICltId, CSICltLocId fields to define the ship date, location, and freight type for the delivery of the card. The Country table 1454 has been modified in comparison to table 454 to add the CTZMZoneId field indicating the time zone in which the country is located. The Client table 1416 has been modified in comparison to table 416 to add the CltMnubarTblColor field. The Occasion table 1430 has been modified in comparison to table 430 to add the OccRemStatus field. The CardDet table 1406 has been modified in comparison to table 406 to add the CDBulkStatus field.

In addition, a table have been added including CardPrice table 1403, TimeZoneMaster 1405, CreativePerson table 1407, CardCreativePerson table 1409, CreativePersonDetail table 1411, CreativePersonCategory table 1413, InitInfo table 1415, CardText table 1417, CardCltExcept table 1421, CltCatExcept table 1423, and CltCharityExcept table 1425.

CardPrice table 1403 stores data on any bulk discounts available to a network user. A range or the number of cards bought is created and a discounted price is assigned for a higher range. TimeZoneMaster table 1405 stores different time-zone information.

Figure 15:
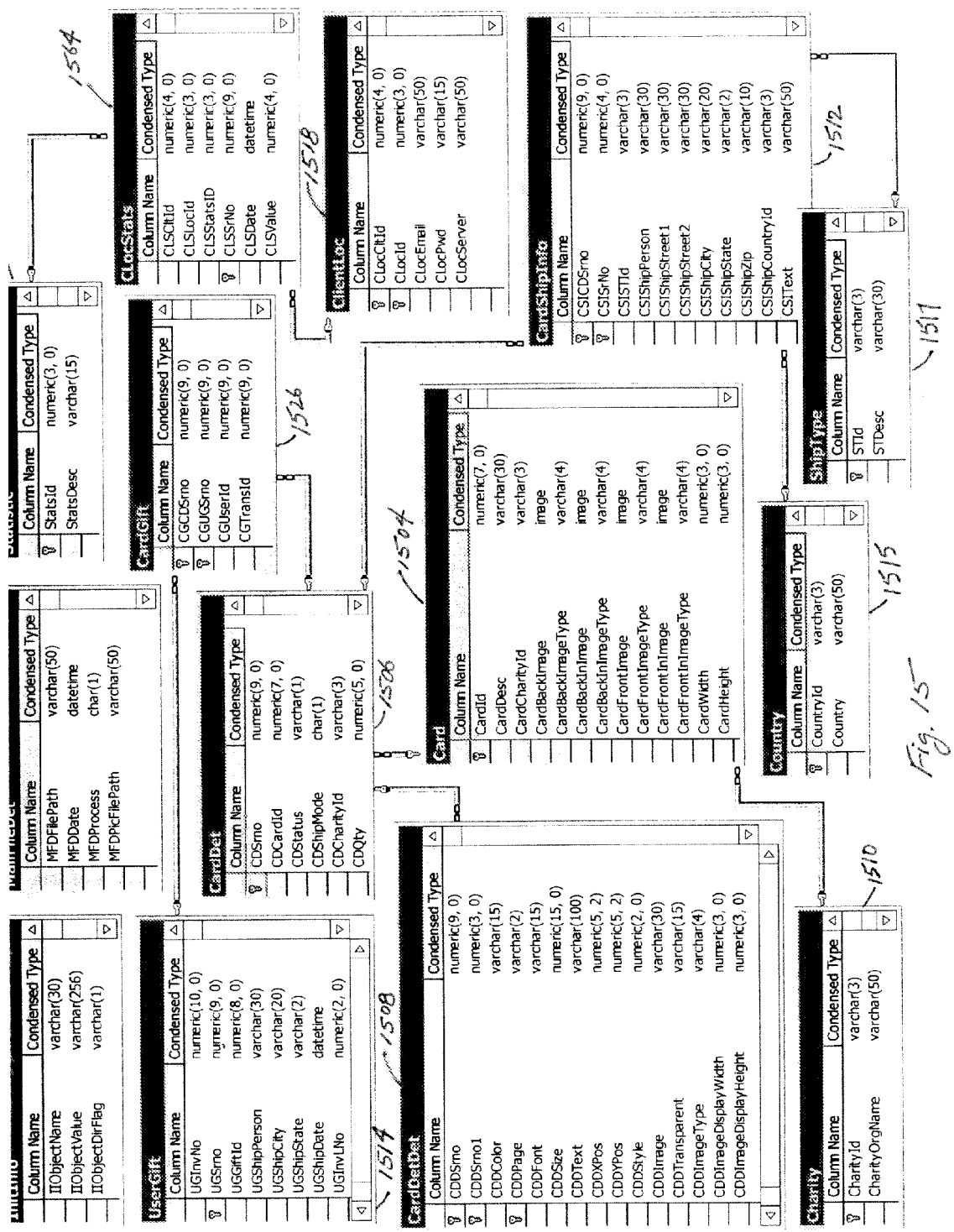
FIG. 15 illustrates conceptually an alternative construction of the inventive database of FIG. 10.

FIG. 15 illustrates an alternative embodiment of database 218. To facilitate such an implementation, a number of tables have been modified in database 218 to provide additional functionality over that described with reference to FIG. 10. As with FIG. 10, FIG. 15 illustrates conceptually the tables which comprise database 218. Each record, as shown, includes one or more fields and an associated field descriptor, as illustrated. Multiple records of the same type, in turn, collectively form a table within database 218. A field within a record may serve as an index into another record are the same as previously described, except as indicated otherwise.

For the sake of brevity only the major distinctions between the modified tables (designed with a "15" in place of the "8" in the respective reference numbers from FIG. 10) and the original tables of database 218 are described below, as well as any additional tables. Specifically, the Card table 804, and CardDetDet 808 have been modified. The Card table 1504 has been modified in comparison to table 804 to add certain fields to store information in the table itself and not outside, for security purposes. The CardDetDet table 1508 has been modified in comparison to table 808 to add certain fields to store information relevant information regarding uploaded images. Additional new tables include the InitInfo table 1529 and the MailFileDet table 1527.

Also, as described with reference to FIG. 11B, the process of sending out print commands has been modified to include time zones. The print service application 214n runs every hour and finds the time zone where it is currently mid-night. It then goes through all the cards that are to be printed at that location, figures out if it is still the closest location to the destination. If it is the closest location then a print command is issued, if not, the closest location is found, the time to deliver checked, if it is the same, then a print command is issued to the closest location, else the send date is modified to suit the new location.

As with database 280, the records 1402-1460 of database 280A are related. In particular, a specific entry of one table may be used as an index into a record of another table, as illustrated in the listing below in which each entry has the form:

| [Tablename.Fieldname] | REFERENCES [Tablename.Fieldname] |
|---|---|
| [Category.CatParentId] | REFERENCES [Category.CatId] |
| [ClientCat.CCatParentId] | REFERENCES [ClientCat.CCatId] |
| [Aspobj.AOAspId] | REFERENCES [Aspmas.AspId] |
| [CardKeyword.CKCatId] | REFERENCES [Category.CatId] |
| [Charity.CharityCountryId] | REFERENCES [Country.CountryId] |
| [Client.CltCCatId] | REFERENCES [ClientCat.CCatId] |
| [ClientKeyword.CKCCatId] | REFERENCES [ClientCat.CCatId] |

-continued

| [Tablename.Fieldname] | REFERENCES [Tablename.Fieldname] |
|---|---|
| [ClientMailInfo.CMIShipCountryId] | REFERENCES [Country.CountryId] |
| [FreightRates.FCountryId] | REFERENCES [Country.CountryId] |
| [FreightRates.FSTId] | REFERENCES [ShipType.STId] |
| [Users.UserCountry] | REFERENCES [Country.CountryId] |
| [Users.UserCCType] | REFERENCES [CCType.CCType] |
| [Card.CardCatId] | REFERENCES [Category.CatId] |
| [Card.CardCharityId] | REFERENCES [Charity.CharityId] |
| [ClientLoc.CLocCltId] | REFERENCES [Client.CltId] |
| [ClientLoc.CLocCountryId] | REFERENCES [Country.CountryId] |
| [CltProfile.CPAOAspId & CPAOId] | REFERENCES [Aspobj.AOAspId.AOId] |
| [CltProfile.CPCltId] | REFERENCES [Client.CltId] |
| [Invoice.InvUserId] | REFERENCES [Users.UserId] |
| [Invoice.InvCountryId] | REFERENCES [Country.CountryId] |
| [Occasion.OccShipCountryId] | REFERENCES [Country.CountryId] |
| [Occasion.OccOccCatId] | REFERENCES [OccCategory.OccCatId] |
| [Occasion.OccUserId] | REFERENCES [Users.UserId] |
| [UserTrans.UTUserID] | REFERENCES [Users.UserId] |
| [CardDet.CDUserId & CDTransId] | REFERENCES [UserTrans.UTUserID & UTTransId] |
| [CardDet.CDCardId] | REFERENCES [Card.CardId] |
| [CLocStats.CLSCltId & CLSLocId] | REFERENCES [ClientLoc.CLocCltId & CLocId] |
| [ClocStats.CLSStatsID] | REFERENCES [Statistic.StatsId] |
| [UserGift.UGCLocCltId & UGCLocId] | REFERENCES [ClientLoc.CLocCltId & CLocId] |
| [UserGift.UGUserId & UGTransId] | REFERENCES [UserTrans.UTUserID & UTTransId] |
| [CardDetDet.CDDSrno] | REFERENCES [CardDet.CDSrno] |
| [CardDetDet.CDDUserId] | REFERENCES [Users.UserId] |
| [CardGift.CGCDSrno] | REFERENCES [CardDet.CDSrno] |
| [CardGift.CGUGSrno] | REFERENCES [UserGift.UGSrno] |
| [CardShipInfo.CSICDSrno] | REFERENCES [CardDet.CDSrno] |
| [CardShipInfo.CSIShipCountryId] | REFERENCES [Country.CountryId] |
| [CardShipInfo.CSISTId] | REFERENCES [ShipType.STId] |
| [InvDetl.IDCDSrno] | REFERENCES [CardDet.CDSrno] |
| [InvDetl.IDIInvNo] | REFERENCES [Invoice.Invno] |

Alternative Processing Algorithms

Figure 16:
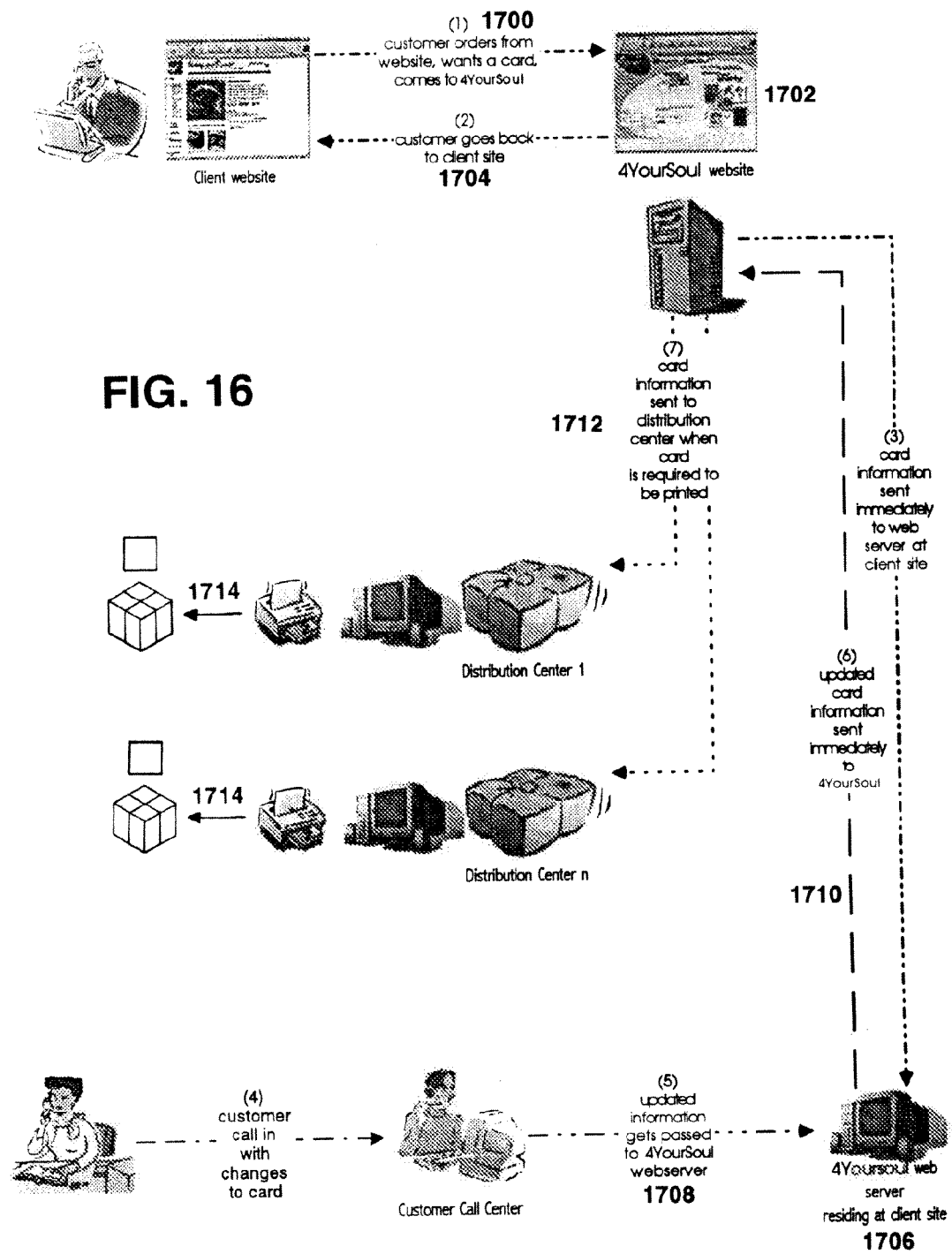
FIG. 16 is a conceptual diagram illustrating the elements of a system, and a process flow among such elements, suitable for use with the present invention.

Referring to FIG. 16, the process steps for customizing a card for shipment with a gift or product are illustrated in accordance with one embodiment of the present invention. Specifically, an on-line customer orders from the eCommerce vendor web server 212 a product or service. If the on-line customer desires a card to be sent along with the product or service, the customer is directed to inventive system 250, typically through a hyperlink, as illustrated by step 1700. The network user selects and customizes a card in a manner similar to that previously described, as illustrated by step 1702. The network customer is then returned to the vendor web server 212, as illustrated by step 1704. The information describing the card and the customizations thereto is maintained within database 280 and is supplied to the print server 210, as illustrated by step 1706. The manner in which the information describing the card and the customizations thereto is dependent on which of the network configurations described herein is utilized, as would be obvious to one skilled in the art given the description herein.

If the on-line customer desires changes to the customizations previously specified, the on-line customer may call the eCommerce vendor's call center and relay the changes. The eCommerce vendor may employ a call center for receiving customer information over traditional PSTN communication networks or over packet switched networks, in the case of Internet telephony communications. The updated information regarding the customizations and/or card is provided to the print server 212 at the e-Commerce vendor's site, as illustrated by step 1708. The updated information is also sent to the inventive system 250, as illustrated by step 1710. Next, at the time specified for the card to be printed, the inventive system 250 downloads to one or more print servers 212 residing at the eCommerce vendor's distribution centers, the card information and customization data, as illustrated by step 1712. The transmission of the card information and customization data may occur in any of the previously described formats or manners. The card template and customization data are then printed at the appropriate time at the distribution center system and matched with the gift ordered by the network user, as previously described, and as illustrated by step 1714.

Figure 17:
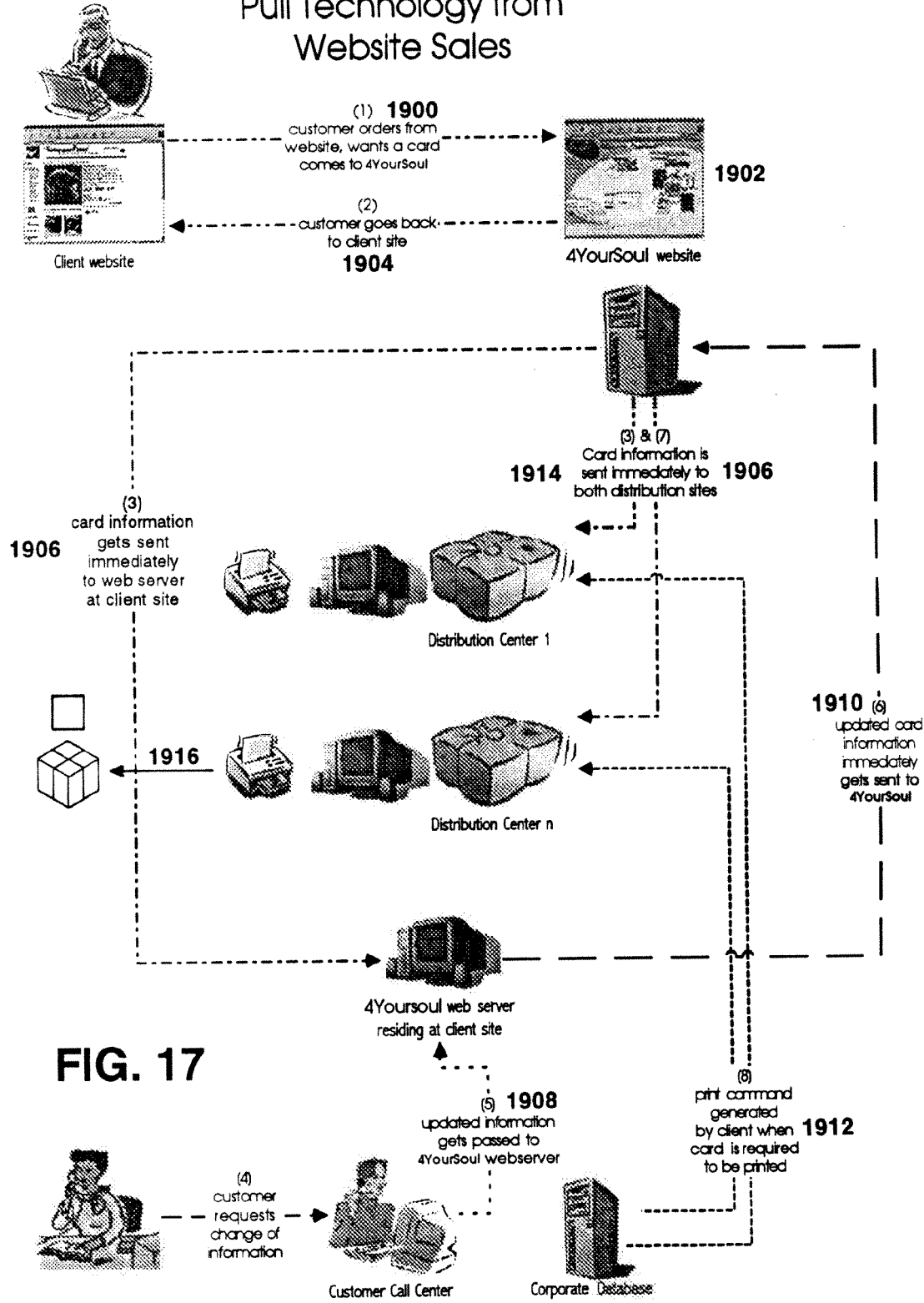
FIG. 17 is a conceptual diagram illustrating the elements of a system, and a process flow among such elements, suitable for use with the present invention

Referring to FIG. 17, the process steps of for customizing a card for shipment with a gift or product are illustrated in accordance with another embodiment of the present invention. Specifically, an on-line customer orders from the eCommerce vendor web server 212 a product or service. If the on-line customer desires a card to be sent along with the product or service, the customer is directed to inventive system 250, typically through a hyperlink, as illustrated by step 1900. The network user selects and customizes a card in a manner similar to that previously described, as illustrated by step 1902. The network customer is then returned to the vendor web server 212, as illustrated by step 1904. The information describing the card and the customizations thereto is maintained within database 280 and is supplied to the print server 210, as illustrated by step 1906. The manner in which the information describing the card and the customizations thereto is dependent on which of the network configurations described herein is utilized, as would be obvious to one skilled in the art given the description herein.

If the on-line customer desires changes to the customizations previously specified, the on-line customer may call the eCommerce vendor's call center and relay the changes. The eCommerce vendor may employ a call center for receiving customer information over traditional PSTN communication networks or over packet switched networks, in the case of Internet telephony communications. The updated information regarding the customizations and/or card is provided to the print server 212 at the e-Commerce vendor's site, as illustrated by step 1908. The updated information is also sent to the inventive system 250, as illustrated by step 1910. At the time specified for the card to be printed, the print server 212 transmits to system 250 a print command, as illustrated by step 1912. Next, the inventive system 250 downloads to one or more print servers 212 residing at the eCommerce vendor's distribution centers, the card information and customization data, as illustrated by step 1914. The transmission of the card information and customization data may occur in any of the previously described formats or manners. The card template and customization data are then printed at the appropriate time at the distribution center system and matched with the gift ordered by the network user, as previously described, and as illustrated by step 1916.

Greeting Card as a Pick Ticket and Information Source

According to another aspect of the invention, a document, such as a personalized greeting card, personalized catalog or personalized direct marketing material can be used as: 1) a direct source of information for generating a shipping label or an intermediate document used for matching/picking multiple items to be shipped as a single entity with the document, 2) as a reference to a file containing data defining the shipping label or packing list used for matching/picking multiple items to be shipped as a single entity with the document, 3) as the source of information for generating any of a gift card, gift certificate or envelope which is matched/packaged to be shipped as a single entity with the document, 4) as a reference to a data file containing information for enabling generation of a gift card or gift certificate, and/or 5) as the actual medium on which the recipient/shipping address is printed.

In the vast majority of cases, particularly in the gift product market, the number of items to be combined with printed material is one. This provides a unique opportunity to utilize the printed material, such a personalized greeting card, as a the packing document (ticket). However, this process is not limited to only one item, as multiple items can be listed, but only one shipping address is typically utilized.

Figure 18B:
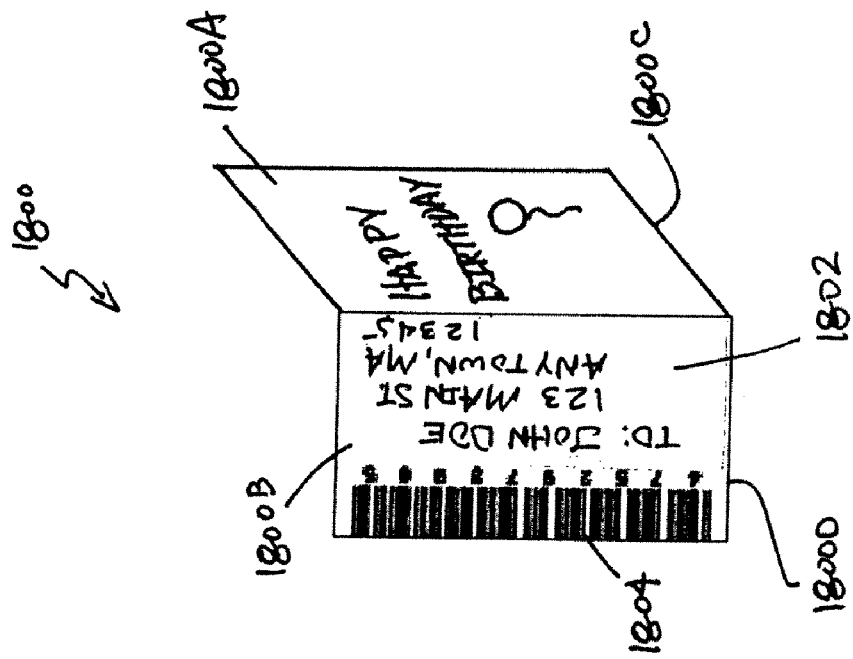
FIG. 18B is a conceptual illustration of a card panel including a bar code and a destination address in accordance with the present invention.
Figure 18A:
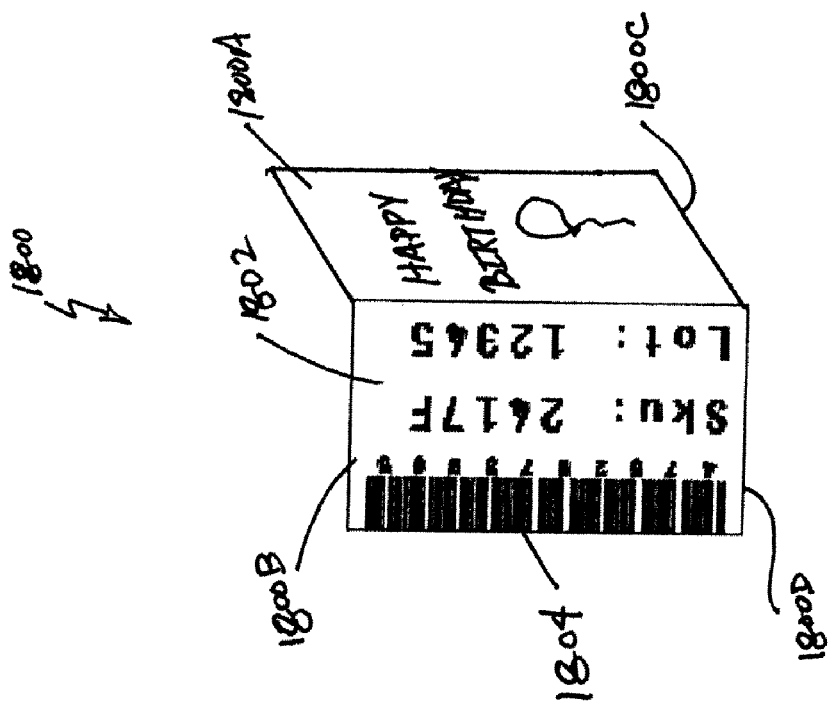
FIG. 18A is a conceptual illustration of a card panel including a bar code and SKU and Lot data useful for matching the card with a gift and for printing shipping labels in accordance with the present invention.
Figure 18C:
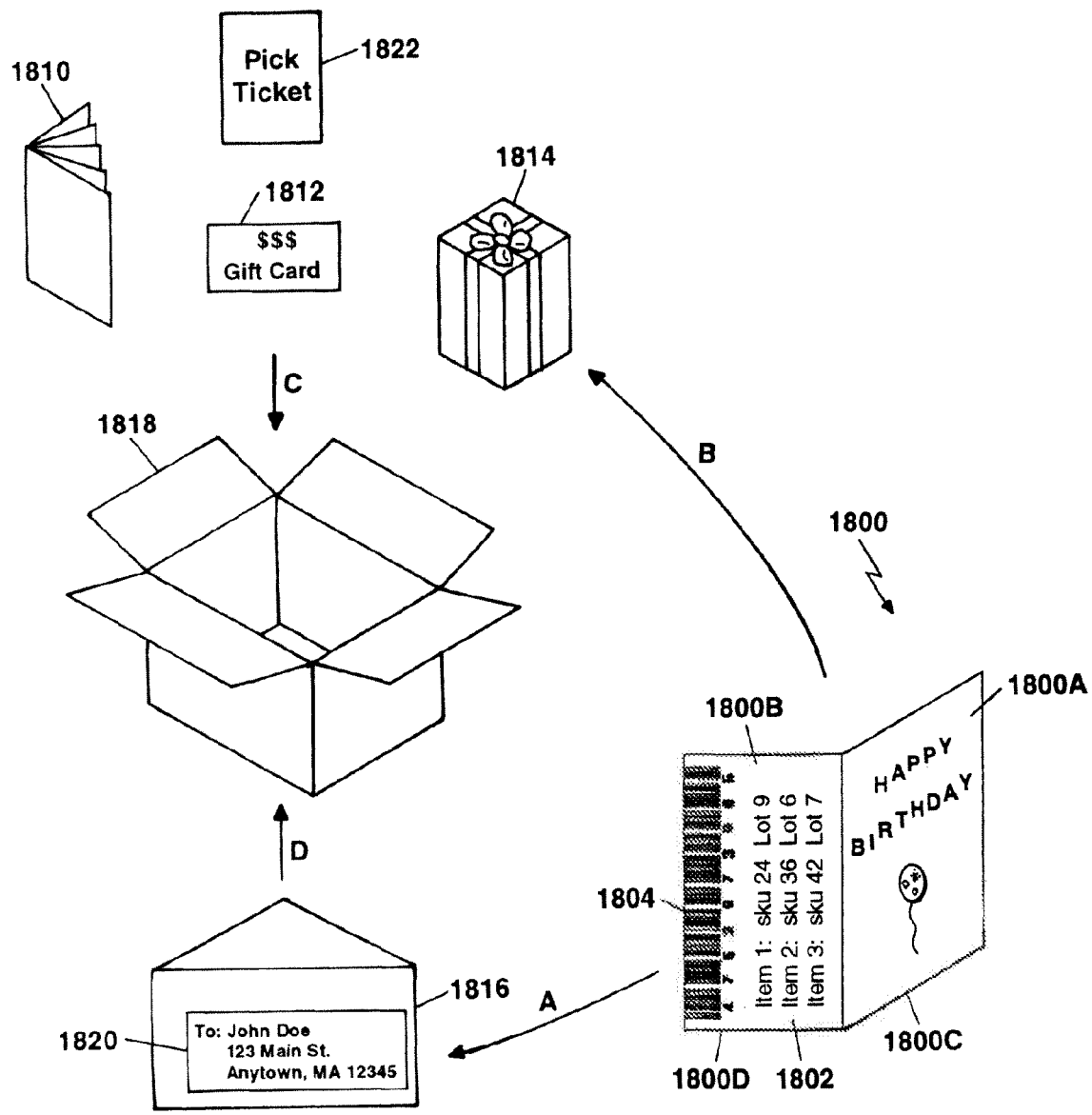
FIG. 18C is a conceptual illustration of a card panel including a bar code and a pick list of one or more items to be shipped with the card of the present invention.
Figure 18D:
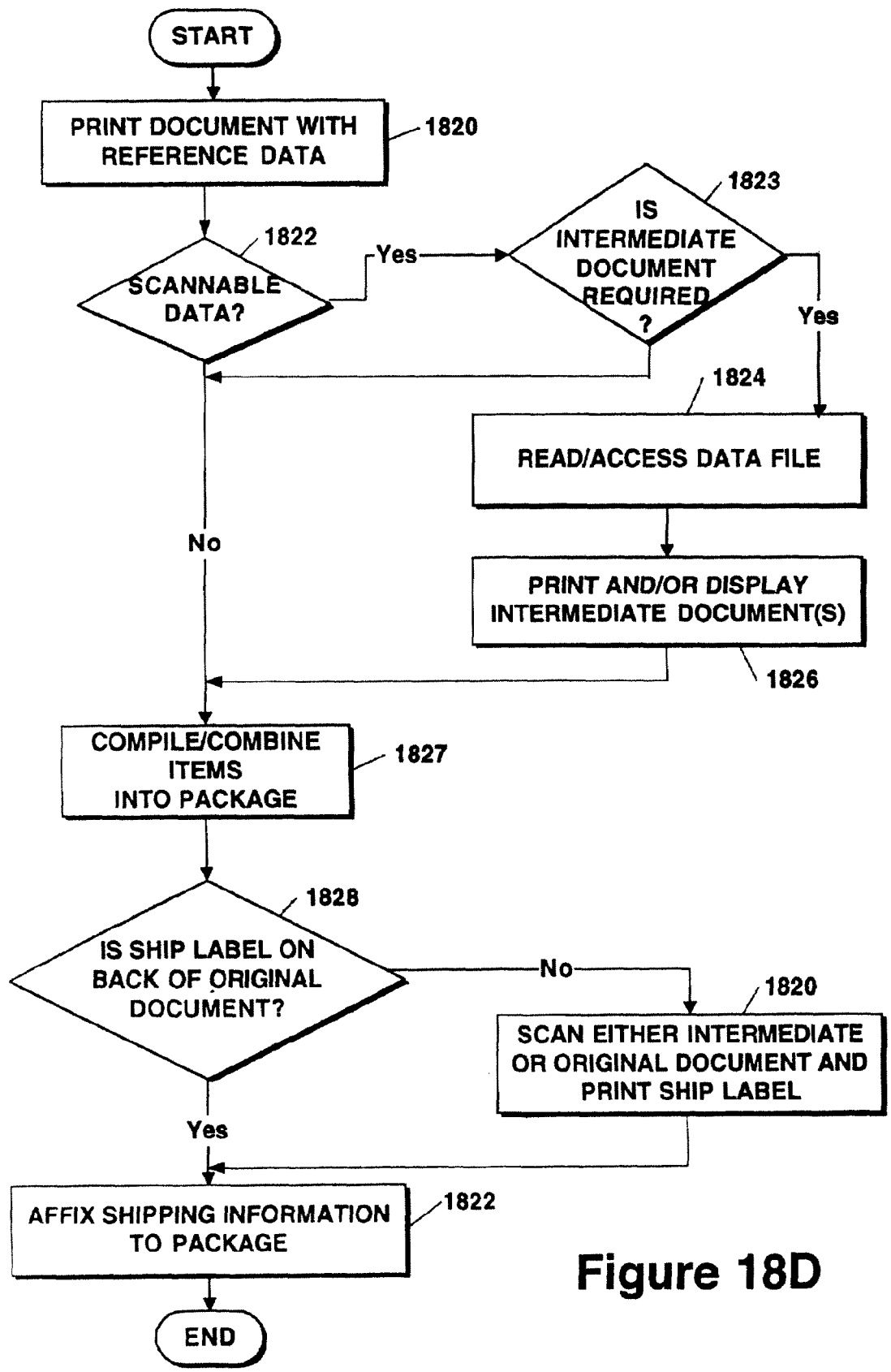
FIG. 18D is a flow chart illustrating the processes for utilizing information on the printed card to bundle other items, for shipment as a single entity, in accordance with the present invention.

Referring to FIGS. 18A-C, printed material 1800, which in the illustrative embodiment may be a multiple panel personalized greeting card, includes at least one panel in which data useful in matching the printed material with one or more items is printed. In the illustrative embodiment, the printed material 1800 comprises a four panel personalized greeting card having a front panel 1800A, a rear panel 1800B, and at least two interior panels 1800C-D (not fully visible). Alternatively, other personalized printed materials such as personalized catalogs, personalized marketing materials, personalized gift certificates, personalized gift cards, or other personalized documents may be utilized in place of the personalized greeting card 1800.

As shown in FIG. 18A, in a predetermined area 1802 of panel 1800B, a bar code and/or a human readable graphics, or both, are included and may serve as a source of item matching and/or shipping information. In FIG. 18A, barcode 1804 may include a reference to a database or computer memory address at which the data relating to a vendor transaction, including shipping address of the recipient or data about the location and nature of any products to be shipped with the card, is maintained. The remainder of the product identification information in area 1802 may be specific to a warehouse-by-warehouse application, and serves to inform warehouse personnel as to which product to pick and where to route the product/card combination once the item(s) have been matched with the printed material 1800. As with the bar code, the SKU and other data may serve as a reference to a memory address in which the data about the location and nature of any products to be shipped with the card is stored. The information in area 1802 is used first by the warehouse personnel to locate the proper materials that the consumer has ordered. Thereafter, once the warehouse operator has selected the specified product(s), the product(s) must be packaged along with the printed material.

It is contemplated that the document can be inside or outside the packing container. If the printed material 1800 must be enclosed in a box with the product, then the additional step of barcode duplication with a bar code duplicator may occur prior to packing the printed material. The barcode duplicator, may be either tabletop mounted, or worn on the body and consists of a barcode reader, directly connected to a barcode printer. When triggered, the barcode duplicator reads whatever barcode, retrieves any data to route the package through a facility, either to be shipped alone or to be combined with other items, and sends the data to a printer for printing an intermediate label. When the barcode is duplicated, it is then applied to the outside of the box in which the printed material 1800 and one or more products have been enclosed. In cases where the printed material 1800 is being placed in a "post pack" envelope, e.g. UPS or Fedex shipping envelopes, that are clear on the front and adhesived on the back, the barcode on the printed material continues to act as the shipping reference, and thus may not need to be duplicated.

Once any product and printed material 1800 have been packaged and sealed, with the information available on the outside of the parcel, either in duplicated barcode form or via original printed materials, the parcel can be routed to the shipping area. Many current warehouse systems have automated "print and apply" shipping systems. These shipping systems can be used to read the barcode information on the parcel to generate the appropriate shipping label, and provide the required reverse tracking of the parcel to ensure that is was shipped.

In the illustrative embodiment, the information in area 1802 of FIG. 18A may be stored in the previously described records of a database or other computer memory. For example, the Card Ship info record 418 includes information relevant to the address to which the card or other printed material 1800 is to be shipped. A memory access code in the form of a bar code can then be generated to access the data from record 418 during the shipping label generation process. The user gift record 414 includes information about a gift(s) or other product(s) with which the card is associated. The card gift record 426 and user transmit record 428 include information useful in coordinating the shipment and printing of the card 1800 with a specified gift purchased at or shipped from a client's facilities. The data from these fields can be used to identify the SKU and Lot identifying the gift/product. Some or all of this information may be provided on the card 1800 in any of the formats described above, in addition to any other known formats, as well as in human readable alphanumeric characters directly on one of the card panels itself, so that the card facilitates the efficient matching and shipping of the card with the intended package.

In addition, the nature of the products with which the card is matched in not limited. For example, in the above-described process, the personalized greeting card may be used as the source of information for generating a gift card or gift certificate which is matched and shipped as one package with the greeting card. Such gifts cards may include plastic cards with a magnetic stripe affixed thereto for storing data, as well as other gift card designs. Gift certificates may be printed directly on the card itself or on a separate medium. In such instances, barcode 1804 of FIGS. 18A-C, may include a reference to a memory in which the data relating to the generation of the gift card/gift certificate is maintained. Accessing such file may trigger automatic generation of the gift card/gift certificate. As with the bar code, the SKU and other data may serve as a reference to a memory in which the data about the location and nature of any gift card/gift certificate to be shipped with the card is stored.

FIG. 18B illustrates a multipanel card 1800 similar to that illustrated in FIG. 18A, except that the area 1802 has printed thereon a recipient address, as illustrated. In this embodiment, the card 1800 may be placed in an envelope having a transparent portion in the front thereof, so that when the card is aligned in the envelope, the recipient address is visible from the front of the envelope and maybe affixed to the outside of a parcel. With this embodiment the barcode 1804 may function as a reference to a memory in which the data relating to the generation of the gift card/gift certificate is maintained, or as a reference to a memory address in which the data about the location and nature of any products to be shipped with the card is stored.

FIG. 18C illustrates a multipanel card 1800 similar to that illustrated in FIGS. 18A-B, except that the area 1802 has printed thereon SKU and other data that may serve as a reference to the location and nature of any products to be shipped with the card. The information in area 1802 is used first by the warehouse personnel to locate the proper materials that the consumer has ordered. In FIG. 18C, barcode 1804 may include a reference to a database or computer memory address in which the data useful for generation of either an addressed envelope or a shipping label is maintained.

The process of using printed material 1800 as an information source is explained hereafter with reference to FIGS. 18A-D. First, a consumer selects, customizes and purchases a greeting card, by itself or in conjunction with another item, utilizing the systems and processes described herein. The vendor fulfilling the transaction prints the greeting card 1800, including the panel 1800B, utilizing one of the formats illustrated in FIGS. 18A-C, as illustrated by process block 1820. Next, the reference information printed panel 1800B is a utilized to efficiently manage the card 1800 with any other items and to facilitate shipment thereof as a single entity. In the scenario illustrated in FIG. 18C, the greeting card 1800 is part of a multiple item vendor transaction and is intended to be shipped with a item 1810, which may be a personalized catalog or other personalized marketing material, a gift card or gift certificate 1818 and a gift items 1814, as illustrated. Reference data, in the form of barcode 1804 printed panel 1800B of FIG. 18C, is scanned using the appropriate scanning apparatus and used to generate a recipient address. An examination of panel 1800B by fulfillment personnel or automated scanning techniques determine whether scalable information is printed on panel 1800B, as required in decisional block 1822, however, the specific values of the scanned data, as defined by the fulfillment process, will determine whether an intermediate document is required in decisional block 1823. The data represented by barcode 1804 may include the recipient address itself, which may then be printed on either an envelope 1816 or a shipping label 1820 affixed thereto, as illustrated by arrow "A" in FIG. 18C and process blocks 1824 and 1826 of FIG. 18D. Alternatively, the data represented by barcode 1804 may include the address of a data file in which the recipient address resides. The recipient address on envelope 1816 and/or shipping label 1820 may also be printed from the data file, also represented by process blocks 1824 and 1826. If other items are to be shipped with card 1800, the SKU data and item codes printed in area 1802 of panel 1800B are utilized by a warehouse operator or fulfillment center personnel to select specified product(s), here items 1810, 1818 and 1814, as illustrated by arrow "B" in FIG. 18C, and combine the items into container 1818, as illustrated by arrow "C" and process block 1827 of FIG. 18D. The card 1800 is placed in envelope 1816, if by itself, or if in combination with a package and the envelope attached to container 1818, both as illustrated by arrow "D" and process block 1318 of FIG. 18D. In this matter, the freight carrier or shipper may then send the entire parcel, including container 1818 with the envelope 1816 affixed thereto, as a single unit, allowing a personalized greeting card to accompany the other items of the transaction.

As an alternative to the process described above, and utilizing the card 1800 illustrated in FIG. 18B, the recipient address may be printed directly on the panel 1800B while a packing list or pick ticket 1822 may be printed as an intermediate document from either the data represented by barcode 1804 or from a data file accessed using an address embodied in barcode 1804, and as also illustrated by arrow "B" and blocks 1822-1826, described previously. The printed pick ticket 1822 may include any data format or data types, including those illustrated in panel 1800B of FIGS. 18A-C. The printed pick ticket 1822 is then utilized by a warehouse operator or fulfillment center personnel to select specified product(s), as illustrated by arrow "C" in FIG. 18C, and block 1827 of FIG. 18D, as described previously. If the recipient address is already printed on panel 1800B, as determined by decisional block 1828, the card 1800 would be placed into an envelope 1816 containing a clear window so that the recipient address is visible from the envelope once it is affixed to the outside of container 1818, as illustrated by arrow "D" in FIG. 18C, and block 1318, as described previously. However, if the recipient address is not printed directly on panel 1800B, as determined by decisional block 1828, either the intermediate document, such as pick ticket 1822 or card 1800 is scanned and a shipping label 1820 generated from the data either contained there and are reference thereby, as illustrated by process block 1310. Thereafter, the shipping label may be affixed to package 1818 in accordance with process block 1318, as previously described.

Note also that the data contained in panel 1800B may be utilized to drive the generation of the personalized gift card 1818 or personalized catalog 1810, utilizing the customization process described herein.

The reader can appreciate that, in light of the disclosure contained herein describing the systems and processes and the nature of data which is printable on a panel of a personalized document such as any of a personalized greeting card, catalog or other direct marketing material, that multiple variations of the above-described process may be utilized in which the personalized printed material serves as the link among the matching, bundling and shipment of multiple items to a transaction as a single entity.

The above-described process can be used with greeting card that are ordered and/or customized through any of number of communication interfaces including fax, electronic mail, traditional mail, internet servers, retail kiosk, catalog call center, etc.

Creation, Personalization, and Fulfillment of Greeting Cards with Gift Cards

The present invention enables a person to 1) purchase a gift card from either a Internet Website, Catalog, and/or retail kiosk, 2) choose a retail quality greeting card, 3) personalize the greeting card and 4) send it as a gift with a gift card embedded inside the greeting card. The reverse is also possible, i.e. a user can purchase any greeting card, personalize the greeting card, and then assign that greeting card to have a gift card inserted inside it. In addition to being able to order these gift cards along with personalized greeting cards, the present invention, including the automated fulfillment system described herein, enables gift cards to be embedded or sent along with personalized greeting cards.

The present invention may be implemented using any of the network configurations illustrated in FIG. 2, 3, 12, 16 or 17, which include a card vendor system 250, sometimes referred to as the 4YourSoul or 4YourSoul.com server, and a web vendor system, sometimes referred as the Client's site or Client's server. Such network configurations can be used to address a number of different scenarios for personalization of greeting cards in which the gift card will be matched and inserted with the greeting card. Some of these scenarios are described below, it being understood that the technology and processes previously described may be used to accomplish the following processes. Throughout the following description, uniqueness refers to the ability to uniquely identify an item or data within a system and may be achieved by a number of known data structures and algorithms.

Purchasing a Gift Card and Embedding the Gift Card in a Greeting Card

Scenario 1: The purchase of a Gift card through a Client's Internet Website and then the selection and personalization of a greeting card in which the Gift card will be inserted. First, the user goes to a Client's web site to purchase a gift card. The user selects a card, provides certain pertinent information like the value of the gift card, the recipient's and sender's information, etc. The user is then given an opportunity to choose from a selection of greeting cards, personalize the card using the WSIWYG technology described herein or using simple personalization. Such personalization process can occur either at the client's web site or at the 4YourSoul dynamic website.

- Option 1: The greeting card is chosen and personalized at 4YourSoul's website and the Client has the ability to uniquely identify the gift card item in the shopping cart and the uniqueness is carried through to the order entry system.

The uniqueness of the Gift card is stored and carried through in the 4YourSoul system and this helps identify the correct Gift card with the correct greeting card.

- Option 2: The greeting card is chosen and personalized at 4YourSoul's website and the Client does not have the ability to uniquely identify the gift card item in the shopping cart and carry the uniqueness through to the order entry system.

The greeting card is assigned a unique number, which is then stored in the databases of the client along with other pertinent information from a security and order perspective. This unique number identifies the correct greeting card with the correct Gift card. If the greeting card was created at the 4YourSoul website, the 4YourSoul system already has all the relevant information to match the correct personalized greeting card with correct gift.

OPTION 3: THE GREETING CARD IS CHOSEN AND PERSONALIZED AT THE CLIENT'S WEB SITE.

If the greeting card was selected and personalized at the client's website, the client's system will send the relevant information to 4YourSoul prior to or at the time that the greeting card and the Gift card are fulfilled in order to print the correct greeting card and match with the correct Gift card. This includes a unique method of identifying the Gift card, e.g., the order number and line item number, the gift card number, etc.

Scenario 2: The purchase of a Gift card through a Client's Catalog and then the selection and personalization of a greeting card in which the Gift card will be inserted.

When ordering a Gift card via a catalog the user will indicate to the call center operator the value of the Gift card, and other pertinent information including the greeting card they would like and the personal message to be placed inside the greeting card. The client's system will send the relevant information to 4YourSoul prior to or at the time that the greeting card and the Gift card are fulfilled in order to print the correct greeting card and match with the correct Gift card. This includes a unique method of identifying the Gift card, e.g., the order number and line item number, the gift card number, etc.

Scenario 3: The purchase of a Gift card via email, fax, and/or mail from a Client and then the selection and personalization of a greeting card in which the Gift card will be inserted.

When ordering a Gift card via email, fax, and/or mail the user will indicate the value of the Gift card, and other pertinent information including the desired greeting card and the personal message to be placed inside the greeting card. The client's system will send the relevant information to 4YourSoul prior to or at the time that the greeting card and the Gift card are fulfilled in order to print the correct greeting card and match with the correct Gift card. This includes a unique method of identifying the Gift card, e.g., the order number and line item number, the gift card number, etc.

Scenario 4: The purchase of a Gift card via a retail kiosk from a Client and then the selection and personalization of a greeting card in which the Gift card will be inserted.

This scenario has the same options as that of a user buying a Gift card via the Internet.

Purchasing a Greeting Card and Embedding a Specific Gift Card Therein (Gift Card Processing is Done at the Client's End)

Scenario 1: The Purchase of a Greeting Card and then a Gift Card Belonging to a Specific Client Via the Web:

- The user goes to a web site, either 4YourSoul's or the Client's, is given an opportunity to choose from a selection of greeting cards, and then personalizes the card using 4YourSoul's WYSIWYG technology or using simple personalization. The user then indicates that they want to convert this greeting card into greeting card with a gift card embedded within it and provides pertinent information like the value of the Gift card, the recipient's and sender's information, etc. There are multiple ways in which this process can take place:

- Option 1: The greeting card is chosen and personalized at 4YourSoul's website and the Gift card is created at the Client's website.

- A unique number that identifies the greeting card is provided by 4YourSoul to the Client who will carry this information through to the order entry system. The client's system will create the gift card and send all the relevant information to 4YourSoul prior to or at the time that the greeting card and the Gift card are fulfilled in order to print the correct greeting card and match with the correct Gift card. This includes a unique method of identifying the Gift card, e.g., the order number and line item number.

Option 2: The greeting card as well as the Gift card are chosen and personalized at 4YourSoul's website.

The greeting card along with the Gift card is assigned a unique number, which is then stored in the databases of the client along with other pertinent information from a security and order perspective. This unique number identifies the correct greeting card with the correct Gift card. All the relevant information is sent to 4YourSoul prior to or at the time that the greeting card and the Gift card are fulfilled in order to print the correct greeting card and match with the correct Gift card. This includes a unique method of identifying the Gift card, e.g., the order number and line item number.

OPTION 3: THE GREETING CARD IS CHOSEN AND PERSONALIZED AT THE CLIENT'S WEB SITE.

If the greeting card was selected and personalized at the client's website, the client's system will send the relevant information to 4YourSoul prior to or at the time that the greeting card and the Gift card are fulfilled in order to print the correct greeting card and match with the correct Gift card. This includes a unique method of identifying the Gift card, e.g., the order number and line item number.

Purchasing a Greeting Card and Embedding a Specific Gift Card Therein (Gift Card Processing is Done at 4YourSoul)

Scenario 1: The Purchase of a Greeting Card and then a Gift Card Belonging to a Specific Client Via the Web.

The user goes to a web site, either 4YourSoul's or the Client's, is given an opportunity to choose from a selection of greeting cards, and then personalizes the card using 4YourSoul's WSIWYG technology or using simple personalization. The user then indicates that they want to convert this greeting card into greeting card with a gift card embedded within it and provides pertinent information like the value of the Gift card, the recipient's and sender's information, etc. There are multiple ways in which this process can take place:

Option 1: The greeting card is chosen and personalized at 4YourSoul's website and the Gift card is created at the Client's website.

A unique number that identifies the greeting card is provided by 4YourSoul to the Client who will carry this information through to the order entry system. The client's system will create the gift card and send all the relevant information to 4YourSoul prior to or at the time that the greeting card and the Gift card are fulfilled in order to print the correct greeting card and match with the correct Gift card. This includes a unique method of identifying the Gift card, e.g., the order number and line item number, value, recipient's and sender's information, etc Option 2: The greeting card as well as the Gift card are chosen and personalized at 4YourSoul's website.

The greeting card along with the Gift card is assigned a unique number, which is then stored in the databases of the client along with other pertinent information from a security and order perspective. This unique number identifies the correct greeting card with the correct Gift card. If the credit card transaction is being verified at the Client's end then, once the credit approval has been received, the Client will inform 4YourSoul that it can print and ship the greeting card with the Gift card embedded inside it. At this point 4YourSoul has all the required information to match the correct greeting card with the correct Gift card.

OPTION 3: THE GREETING CARD IS CHOSEN AND PERSONALIZED AT THE CLIENT'S WEB SITE

If the greeting card was selected and personalized at the client's website, the client's system will send the relevant information to 4YourSoul prior to or at the time that the greeting card and the Gift card are fulfilled in order to print the correct greeting card and match with the correct Gift card. This includes a unique method of identifying the Gift card, e.g., the order number and line item number, including the dollar value, the recipient's and sender's information, etc.

Once a gift card has been processed and created by 4YourSoul it will provide the specific information back to the Client to enable the Client to update it's system and process the gift card.

Purchasing a Greeting Card and Embedding a Generic Gift Card Therein (Gift Card Processing is Done at 4YourSoul)

Scenario 1: The Purchase of a Greeting Card and then a Generic Gift Card Via the Web.

The user goes to a web site is given an opportunity to choose from a selection of greeting cards, and then personalizes the card using 4YourSoul's WSIWYG technology or using simple personalization. The user then indicates that they want to convert this greeting card into greeting card with a gift card embedded within it and provides pertinent information like the value of the Gift card, the recipient's and sender's information, etc. The greeting card along with the Gift card is assigned a unique number; this unique number identifies the correct greeting card with the correct Gift card. At this point 4YourSoul has all the required information to match the correct greeting card with the correct Gift card.

Once a gift card has been processed and created by 4YourSoul it will provide specific information back to the Generic Gift card provider to enable the Generic Gift card provider to update it's system and process the gift card.

At the time of fulfillment, attaching the right Gift card with the right greeting card can be done using the systems and techniques described herein including the systems components illustrated in FIGS. 19-25. Typically, the greeting card includes a barcode printed thereon that uniquely identify either the greeting card or the Gift card and may be, but is not limited to, one or more of the following: the greeting card unique number assigned by 4YourSoul, the order number and the line item number assigned by the client, etc. In all cases below, if the Gift card is being processed by 4YourSoul then the term Client refers to 4YourSoul itself.

Scenario 1: Gift Cards Created on Demand Based on Preprinted Greeting Cards.

In this option, the personalized greeting cards are printed in a certain sequence. The greeting cards will be placed in a hopper 1902 on the Gift Card Machine (GCM) 1900 of FIG. 19. A computer 1904 and scanner 1906 associated with the GCM 1900 will scan the barcode on the greeting card and will then query the client's database using this value to retrieve the appropriate information required for the Gift card, such as the dollar value, card number, name of recipient, and/or any other personalization possible on such Gift card, etc. The GCM 1900 will then initialize the Gift card with Gift card initializer 1905 and retrieve the greeting card from the hopper 1902. An inserter 1908 will stick the Gift card inside the greeting card and a folder 1910 will fold the card. An Envelop inserter 1912 will draw an envelop from hopper 1913 stuff the greeting card/gift card combination into an envelope. An address Printer 1914 will print the sender and recipient address on the envelope. Finally, finally envelop stamper 1916 will process the envelop for shipping or mailing, typically by adding postage thereto. This method assures that the correct greeting card goes with the correct Gift card, as the Gift card is not created until the barcode on the greeting card is scanned.

Scenario 2: Preprint the Greeting Cards and Gift Cards in a Given Sequence.

Based on the sequence in which the Gift cards will be created 4YourSoul will print the greeting cards in the same sequence. The cards will be placed in a hopper 1902, and the process will start. There are multiple ways in which this process can occur:

Option 1: Preprint all the Gift cards:

In this option all the Gift cards are preprinted in the predetermined sequence. The GCM 1900 will pull a Gift card, read the magnetic data on the card, query the client's database and extract information for the specific Gift card, e.g., order number and line item number, and/or the 4YourSoul assigned unique greeting card number stored in the client's database. This unique value is used to verify that the greeting card in the stack is the same as the current Gift card being selected by scanning the barcode on the greeting card. If the data on the greeting card matches the data retrieved from the database then the GCM 1900 will pull the greeting card from the hopper 1902; stick the Gift card inside the greeting card; fold the card; stuff the card in an envelope; print the address on the envelope; and finally place a stamp on the envelope, using the components as described previously.

Option 2: Print a Gift card and then check the Greeting Card.

In this option, one Gift card is printed and then the client's database is queried to extract information for the specific Gift card being created, e.g., order number and line item number, and/or the 4YourSoul assigned unique greeting card number stored in the client's database. This unique value is used to verify that the greeting card in the stack is the same as the current Gift card being created by scanning the barcode on the card. If the data on the greeting card matches the data retrieved from the database then the GCM 1900 will pull the greeting card from the hopper 1902; stick the Gift card inside the greeting card; fold the card; stuff the card in an envelope; print the address on the envelope; and finally place a stamp on the envelope, using the components as described previously.

Option 3: First check the Greeting Card then create the Gift card.

In this option, the client's database is queried to extract information for the specific Gift card being created, e.g., order number and line item number, and/or the 4YourSoul assigned unique greeting card number stored in the client's database. This unique value is used to verify that the greeting card in the stack is the same as the current Gift card being created by scanning the barcode on the card. If the data on the greeting card matches the data retrieved from the database then the GCM 1900 will create the Gift card, pull the greeting card from the hopper 1902; stick the Gift card inside the greeting card; fold the card; stuff the card in an envelope; print the address on the envelope; and finally place a stamp on the envelope, using the components as described previously.

Scenario 3: Retrieve of Preprinted Cards Using an on Demand Feeding Machine.

In such case 4YourSoul will print either randomly or in a certain sequence a selection of personalized retail quality greeting cards using printer 1920, which includes an automated feeder into which the cards will be placed. The automated feeder, either on scanning the Gift card or upon receiving information to uniquely identity the greeting card from the GCM 1900, will feed the correct greeting card into the GCM 1900. The GCM 1900 will then stick or place the correct Gift card in the correct personalized greeting card, fold the card; stuff the card in an envelope; print the sender and recipient address on the envelope; and finally place a stamp on the envelope using the components described previously.

In all three cases there may be a need to either query the client's database systems to update the gift card numbers in the system or retrieve the gift card number from the client's database from the greeting card system and/or the gift card creation system.

Figure 19:
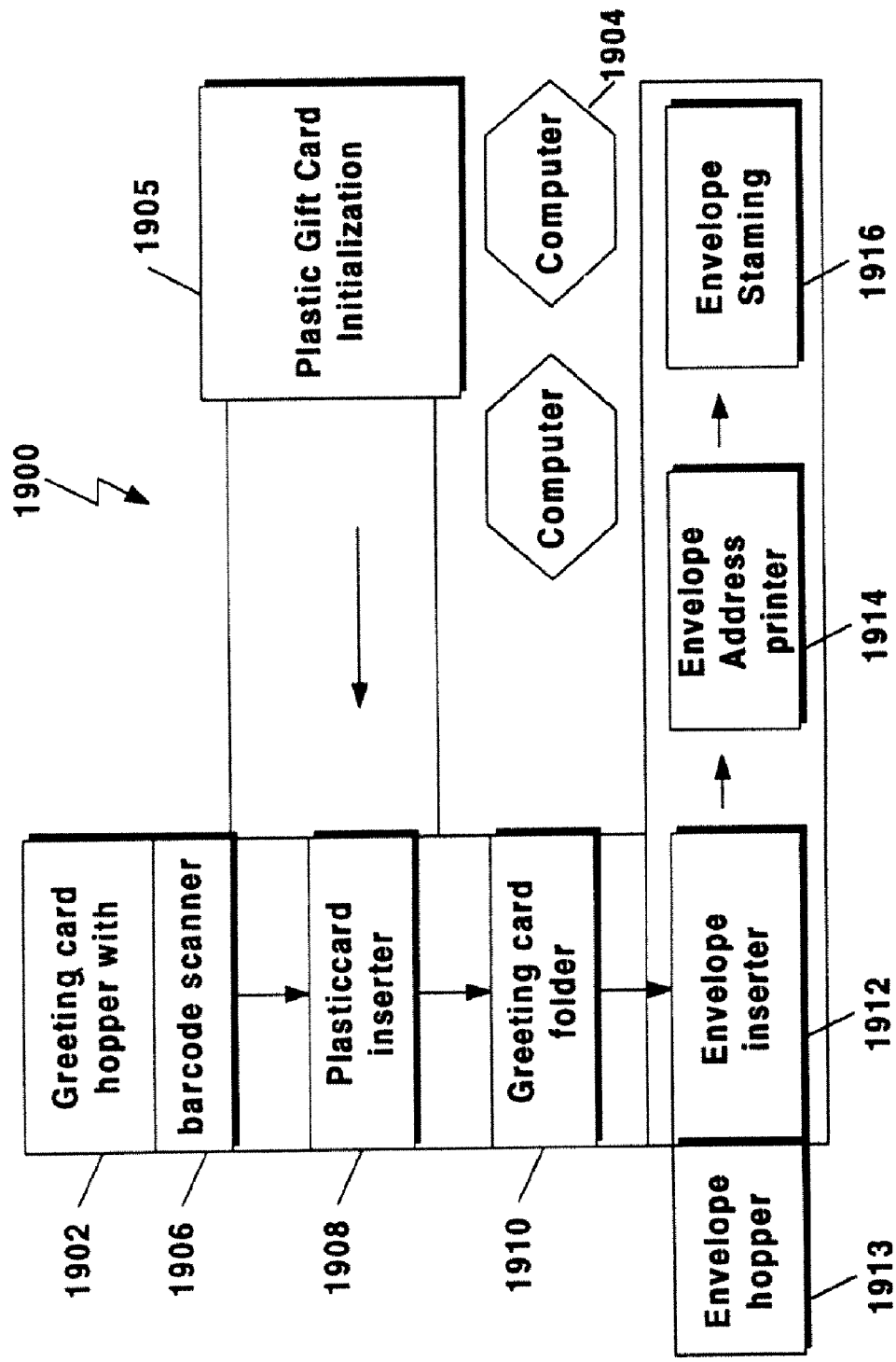
FIG. 19 is a conceptual illustration of the elements of a system, and a process flow among such elements, suitable for creating a personalized gift card with a personalized greeting card in accordance with the present invention.
Figure 20:
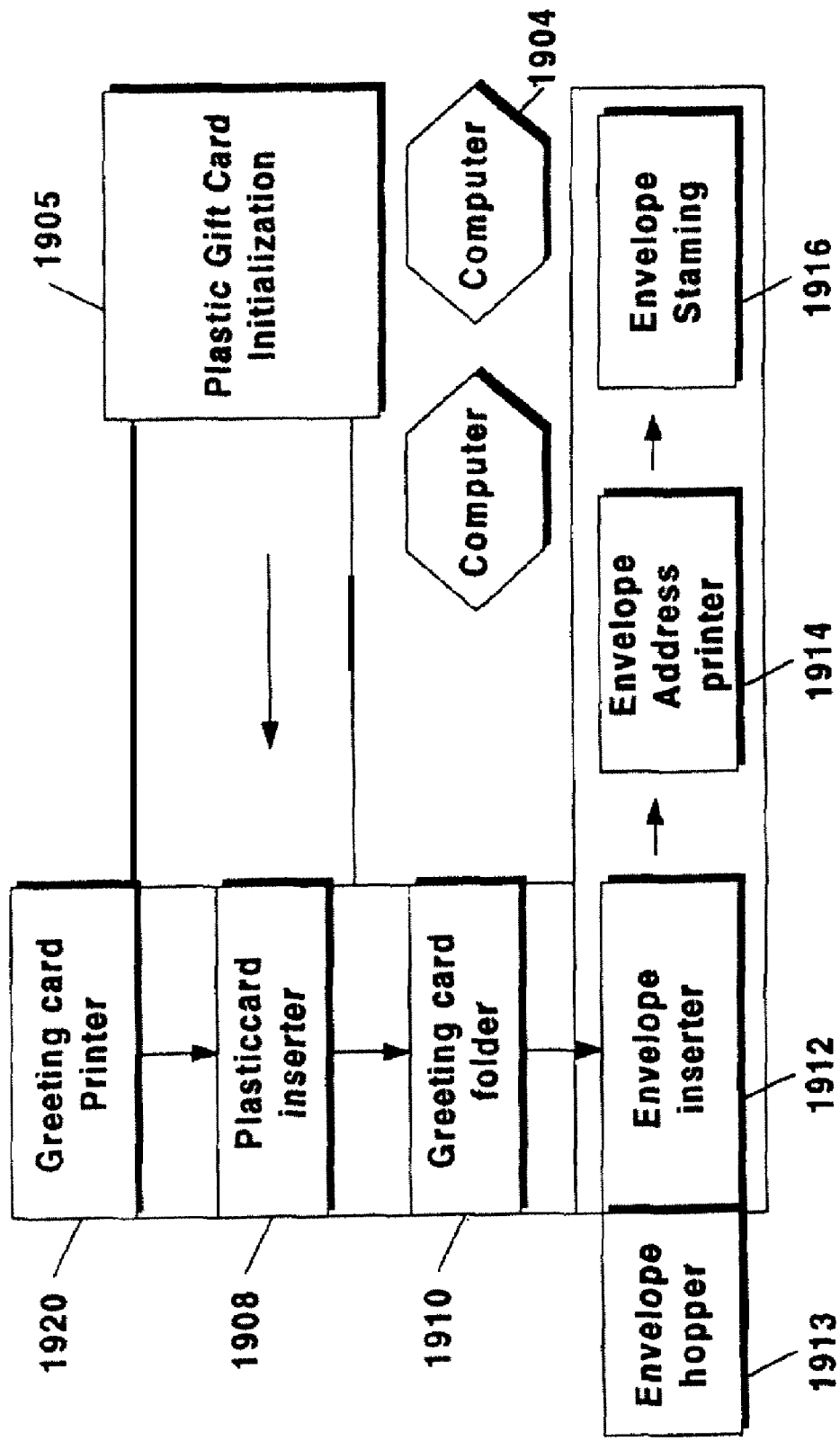
FIG. 20 is an alternative embodiment of the system of FIG. 19 in accordance with another embodiment of the present invention.

FIG. 21 illustrates an alternative embodiment to the system described with reference to FIGS. 19-20. Gift Card Machine system (GCM) 1900 of FIG. 21 comprises a pair of greeting card hoppers 1901-1902, a pair of barcode scanners 1906, a magnetic strip reader 1920, computers 1922-1926, gift card printer 1907 and initializer, greeting card folder 1910, envelop inserter 1912, exception tray 1913, gift card attachment device 1908, envelope address printer 1914, and stamping machine 1916. The hardware necessary to implement the above-described components may utilize existing commercially available mechanisms, currently used in the publishing and printing industry, however, modifications may be required to accommodate the characteristics of the greeting card stock utilized. Computers 1922-1926 may be implemented with any number of commercially available system, including, but not limited to, those described previously herein, or, alternatively, may be implemented with a single computer, or as part of the data processing capabilities associated with one or more of the printer's 1905 and 1907. In the illustrative to embodiments, printer 19 said may be implemented using any of the HP 1000, HP 3000 or HP 9500 printer's commercially available from Hewlett-Packard Corp., Palo Alto, Calif. In addition, the printer 1905 used to generate the gift cards may be implemented with an Arista Custom Card Printer, commercially available from Data Group, Minnetonka, Minn.

Computers 1922 is networked to computer 1924 and 1926 and controls the printing of a gift card, i.e., the printing of a gift card in conjunction with any user-defined customizations thereto and a gift card reference data. In addition, computer 1922 provides access to database 1932 which maintains the image files for the greeting cards and gift cards, as well as the gift card reference data. The personalized greeting cards and the associated gift cards may be defined in database 1932 utilizing any of the data fields and the record structures described previously herein. The gift card may be identified similar to any other gift associated with a specific vendor transaction including any of the data fields indicated in user gift record for 414 of FIG. 5A, or user gift record for 1414 of FIG. 14D. As explained hereinafter, the gift card may have a preprinted image affixed thereon or may have an image printed thereon using the process described herein. In the illustrative embodiment, an image file format 2244, which may be any of TIFF, GIF, or JPEG or any other graphical data format, may be associated with a greeting card image in a vendor transaction record. A header 2242 contains a gift card data reference which will be written into the magnetic strip data of the gift card or smart card. The gift card data reference uniquely identifies the gift card and may be generated using any number of prior art random number generation algorithms, or, alternatively, may be supplied from a commercial banking service, such as Stored Value Sytems or ValueLink, through online queries.

The process by which personalized greeting cards are generated in association with personalized gift cards is described with reference the flowchart of FIG. 22. First, computer 1922 controls the printing of the plurality of personalized greeting cards by printer 1907 in accordance with the process is previously described herein, and is illustrated by process block 2200. Next, card reference data, typically in the form of a barcode, as described with reference to FIGS. 18A-D, is scanned by a first of the barcode readers 1906, and as illustrated by process block 2202. A section of the barcode scanners 1906 scans the greeting cards, still in sequence, as they emerge from hopper 1902. Computer then queries the database 1932 using the barcode value to retrieve the appropriate information from database 1932 required for the gift card, such as the dollar value, card number, name of recipient, and/or any other personalization possible on such gift card, etc. The GCM 1900 will then initialize the gift card 2226 with gift card initializer 1905. Computer 1922 controls a plastic gift card composition application executing thereon transmits the image of the card to server application on the gift card initializer 1905. This implication includes a "hot file" or directory in which any image file data placed into the directory by computer 1924 will be automatically rendered on a gift card medium, which in the illustrative embodiment is a plastic or other card stock. The gift card 2226 is printed based on the image associated with the greeting card and gift card reference data written onto the magnetic strip of the card. In the illustrative embodiment, the image data of the gift card may be all or a portion of the image data printed on one of the panels of the associated personalized greeting card. Alternatively, the image data may comprise a preprinted image of which it does not need rendering, or, a complementary image associated therewith for special occasions, such as weddings anniversaries and birthdays, or holidays, such as New Years, Fourth of July, Thanksgiving, etc.

Figure 21A:
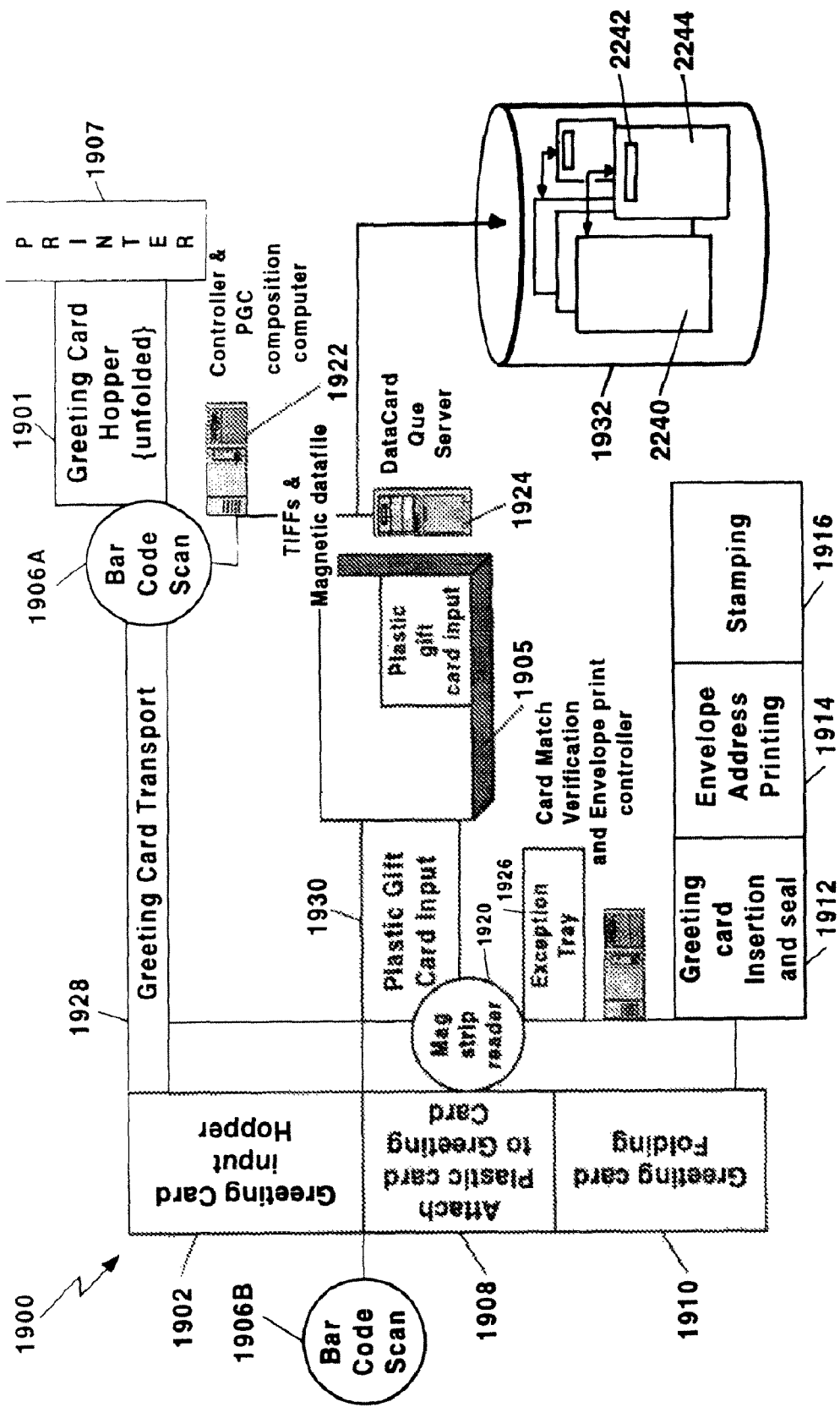
FIG. 21A is an alternative embodiment of the system of FIG. 19 in accordance with another embodiment of the present invention.
Figure 21D:
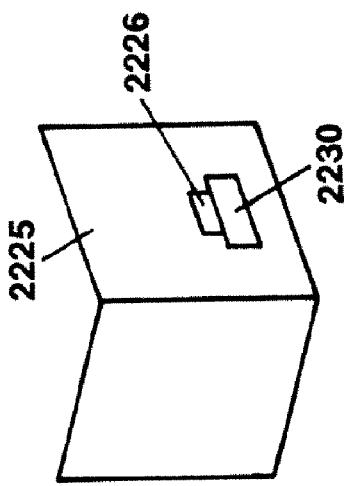
FIGS. 21B-D are conceptual illustrations of personalized greeting card combined with the gift card in accordance with the present invention.
Figure 21C:
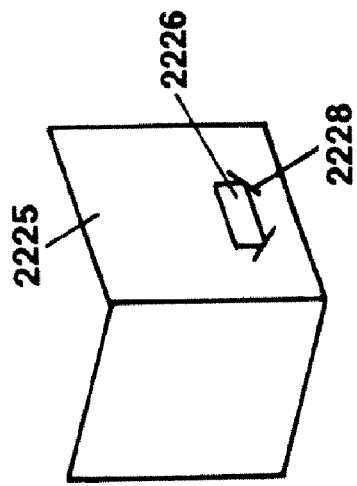
Figure 21B:
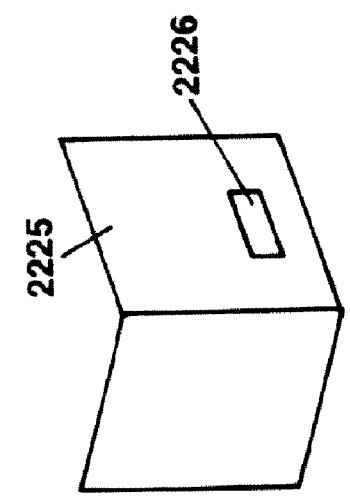

As the greeting card reference data is read by scanner 1906, the data associated with the accompanying gift card is retrieved from database 1932 and gift card printer 1905 prints the associated gift card under the control of server 1924 and computer 1922, as illustrated by process block 2204 and 2206. Thereafter, the scanned card is transported utilizing greeting card transport mechanism 1928, typically conveyor belt, to the second greeting card hopper 1902. The printed gift cards emerge from printer 1905 into hopper 1930 in a sequence that mimics the sequence personalized greeting cards in hopper 1902. Next, as the cards began emerge from hopper 1902 they are scanned under the control of computer 1926, as illustrated by process block 2208. At approximately the same time, the magnetic strips on the printed gift cards are scanned using magnetic strip reader 1920 under the control of computer 1926, as illustrated by process block 2210. The matching algorithm within computer 1926 verifies that the greeting card data reference and the gift card data reference match the same vendor transaction, is illustrated by process block 2211 and decisional block 2212. If not, both the greeting card and the gift card are taken from the sequence and placed in exception tray 1930 as illustrated by process step 2214. Otherwise, the personalized gift card 2225 and the personalized greeting card 2226 are attached, typically by securing the gift card to a panel of the greeting card with an adhesive or inserting the gift card into a panel of the greeting card with slots contain their end, as illustrated by process step 2216. FIGS. 21B-D are conceptual illustrations of personalized greeting card combined with the gift card in accordance with the present invention. In FIG. 21B the gift card 2226 is combined with a personalized greeting card 2225 by securing the gift card to an inside panel of the greeting card, as illustrated. In FIG. 21C the gift card 2226 is combined with a personalized greeting card 2225 by inserting the corners of the gift card into one or more slot 2228 in inside panel of the greeting card, as illustrated. In FIG. 21D the gift card 2226 is combined with a personalized greeting card 2225 by inserting the gift card into a pocket 2230 disposed in inside panel of the greeting card, as illustrated.

Next, an inserter 1908 inserts the gift card inside the greeting card and a folder 1910 will fold the card, as illustrated by steps 2218 and 2220. An Envelop inserter 1912 draws an envelop from hopper 1913 and stuffs the greeting card/gift card combination into an envelope, as illustrated by step 2222. Address Printer 1914 prints the sender and recipient address, supplied by computer 1926, on the envelope and thereafter envelop stamper 1916 places and postage on the envelop for shipping or mailing, as illustrated by steps 2224 and 2226. The inventive system and method described herein assures that the correct greeting card goes with the correct Gift card, as the Gift card. In an alternative embodiment, prior to the sealing of the envelope containing the greeting card and the gift card, a vendor catalog, personalized or otherwise (not shown) may be inserted into the envelope.

Figure 22:
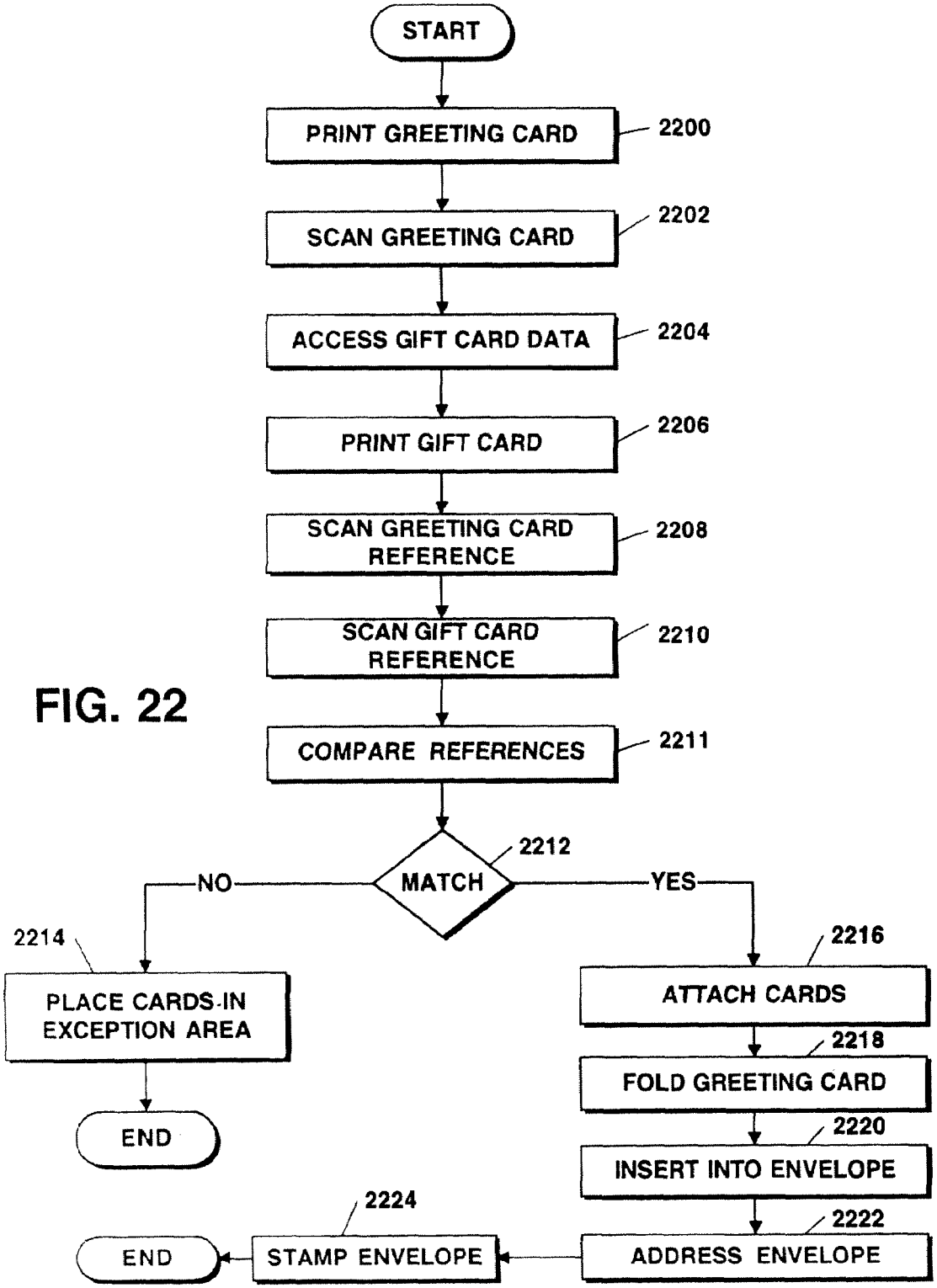
FIGS. 22-25 are flow charts illustrating the processes for generating a personalized gift card with a gift card in accordance with the present invention.
Figure 23:
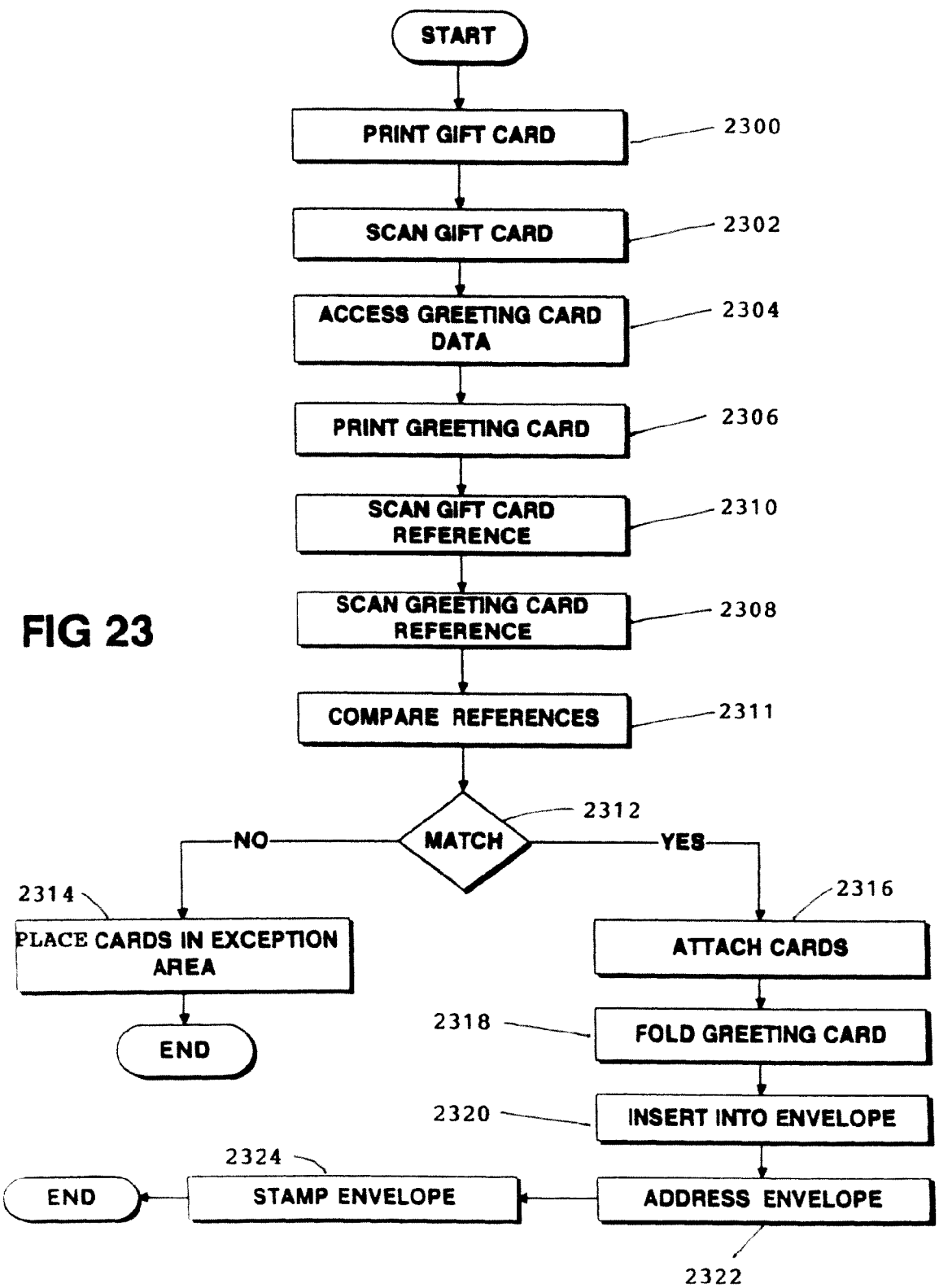
Figure 24:
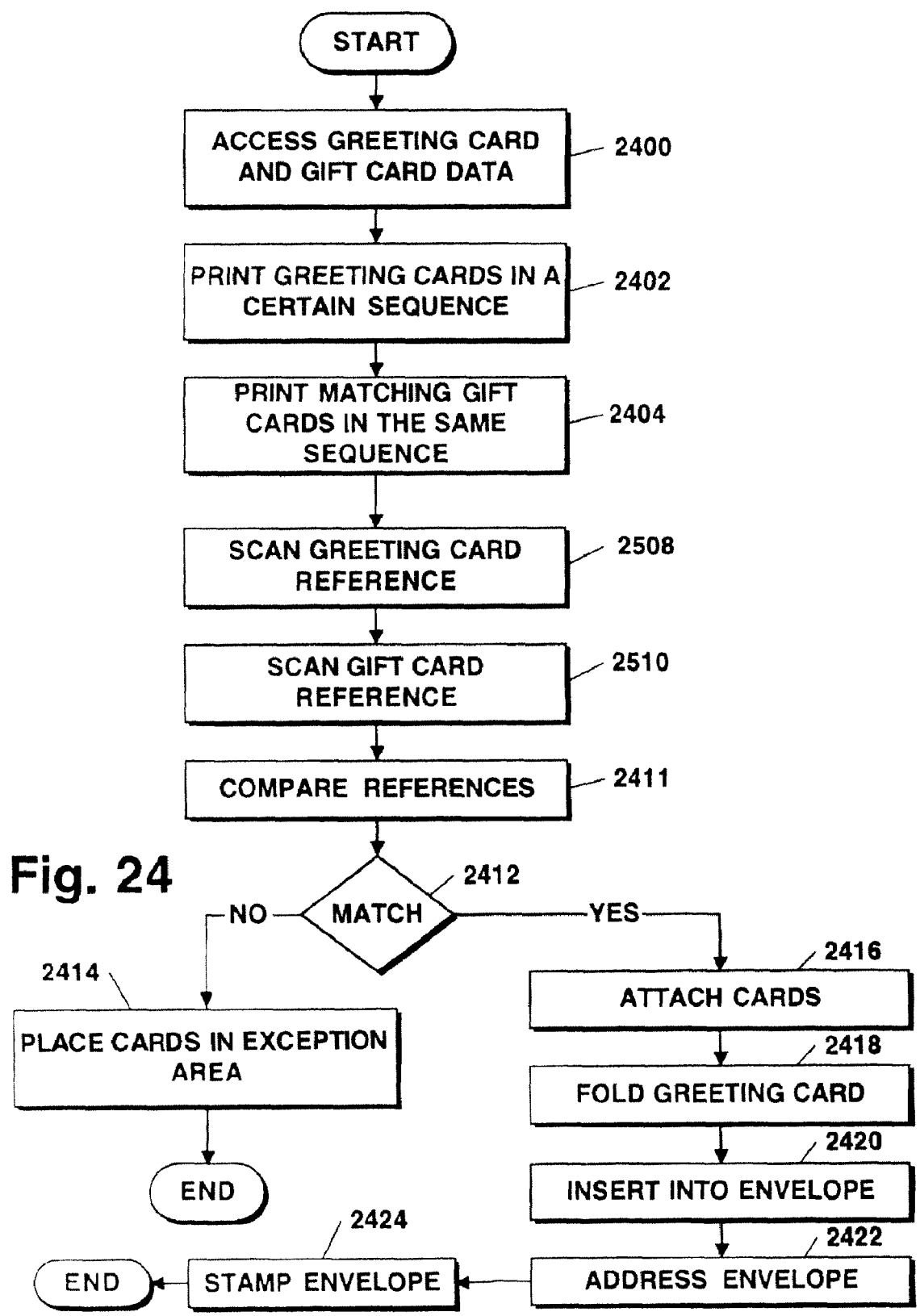
Figure 25:
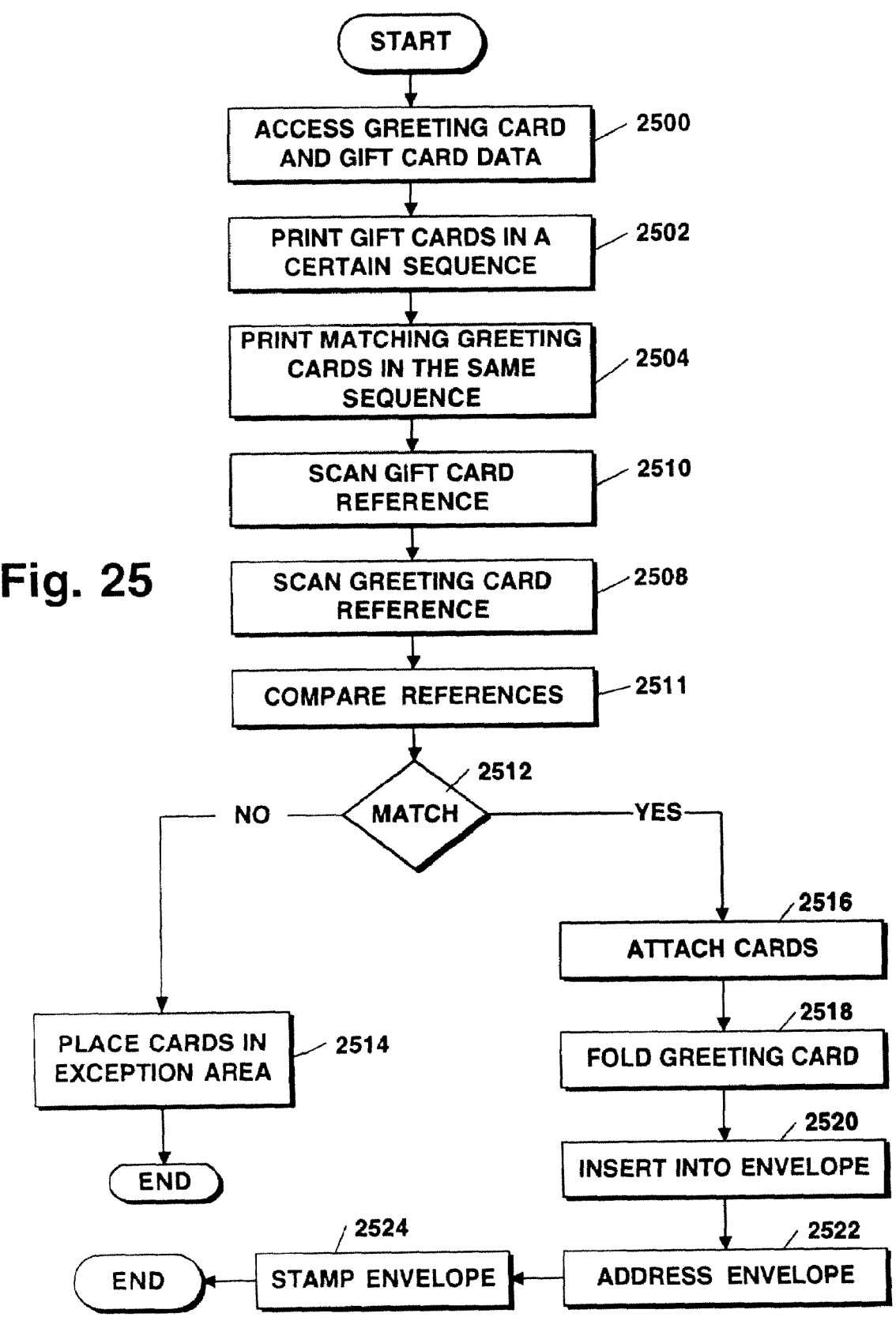

Alternative embodiments to the process described with reference to FIG. 22 are illustrated in FIG. 23 through 25. In the process illustrated in FIG. 23, a gift card is first printed, as illustrated by process block 2300 and similar to that described with reference to process block 2206 of FIG. 22. Next, the generated gift card is scanned using magnetic strip reader 1920, using the technique(s) and in a format(s) as described previously, as illustrated process block 2302. The gift card data reference embedded in the magnetic strip data is utilized by computer 1922 to access the transaction record associated and retrieve the data necessary to prints the associated personalized greeting card, including the card template identifier, any user customizations thereto and a recipient address, as illustrated by process block 2304. Thereafter, the personalized greeting card is generated using printer 1907 in any manner previously described. Thereafter, the gift card data reference and greeting card data reference are scanned and compared, and if a match is verified, combined and prepared for shipment, as illustrated by blocks 2308 through 2324, similar to blocks 2208 through 2224, respectively, of FIG. 22.

In the process illustrated in FIG. 24, one or more predetermined events trigger the accessing of the data within a transaction record of database 1932 causing printer 1907 to access the data necessary to print the personalized greeting card and further causing printer 1905 to access the data necessary to generate a gift card, as illustrated by process block 2400. Such predetermined events may comprise the receipt of the computer instruction, the occurrence of a specified time interval, or the receipt of the task completion or notification message from another test operating within the system. The process of accessing the greeting card data, repeatedly so that a specific sequence or order of greeting cards is generated using the technique(s) and in a format(s) as described previously, and as illustrated by process blocks 2402. Substantially simultaneously therewith, or in synchronized response thereto, a specific sequence of gift cards associated with the greeting cards is also generated again using the technique(s), and in a the same format(s), as described previously, as illustrated by process block 2404. Thereafter, the gift card data reference on the gift card and greeting card data reference on the greeting card are scanned and compared, and if a match is verified, combined and prepared for shipment, as illustrated by blocks 2408 through 2424, similar to blocks 2208 through 2224, respectively, of FIG. 22.

The process illustrated in FIG. 25 is substantially similar to that illustrated with reference to the process of FIG. 24 except that the sequence of gift cards is generated first followed by a corresponding synchronized sequence of greeting cards generated thereafter. In FIG. 25, process blocks 2500 through 2510 or substantially similar to those described with reference to 2400 through 2410 of FIG. 24, except that the order of the process blocks has been modified. Thereafter, the gift card data reference and greeting card data reference are scanned and compared, and if the match is verified, combined and prepared for shipment, as illustrated by blocks 2508 through 2524, similar to blocks 2208 through 2224, respectively, of FIG. 22.

Although the above-described embodiment of gift cards associated with the personalized greeting cards are typically of the read-only plastic card type, similar to a traditional credit card, the invention further contemplates the use of smart card mediums, e.g. a medium which carries a memory that may be written to. In such a scenario, the magnetic strip data would be written into the on board RAM memory of the smart card, instead of one to the magnetic strip of a traditional gift card. Period the printing of any image onto the smart card with otherwise be similar to that described herein.

The process described with reference to FIGS. 21 and 25 may be modified according to the exact requirements of the manufacturing process. For example, in an alternative embodiment, the gift card is printed first followed by printing of the corresponding personalized greeting card, or, alternatively, the gift card and the personalized greeting card may be printed simultaneously. The offense triggering the printing of one or both of the personalized greeting card and the gift card may include the receipt of a computer instruction by computer 1922, the occurrence of a temporal events, such as the expiration of a timer or receipt of a specific clock value, or receipt of a message notifying that an event has occurred. For example, notification from printer 1907 that a personalized greeting card has been printed may trigger the printing of the corresponding gift card, or vice versa.

The above-described invention may be implemented in either all software, all hardware, or a combination of hardware and software, including program code stored in firmware format to support dedicated hardware. A software implementation of the above described embodiment(s) may comprise a series of computer instructions either fixed on a tangible medium, such as a computer readable media, e.g. diskette 142, CD-ROM 147, ROM 115, or fixed disk 152 of FIG. 1, or transmittable to a computer system in a carrier wave, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results.

It will be apparent to those skilled in the art that modifications to the specific embodiments described herein may be made while still being within the spirit and scope of the present invention. For example, the method of providing the cost of shipping may be used for any delivery destination or origin location in the world including the case where both origin and delivery are located within the United States. Also the system of the present invention may provide the shopper with additional information that pertains to the shipment of a selected product. This information may include for instance, laws that prohibit the shipment of certain products into a particular country.

What is claimed is:

1. In a computer system connectable to a computer network, a method comprising:
 (a) maintaining in memory a greeting card template;
 (b) maintaining in memory data identifying the greeting card template and user defined modifications thereto;
 (c) maintaining in memory order data associating said greeting card template and the user defined modifications thereto with a gift card;
 (d) printing on demand a personalized greeting card comprising the greeting card template in conjunction with the user defined modifications thereto and greeting card data reference thereon;
 (e) printing a gift card with a process separate and apart from the printing of the greeting card, the gift card having a gift card data reference thereon;
 (f) comparing the greeting card data reference and the gift card data reference to determine if said references match the order data;
 (g) combining the gift card with the personalized greeting card; and
 (h) shipping the gift card combined with the personalized greeting card to a designated recipient.

2. The method of claim 1 wherein the personalized greeting card template has a front panel wherein (d) comprises:
 (d1) printing front panels of the personalized greeting card.

3. The method of claim 1 wherein the gift card has at least two panels and wherein (e) comprises:
 (e1) printing a first of the at least two gift card panels.

4. The method of claim 3 wherein (e) comprises:
(e1a) printing at least a first of the two gift card panels with at least a portion of an image from at least one panel of the personalized greeting card.

5. The method of claim 3 wherein the greeting card template has n panels where n>2 and wherein (c1) comprises:
(c1a) printing greater than two panels on card stock.

6. The method of claim 1 wherein (f) comprises:
(f1) reading the greeting card reference data;
(f2) reading the gift card reference data; and
(f3) confirming that the personalized greeting card represented by the read greeting card reference data and gift card represented by the read gift card reference data are associated.

7. The method of claim 1 wherein (g) comprises:
(g1) attaching the gift card to a panel of the greeting card.

8. The method of claim 1 wherein (g) comprises:
(g1) inserting the gift card into a panel of the greeting card.

9. The method of claim 1 wherein (c) comprises:
(c1) maintaining in memory data representing any of a greeting card identifier, greeting card modification identifiers, destination address, gift card identifier, gift card value, and vendor transaction identifier.

10. The method of claim 1 wherein (d) comprises:
(d1) printing a personalized greeting card upon the occurrence of a predetermined event selected from the group consisting of: receipt of a computer instruction, the occurrence of a temporal event, and the notification of a completed task.

11. In a computer system connectable to a computer network, a method comprising:
(a) maintaining order data associating a greeting card with the gift card;
(b) generating on demand a personalized greeting card with a greeting card data reference thereon;
(c) using the greeting card data reference to initiate generation of a gift card separate from the greeting card and having a gift card data reference thereon;
(d) reading the greeting card reference data;
(e) reading the gift card reference data;
(f) determining if the personalized greeting card represented by the read greeting card reference data and the gift card represented by the gift card data reference match at least a portion of the order data;
(g) combining the gift card with the personalized greeting card, if the personalized greeting card represented by the read greeting card reference data and gift card represented by the gift card reference data match the order data; and
(h) shipping the gift card with the personalized greeting card to a designated recipient, if the personalized greeting card represented by the read greeting card reference data and gift card represented by the gift card reference data match at least a portion of the order data.

12. The method of claim 11 wherein the personalized greeting card comprises a greeting card template and user defined modifications thereto and wherein (b) comprises:
(b1) printing a greeting card template in conjunction with the user defined modifications thereto upon the occurrence of a predetermined event.

13. The method of claim 12 wherein the predetermined event is selected from the group consisting of: receipt of a computer instruction, the occurrence of a temporal event, and the notification of a completed task.

14. In a computer system connectable to a computer network, a method comprising:
(a) maintaining order data associating a personalized gift card with a personalized greeting card;
(b) printing a gift card with a gift card data reference thereon;
(c) using the gift card data reference to initiate printing of a personalized greeting card with a process separate from the gift card and having a greeting card data reference thereon;
(d) comparing the gift card data reference and the greeting card data reference to determine if said references match at least a portion of the order data;
(e) combining the gift card with personalized greeting card, it said references match the order data; and
(f) shipping the gift card with the personalized greeting card to a designated recipient, if said references match at least a portion of the order data.

15. The method of claim 14 wherein (d) comprises:
(d1) reading the greeting card reference data;
(d2) reading the gift card reference data; and
(d3) confirming that the personalized greeting card represented by the read greeting card reference data and gift card represented by the gift card reference data are associated.

16. The method of claim 14 wherein (c) comprises:
(c1) utilizing the gift card data reference to access a greeting card template stored in memory in conjunction with user defined modifications thereto and a greeting card data reference; and
(c2) printing the greeting card template in conjunction with the user defined modifications thereto upon the occurrence of a predetermined event.

17. The method of claim 14 wherein the gift card has at least two panels and wherein (b) comprises:
(b) printing at least one panel on gift card stock.

18. In a computer system connectable to a computer network, a method comprising:
(a) maintaining in memory order data identifying a template and user defined modifications thereto and data associating the template with a gift card;
(b) upon the occurrence of a first predetermined event, printing a personalized greeting card comprising the identified template in conjunction with the user defined modifications thereto and greeting card data reference thereon;
(c) upon the occurrence of a second predetermined event, generating a gift card separate from the greeting card, the gift card having a gift card data reference thereon;
(d) comparing the gift card data reference and the greeting card data reference to determine if said references match at least a portion of the order data;
(e) combining the gift card with the personalized greeting card; and
(f) shipping the gift card combined with the personalized greeting card to a designated recipient.

19. The method of claim 18 wherein one of the first and second predetermined events are selected from the group consisting of: receipt of a computer instruction, the occurrence of a temporal event, and the notification of a completed task.

20. The method of claim 18 wherein the first and second predetermined events occur simultaneously.

21. The method of claim 18 wherein the first and second predetermined events occur in a sequence.

22. In a computer system connectable to a computer network, a method comprising:
  (a) maintaining in memory a greeting card template;
  (b) maintaining in memory order data identifying the greeting card template, user defined modifications thereto, and data associating the greeting card template with a gift card;
  (c) printing, in a sequence, a plurality personalized greeting cards, the plurality of personalized greeting cards comprising an identified greeting card template in conjunction with the user defined modifications thereto and a greeting card data reference thereon;
  (d) printing, in a sequence and as a process separate from the plurality of personalized greeting cards, a plurality of gift cards, the gift cards having a respective gift card data reference thereon;
  (e) comparing the greeting card data reference of a greeting card having a position in the sequence of personalized greeting cards with the gift card data reference of a gift card having a similar position in sequence of gift cards to determine if said references match at least a portion of the same order data;
  (f) combining the gift card with the personalized greeting card, if the personalized greeting card represented by the greeting card data reference and gift card represented by the gift card data reference match at least a portion of the order data; and
  (g) shipping the gift card combined with the personalized greeting card to a designated recipient.

23. The method of claim 22 wherein the gift cards have a plurality of panels and wherein (d) comprises:
  (d1) printing at least one panel on gift card stock.

24. The method of claim 22 wherein the gift cards have a plurality of panels and wherein (d) comprises:
  (d1) printing at least one panel on gift card stock with an image associated with the personalized greeting card.

25. The method of claim 22 wherein the gift cards have a plurality of panels and wherein (d) comprises:
  (d1) printing at least one panel on gift card stock with an image having a complementary theme with a panel of the associated personalized greeting card.

26. The method of claim 22 wherein the gift cards have a plurality of panels and wherein (d) comprises:
  (d1) printing at least one panel on gift card stock with a user uploaded image associated with the personalized greeting card.

27. A computer program product for use with a computer system operatively coupled to a computer network comprises a computer usable storage medium having program code embodied thereon, the program code comprising:
  (a) program code for maintaining in memory a greeting card template;
  (b) program code for maintaining in memory order data identifying the greeting card template and user defined modifications thereto;
  (c) program code for maintaining in memory data associating said greeting card template and the user defined modifications thereto with a gift card;
  (d) program code for printing a personalized greeting card comprising the identified greeting card template in conjunction with the user defined modifications thereto and greeting card data reference thereon;
  (e) program code for printing a gift card printing of the greeting card and having a gift card data reference thereon;
  (f) program code for comparing the greeting card data reference and the gift card data reference to determine if said references match at least a portion of the same order data;
  (g) program code for enabling shipping of the gift card combined with the personalized greeting card to a designated recipient if said references match at least a portion of the same order data.

28. A computer system connectable to a computer network comprising:
  (a) a processor;
  (b) a memory coupled to the processor for storing order data comprising;
    (i) data identifying a greeting card template and user defined modifications thereto; and
    (ii) data associating said greeting card template with a gift card;
  (c) a printer coupled to the processor;
  (d) program logic for printing on demand a personalized greeting card comprising the identified greeting card template in conjunction with user defined modifications thereto and a greeting card data reference thereon;
  (e) program logic for generating a personalized gift card with a process separate from the printing of the greeting card and having a gift card data reference thereon;
  (f) program logic for comparing the greeting card data reference and the gift card data reference to determine if said references match at least a portion of the order data; and
  (g) program logic for enabling shipping of the gift card combined with the personalized greeting card to a designated recipient if said references match at least a portion of the same order data.

* * * * *